US012593099B2

(12) United States Patent
Phillips et al.

(10) Patent No.: US 12,593,099 B2
(45) Date of Patent: Mar. 31, 2026

(54) SYSTEMS AND METHODS FOR ENABLING THE IMPROVED DELIVERY OF LIVE CONTENT ITEMS TO A PLURALITY OF COMPUTING DEVICES

(71) Applicant: Adeia Guides Inc., San Jose, CA (US)

(72) Inventors: Christopher Phillips, Hartwell, GA (US); Charles Dasher, Lawrenceville, GA (US); Reda Harb, Tampa, FL (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/545,004

(22) Filed: Dec. 19, 2023

(65) Prior Publication Data

US 2025/0203156 A1     Jun. 19, 2025

(51) Int. Cl.
| | |
|---|---|
| *H04N 21/442* | (2011.01) |
| *H04N 21/2187* | (2011.01) |
| *H04N 21/431* | (2011.01) |
| *H04N 21/438* | (2011.01) |
| *H04N 21/488* | (2011.01) |

(52) U.S. Cl.
CPC ... *H04N 21/44209* (2013.01); *H04N 21/2187* (2013.01); *H04N 21/4312* (2013.01); *H04N 21/438* (2013.01); *H04N 21/4882* (2013.01)

(58) Field of Classification Search
None
See application file for complete search history.

(56) References Cited

U.S. PATENT DOCUMENTS

| | | | |
|---|---|---|---|
| 8,515,337 B2 | 8/2013 | Ingrassia et al. | |
| 9,479,801 B2 | 10/2016 | Higgs et al. | |
| 11,044,292 B2 | 6/2021 | Enenkl et al. | |
| 11,356,718 B2 * | 6/2022 | McGilvray | H04N 21/458 |
| 11,758,460 B1 | 9/2023 | Myron et al. | |
| 12,231,483 B1 | 2/2025 | Harviainen et al. | |

(Continued)

FOREIGN PATENT DOCUMENTS

WO     2021/101934 A1     5/2021

OTHER PUBLICATIONS

"Automatic Switching Between Internet Radio and Traditional Radio" Collin Irwin, Rachel Hausmann, (Jan. 2021) (Technical Disclosure Commons) (https://www.tdcommons.org/cgi/viewcontent.cgi?article=5068&context=dpubs_series).

(Continued)

*Primary Examiner* — Omar S Parra
(74) *Attorney, Agent, or Firm* — HG LAW LLP

(57) ABSTRACT

Systems and methods are provided for enabling the improved delivery of live content items to a plurality of computing devices. A live content item is received via an application running on a computing device via a first transmission scheme, where the first transmission scheme is an over-the-top transmission scheme, and the live content item is generated for output via the application. A reduction in quality of the first transmission scheme that is greater than a threshold reduction in quality is identified, and it is identified that the live content item is available via a second transmission scheme from a source other than the first transmission scheme. The live content item is received via the second transmission scheme, and the live content item received via the second transmission scheme is generated for output.

18 Claims, 35 Drawing Sheets

(56) References Cited

U.S. PATENT DOCUMENTS

| | | | |
|---|---|---|---|
| 2023/0047422 A1* | 2/2023 | Semerjyan | G06F 8/45 |
| 2023/0098668 A1 | 3/2023 | Pichaimurthy et al. | |
| 2023/0179838 A1 | 6/2023 | Panchaksharaiah et al. | |
| 2023/0188775 A1 | 6/2023 | Topiwalla et al. | |
| 2024/0291878 A1* | 8/2024 | Zaruba | H04L 65/1069 |
| 2024/0427420 A1 | 12/2024 | Harviainen et al. | |
| 2025/0203126 A1 | 6/2025 | Phillips et al. | |

OTHER PUBLICATIONS

3GPP TR 26.928 version 17.0.0 Release 17, 5G; Extended Reality (XR) in 5G, May 2022, 133 pages.

Arcore, Tune in to Google I/O, available online at: <https://developers.google.com/ar>, Mar. 20-21, 2025, 15 pages.

Baroffio, L., et al., "Coding Local and Global Binary Visual Features Extracted From Video Sequences", IEEE Transactions on Image Processing , vol. 24, No. 11, Nov. 2015, pp. 3546-3560.

Developer, Watch "Discover ARKit 6" from WWDC22, More to explore with ARKit 6, available online at: <https://developer.apple.com/augmented-reality/arkit/>, 2025, 9 pages.

DVB , "Digital Terrestrial Television services are on air in 82% of the world's countries", DVB, DTT Deployment Data. Source: DVB/EBU/BNE DTT Deployment Database, (Nov. 2023) Retrieved from : https://dvb.org/solutions/dtt-deployment-data/#:%7E:text=As%20illustrated%20in%20the%20map,representing%2091.3%25%20of%20its%20population (3 pages).

Guardian , "More than a third of world's population have never used internet, says UN", Guardian, "More than a third of world's population have never used internet, says UN" (Nov. 30, 2021) https://www.theguardian.com/technology/2021/nov/30/more-than-a-third-of-worlds-population-has-never-used-the-internet-says-un (3 pages).

Li, G., et al., "A deep-learning real-time visual SLAM system based on multi-task feature extraction network and self-supervised feature points", Measurement, vol. 168, Jan. 15, 2021.

Ma, J., et al., "Image Matching from Handcrafted to Deep Features: A Survey", International Journal of Computer Vision, vol. 129, 2021, pp. 23-79.

Mehrabi, A., et al., "Multi-Tier CloudVR: Leveraging Edge Computing in Remote Rendered Virtual Reality", ACM Transactions on Multimedia Computing, Communications, and Applications (TOMM), vol. 17, No. 2, Article No. 49, May 11, 2021, pp. 1-24.

Qu, Q., et al., "A Comprehensive Review of Machine Learning in Multi-objective Optimization", 2021 IEEE 4th International Conference on Big Data and Artificial Intelligence (BDAI), Jul. 2021, pp. 7-14.

Qualcomm, Boundless XR and cloud gaming over 5G, Qualcomm Technologies, Inc., available online at: <https://www.qualcomm.com/content/dam/qcomm-martech/dm-assets/documents/pres_-_boundless_xr_and_cloud_gaming_over_5g.pdf>, Jul. 20, 2021, 33 pages.

Siriwardhana, Y., et al., "A Survey on Mobile Augmented Reality With 5G Mobile Edge Computing: Architectures, Applications, and Technical Aspects", IEEE Communications Surveys & Tutorials , vol. 23, No. 2, 2021, pp. 1160-1192.

U.S. Appl. No. 18/545,007, filed Dec. 19, 2023, Christopher Phillips.

* cited by examiner

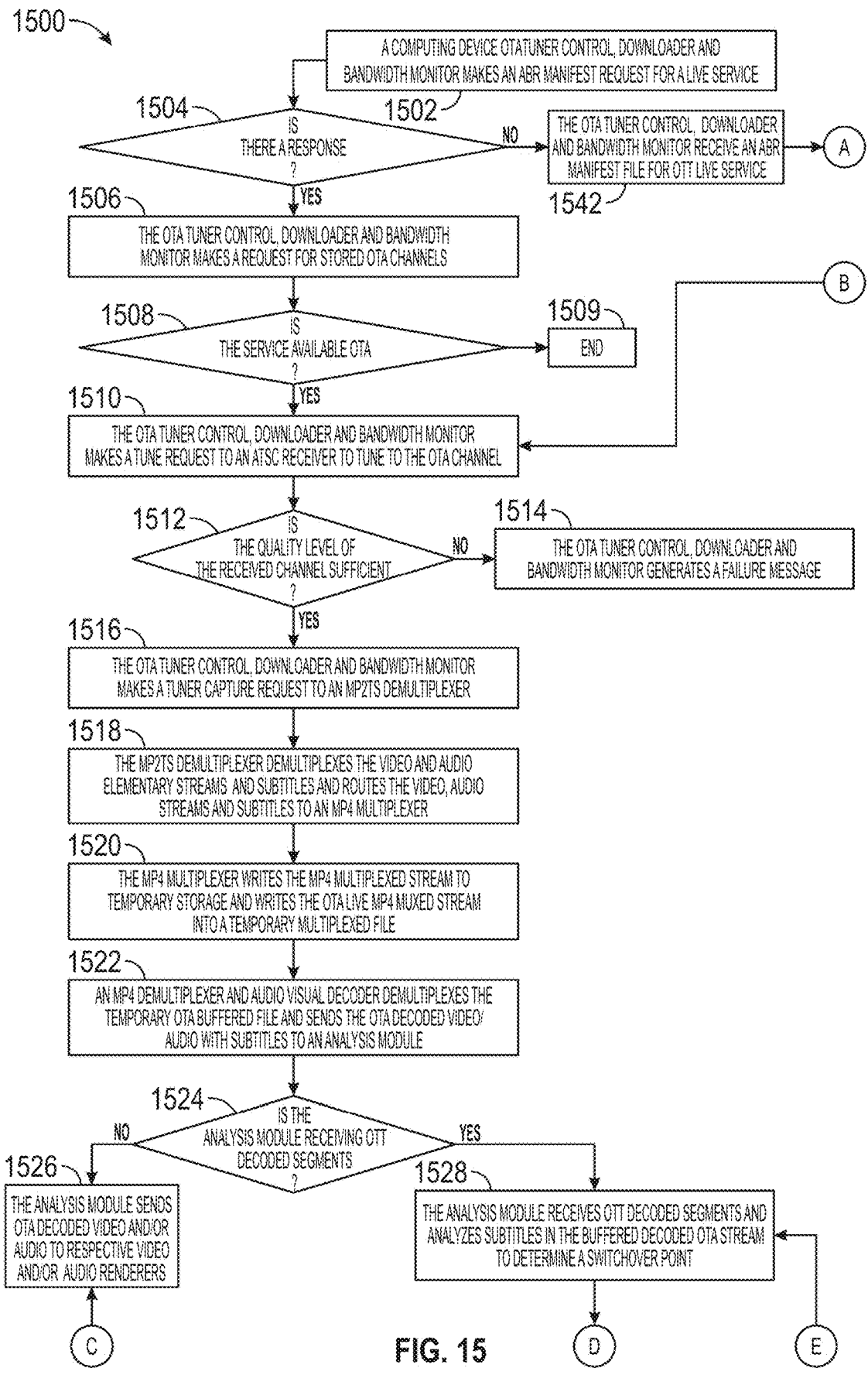

1500

A COMPUTING DEVICE OTA TUNER CONTROL, DOWNLOADER AND BANDWIDTH MONITOR MAKES AN ABR MANIFEST REQUEST FOR A LIVE SERVICE

1502

1504 IS THERE A RESPONSE ? — NO → THE OTA TUNER CONTROL, DOWNLOADER AND BANDWIDTH MONITOR RECEIVE AN ABR MANIFEST FILE FOR OTT LIVE SERVICE → (A)

1542

YES

1506 THE OTA TUNER CONTROL, DOWNLOADER AND BANDWIDTH MONITOR MAKES A REQUEST FOR STORED OTA CHANNELS (B)

1508 IS THE SERVICE AVAILABLE OTA ? → 1509 END

YES

1510 THE OTA TUNER CONTROL, DOWNLOADER AND BANDWIDTH MONITOR MAKES A TUNE REQUEST TO AN ATSC RECEIVER TO TUNE TO THE OTA CHANNEL

1512 IS THE QUALITY LEVEL OF THE RECEIVED CHANNEL SUFFICIENT ? — NO → 1514 THE OTA TUNER CONTROL, DOWNLOADER AND BANDWIDTH MONITOR GENERATES A FAILURE MESSAGE

YES

1516 THE OTA TUNER CONTROL, DOWNLOADER AND BANDWIDTH MONITOR MAKES A TUNER CAPTURE REQUEST TO AN MP2TS DEMULTIPLEXER

1518 THE MP2TS DEMULTIPLEXER DEMULTIPLEXES THE VIDEO AND AUDIO ELEMENTARY STREAMS AND SUBTITLES AND ROUTES THE VIDEO, AUDIO STREAMS AND SUBTITLES TO AN MP4 MULTIPLEXER

1520 THE MP4 MULTIPLEXER WRITES THE MP4 MULTIPLEXED STREAM TO TEMPORARY STORAGE AND WRITES THE OTA LIVE MP4 MUXED STREAM INTO A TEMPORARY MULTIPLEXED FILE

1522 AN MP4 DEMULTIPLEXER AND AUDIO VISUAL DECODER DEMULTIPLEXES THE TEMPORARY OTA BUFFERED FILE AND SENDS THE OTA DECODED VIDEO/AUDIO WITH SUBTITLES TO AN ANALYSIS MODULE

1524 IS THE ANALYSIS MODULE RECEIVING OTT DECODED SEGMENTS ?

NO — 1526 THE ANALYSIS MODULE SENDS OTA DECODED VIDEO AND/OR AUDIO TO RESPECTIVE VIDEO AND/OR AUDIO RENDERERS → (C)

YES — 1528 THE ANALYSIS MODULE RECEIVES OTT DECODED SEGMENTS AND ANALYZES SUBTITLES IN THE BUFFERED DECODED OTA STREAM TO DETERMINE A SWITCHOVER POINT → (D)

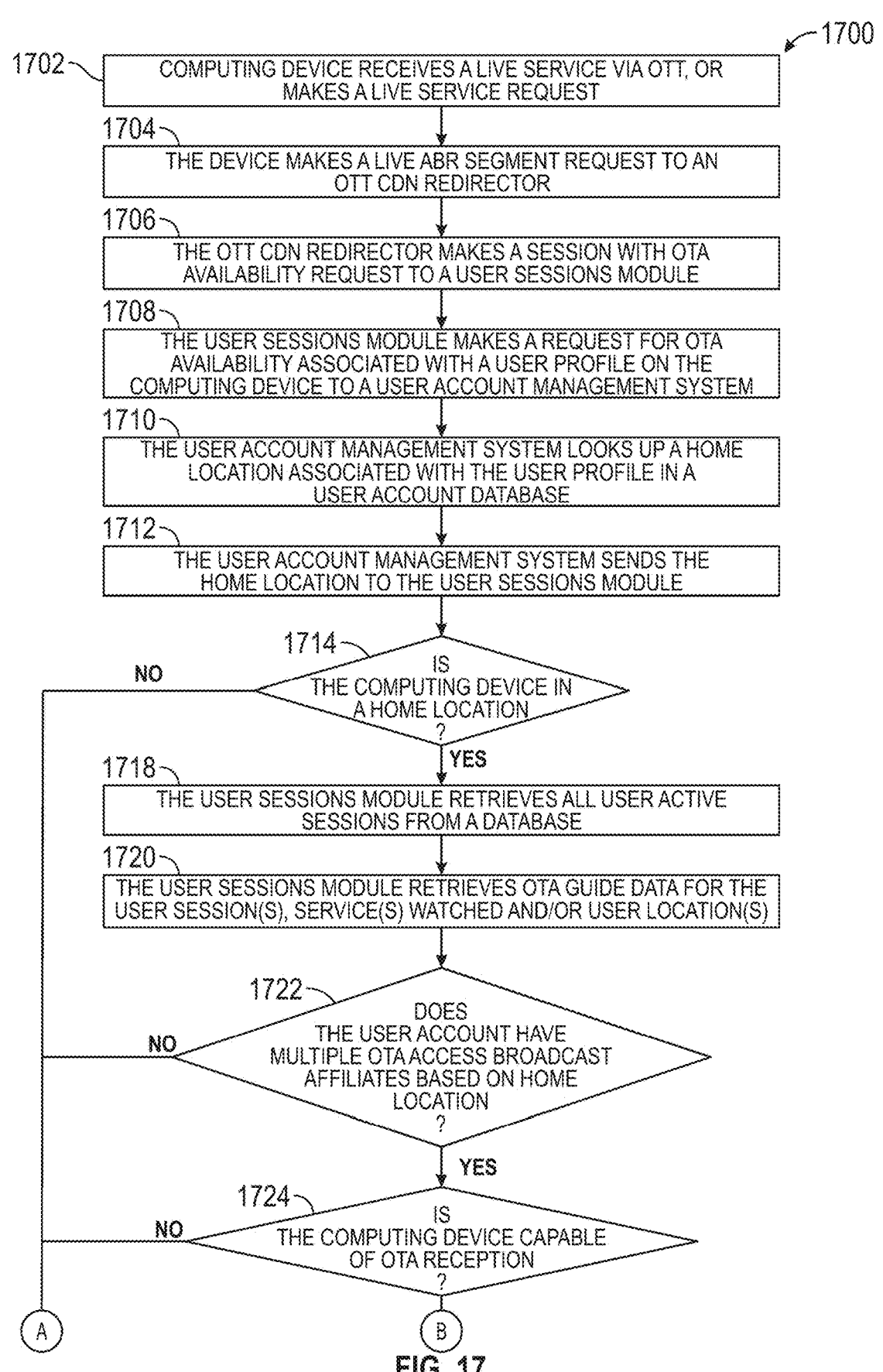

1700

1702 — COMPUTING DEVICE RECEIVES A LIVE SERVICE VIA OTT, OR MAKES A LIVE SERVICE REQUEST

1704 — THE DEVICE MAKES A LIVE ABR SEGMENT REQUEST TO AN OTT CDN REDIRECTOR

1706 — THE OTT CDN REDIRECTOR MAKES A SESSION WITH OTA AVAILABILITY REQUEST TO A USER SESSIONS MODULE

1708 — THE USER SESSIONS MODULE MAKES A REQUEST FOR OTA AVAILABILITY ASSOCIATED WITH A USER PROFILE ON THE COMPUTING DEVICE TO A USER ACCOUNT MANAGEMENT SYSTEM

1710 — THE USER ACCOUNT MANAGEMENT SYSTEM LOOKS UP A HOME LOCATION ASSOCIATED WITH THE USER PROFILE IN A USER ACCOUNT DATABASE

1712 — THE USER ACCOUNT MANAGEMENT SYSTEM SENDS THE HOME LOCATION TO THE USER SESSIONS MODULE

1714 — IS THE COMPUTING DEVICE IN A HOME LOCATION ?

NO

YES

1718 — THE USER SESSIONS MODULE RETRIEVES ALL USER ACTIVE SESSIONS FROM A DATABASE

1720 — THE USER SESSIONS MODULE RETRIEVES OTA GUIDE DATA FOR THE USER SESSION(S), SERVICE(S) WATCHED AND/OR USER LOCATION(S)

1722 — DOES THE USER ACCOUNT HAVE MULTIPLE OTA ACCESS BROADCAST AFFILIATES BASED ON HOME LOCATION ?

NO

YES

1724 — IS THE COMPUTING DEVICE CAPABLE OF OTA RECEPTION ?

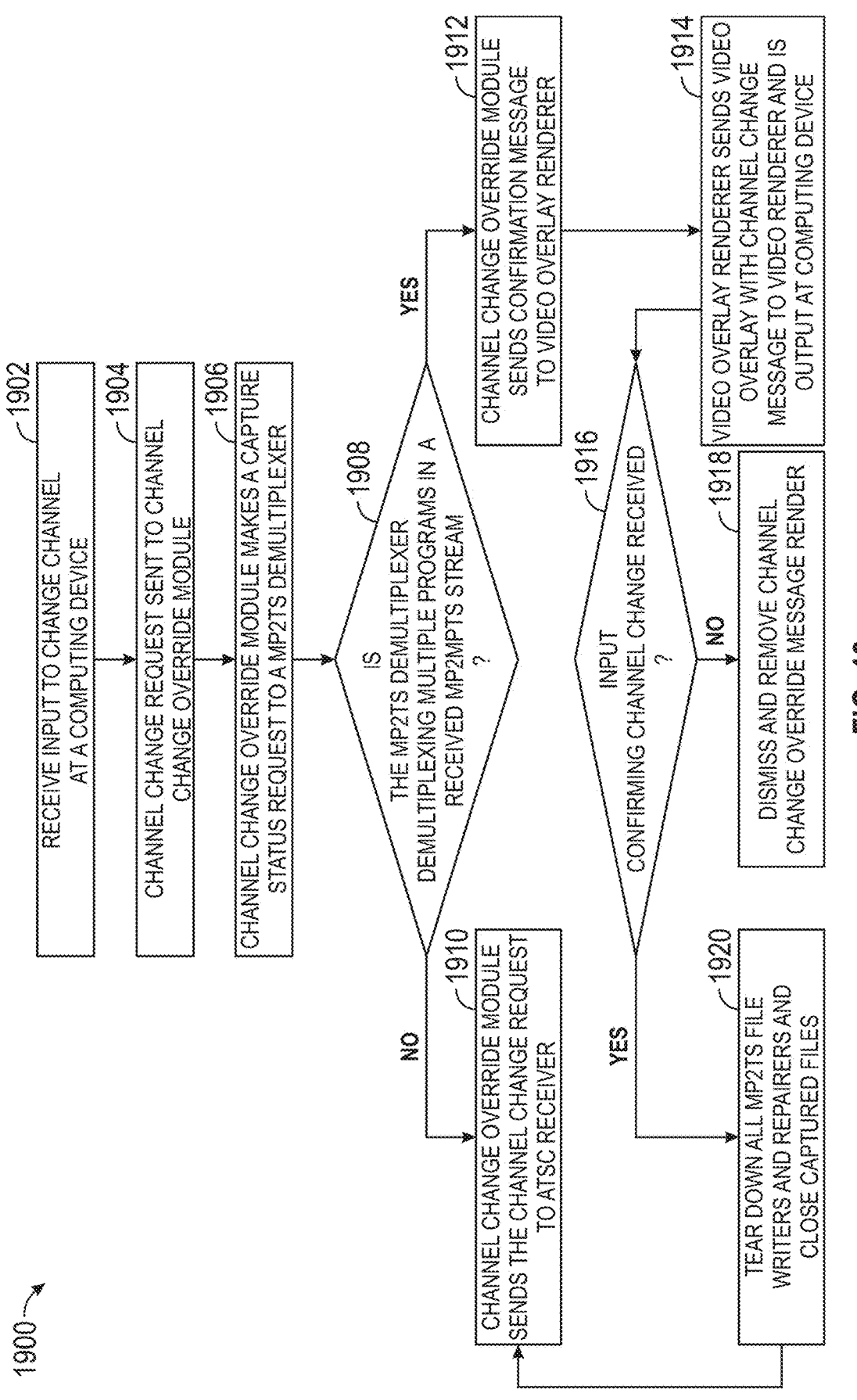

1900

1902 RECEIVE INPUT TO CHANGE CHANNEL AT A COMPUTING DEVICE

1904 CHANNEL CHANGE REQUEST SENT TO CHANNEL CHANGE OVERRIDE MODULE

1906 CHANNEL CHANGE OVERRIDE MODULE MAKES A CAPTURE STATUS REQUEST TO A MP2TS DEMULTIPLEXER

1908 IS THE MP2TS DEMULTIPLEXER DEMULTIPLEXING MULTIPLE PROGRAMS IN A RECEIVED MP2MPTS STREAM ?

NO

1910 CHANNEL CHANGE OVERRIDE MODULE SENDS THE CHANNEL CHANGE REQUEST TO ATSC RECEIVER

YES

1912 CHANNEL CHANGE OVERRIDE MODULE SENDS CONFIRMATION MESSAGE TO VIDEO OVERLAY RENDERER

1914 VIDEO OVERLAY RENDERER SENDS VIDEO OVERLAY WITH CHANNEL CHANGE MESSAGE TO VIDEO RENDERER AND IS OUTPUT AT COMPUTING DEVICE

1916 INPUT CONFIRMING CHANNEL CHANGE RECEIVED ?

NO

1918 DISMISS AND REMOVE CHANNEL CHANGE OVERRIDE MESSAGE RENDER

YES

1920 TEAR DOWN ALL MP2TS FILE WRITERS AND REPAIRERS AND CLOSE CAPTURED FILES

FIG. 19

SYSTEMS AND METHODS FOR ENABLING THE IMPROVED DELIVERY OF LIVE CONTENT ITEMS TO A PLURALITY OF COMPUTING DEVICES

One or more disclosed embodiments are directed towards systems and methods for enabling the improved delivery of live content items to a plurality of computing devices. Some embodiments or aspects relate to additional or alternative features, functionalities, and/or fields.

SUMMARY

With the availability of smart, or connected, televisions, there is an expectation that televisions can receive and display live content from multiple sources. This includes traditional broadcast live content as well as live over-the-top (OTT) content, such as a Super Bowl game, that is received via the Internet. The broadcast live content may be received terrestrially or over-the-air (OTA), via satellite, and/or via cable. In addition, many smart televisions are able to install applications that receive the live OTT content via the Internet, and generate the live OTT content for display at the smart television. Typically, these applications are either preinstalled on the smart television, or are available for download via the Internet. In any case, the applications typically receive the live OTT content itself via the Internet. If there are issues, such as quality issues, with the Internet connection that a smart television utilizes to receive the live OTT content and/or a content delivery network (CDN) that is utilized to deliver the live OTT content becomes overloaded, the quality of the output live OTT content may be severely degraded (e.g., reduced from ultra-high definition to standard definition) and/or the smart television may not receive enough data to output OTT content at all. Although many households have an Internet connection, household Internet connections vary widely in both bandwidth and quality. In some cases, the available bandwidth and/or speed of the Internet connection may not be sufficient to deliver content to an application installed on a smart television, especially during peak usage times or when the lots of other devices connected to the same network as the smart television are competing for bandwidth. In some scenarios, a user may be attempting to use an OTT application to stream content on a smart television at a remote location with a bad Internet service, for example, when traveling or camping. In order to enable applications on a smart television to continue to deliver live content when there is no Internet connection, or when there is a limited Internet connection, there is a need to enable techniques for receiving data associated with smart television applications from a source other than the Internet. In other examples, a CDN may have enough capacity to deliver live content items under normal conditions, but the CDN may become overloaded if the live OTT content is, for example, unexpectedly popular.

To help address these problems, systems and methods are provided for enabling the improved delivery of live content items to a plurality of computing devices.

In accordance with a first aspect of the disclosure, a method is provided that includes receiving a live content item via a first, OTT, transmission scheme via an application running on a computing device, and generating the live content item for output via the application. A reduction in quality of the first transmission scheme that is greater than a threshold reduction in quality is identified, and it is identified that the live content item is available via a second transmission scheme from a source other than the first transmission scheme. The live content item is received via the second transmission scheme, and the live content item is generated for output.

In an example system, a smart television utilizes an NFL application to receive live content items OTT, in this example, a live Super Bowl game. The smart television receives the live Super Bowl game via an Internet connection, and the smart television displays the live Super Bowl game. A reduction in bandwidth of the Internet connection that is greater than a threshold reduction in quality is identified, and it is identified that the live Super Bowl game is also available via the Fox Sports OTA channel. The smart television tunes to the Fox Sports OTA channel. The smart television receives the live Super Bowl game via the Fox Sports OTA channel, and the smart television displays the live Super Bowl game. In other examples, the smart television may utilize any suitable live television provider application, such as Hulu, YouTube TV and/or Fubo.

In accordance with a second aspect of the disclosure, a method is provided that includes sending a live content item to a plurality of computing devices from a content delivery network and via a bidirectional network. It is identified that a capacity threshold has been reached at the content delivery network, and it is identified that the live content item is available via a unidirectional stream from a first source other than the bidirectional network. A first instruction to receive the live content item from the first source is sent from the content delivery network and to the plurality of computing devices, and the sending of the live content item to at least a first subset of the plurality of computing devices is stopped.

In an example system, a CDN sends a live content item OTT, in this example a live Super Bowl game, to a plurality of smart televisions and smart phones. The CDN utilizes the Internet to send the live Super Bowl game to the plurality of smart televisions and smart phones. Over time, as more people request the live content item from the CDN, the CDN reaches a threshold capacity, for example, based on a number of connections and/or bandwidth capacity. At the CDN, it is identified that the live Super Bowl game is also available via the Fox Sports OTA channel. An instruction to tune to the Fox Sport OTA channel is sent from the CDN to the plurality of smart televisions and smart phones, and the sending of the live Super Bowl game is stopped for at least a subset of the plurality of smart televisions and smart phones, for example for a plurality of the smart televisions.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 19 shows another flowchart of illustrative steps involved in enabling the improved delivery of live content items to a plurality of computing devices, in accordance with some embodiments of the disclosure;

Figure 21:
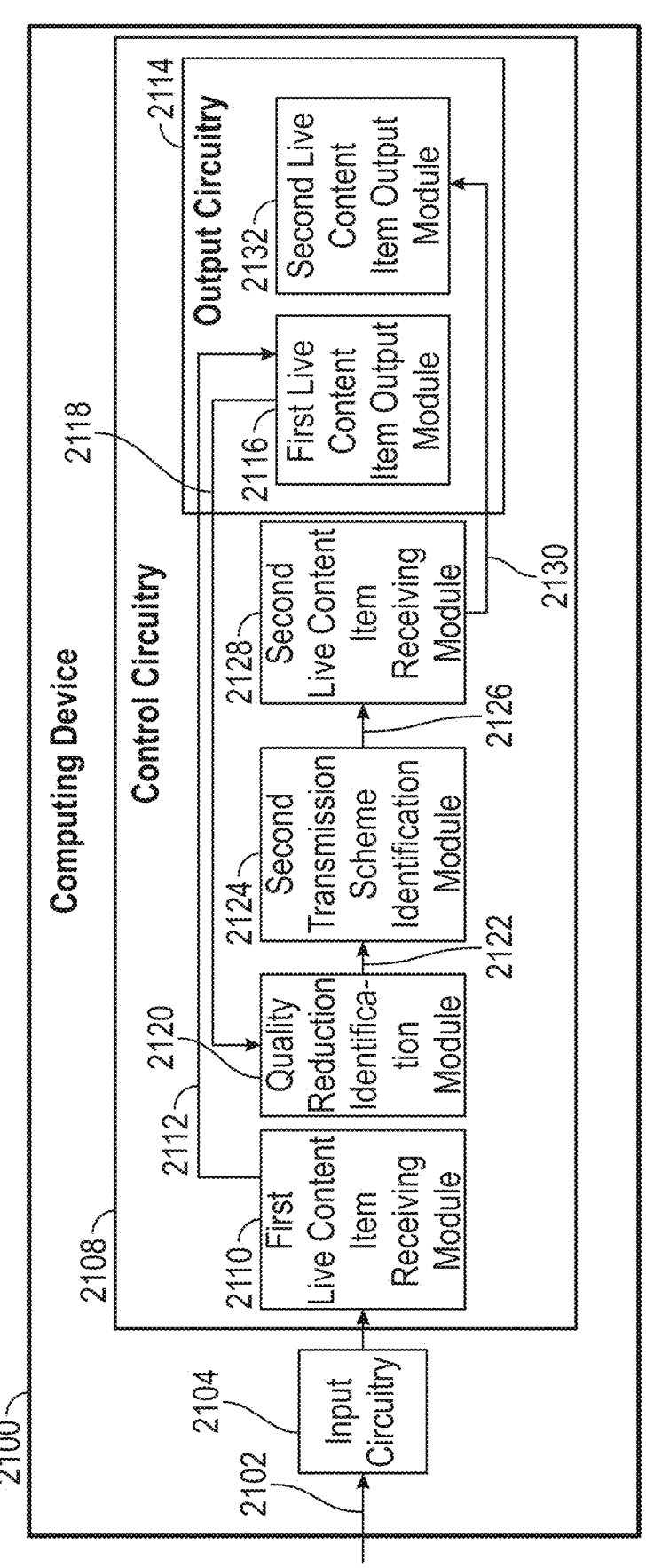
Figure 22:
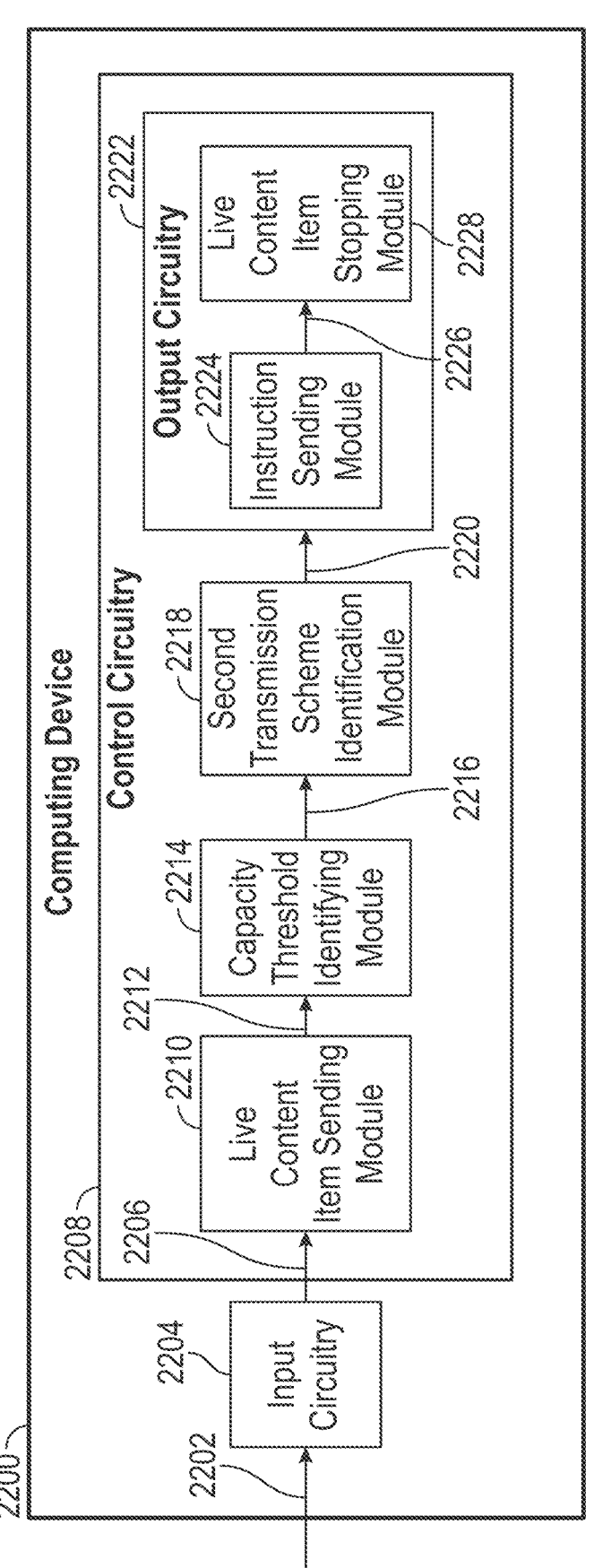

FIG. 21 shows a block diagram representing components of a computing device and dataflow therebetween for enabling the improved delivery of live content items to a plurality of computing devices, in accordance with some embodiments of the disclosure; and FIG. 22 shows another block diagram representing components of a computing device and dataflow therebetween for enabling the improved delivery of live content items to a plurality of computing devices, in accordance with some embodiments of the disclosure.

DETAILED DESCRIPTION

A first transmission scheme is an OTT, streaming and/or video on demand (VOD) transmission scheme. This encompasses transmitting data over a network, such as the Internet, to an application installed on a computing device. The data is typically transmitted in response to a request for the data, such as a GET request, and comprises segments of audio, video and/or subtitle data. One example is the transmission of content item segments that comply with the MPEG DASH standard. An OTT, streaming and/or video on demand service (or platform) may be accessed via a website and/or an app running on a computing device, and the device may receive any type of content item, including live content items and/or on-demand content items. Content items may, for example, be streamed to physical computing devices. In another example, content items may, for example, be streamed to virtual computing devices in, for example, an augmented environment, a virtual environment and/or the metaverse.

A second transmission scheme is any scheme for delivering data to multiple receivers, such as smart televisions, that does not comprise a return channel. It includes, for example, a terrestrial or OTA modulated multiplexed television broadcast that is received at a tuner, such as a television tuner, from a transmitter. The modulated multiplexed television broadcast comprises a grouping of program services as interleaved data packets. Other examples include satellite, cable and/or IPTV modulated multiplexed television broadcasts that are received at a tuner from a respective transmitter.

Video and/or audio components of a content item may be generated for output at a computing device. If the computing device comprises an integral display and/or speakers, the video and/or audio components are respectively displayed and/or played at the computing device. If the computing device is connected to another display, the generating for output comprises outputting the video and/or audio components at an output port of the computing device, such as an HDMI port, lightning port and/or a DisplayPort.

Various embodiments discussed herein use a data and object carousel as a transport mechanism for cyclically broadcasting or repeatedly delivering data in a continuous cycle via a unidirectional stream. Carousels allow data to be pushed from a broadcaster to multiple receivers, such as smart televisions or set-top boxes, by transmitting a data set repeatedly in a standard format. A receiver may tune to the unidirectional stream at any time to receive data, and may reconstitute the received data into a virtual file system. The carousel may therefore be considered as a transport file system or file broadcasting system that enables data files to be transmitted from a broadcaster to multiple receivers or clients simultaneously. The carousel may be defined in a broadcasting specification, such as a digital video broadcasting (DVB) specification, (e.g., the Advanced Television Systems Committee (ATSC) 1.0 standard or the ATSC 3.0 standard). The period of the carousel repeating, the carousel cycle period, determines the maximum time required for a receiver to acquire transmitted data. In some examples, data access time may be reduced, for example for commonly used files, by broadcasting some data more often than others. An individual object carousel may be referred to as a service domain in some specifications. A service domain is a group of related digital storage media command and control (DSM-CC) objects. In broadcast systems, typically there is no difference between an object carousel and a service domain except for the terminology: an object carousel is a service domain, and a service domain is an object carousel. A data and object carousel may also be used in cable networks to deliver software updates and other data to cable set-top boxes and other receivers.

The disclosed methods and systems may be implemented on one or more devices, such as user devices and/or computing devices. As referred to herein, the device can be any device comprising a processor and memory, for example, a handheld computer, a mobile telephone, a portable video player, a portable music player, a portable gaming machine, a smartphone, a smartwatch, a smart speaker, an augmented reality headset, a mixed reality device, a virtual reality device, a gaming console, vehicle infotainment headend or any other computing equipment, wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, USB drive, DVD, CD, media cards, register memory, processor caches, random access memory (RAM) and/or a solid-state drive.

Figure 1:
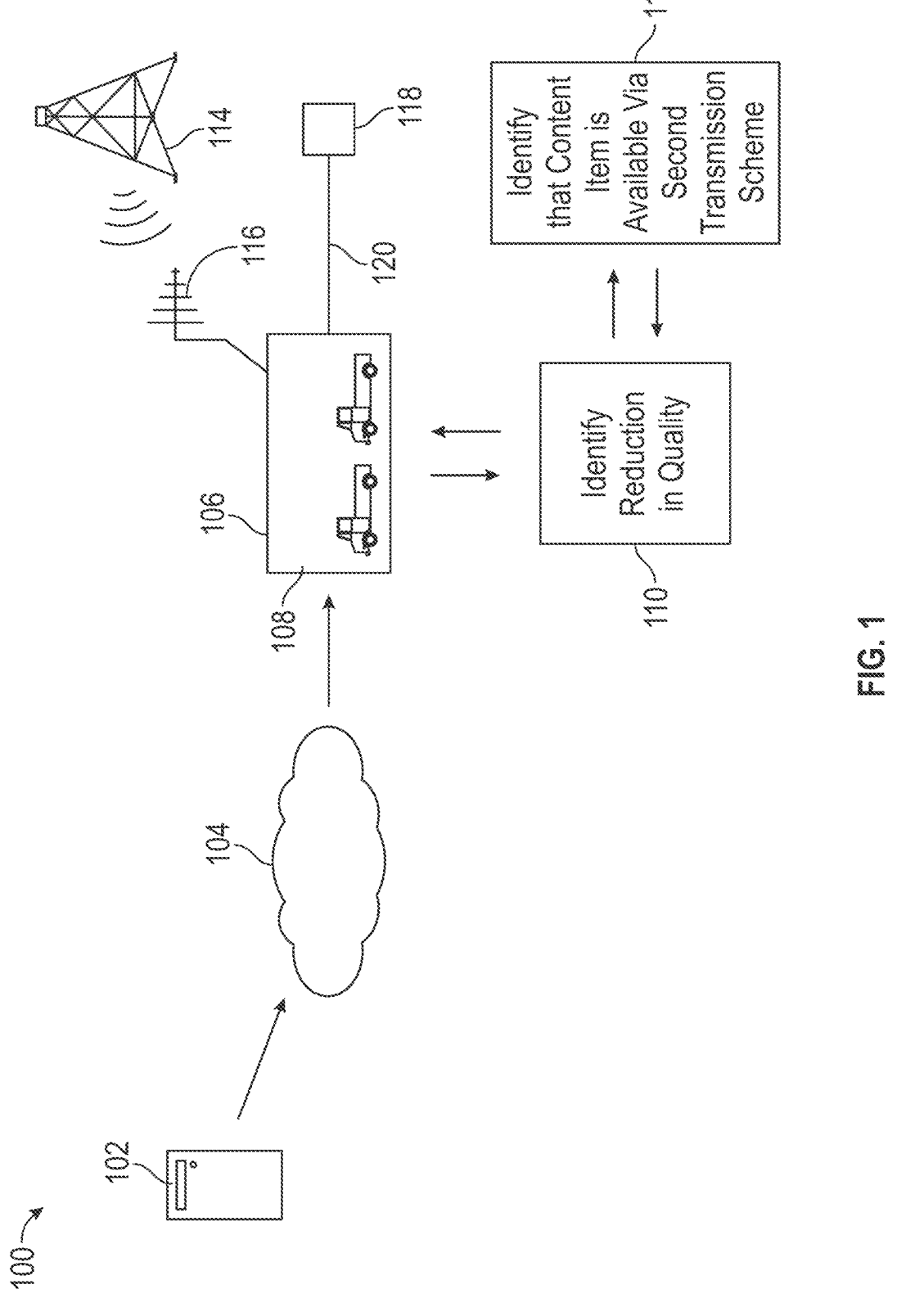
FIG. 1 shows an example environment for enabling the improved delivery of live content items to a plurality of computing devices, in accordance with some embodiments of the disclosure.

FIG. 1 shows an example environment for enabling the improved delivery of live content items to a plurality of computing devices, in accordance with some embodiments of the disclosure. The environment 100 comprises a server 102, a computing device 106, such as a smart television, an OTA transmission source 114, and a cable and/or IPTV transmission source 120. The computing device 106 may be any suitable computing device including, for example, a smartphone and/or a tablet device. In other examples, a computing device 106 may comprise an extended reality headset. A live content item 108, such as a NASCAR race, transmitted from the server 102, via a first transmission scheme. In this example, the first transmission scheme comprises receiving the live content item 108 from a network 104 such as the Internet. The live content item 108 is then received at the computing device 106, where it is generated for output. The network 104 may comprise wired and/or wireless means, and/or one or more local networks, such as a local area network and/or a home network. In some examples, the server 102 is an edge server in a CDN.

At 110, it is identified 110 that there is a reduction in quality of the received live content item 108 that is greater than a threshold reduction in quality. In one example, the threshold reduction in quality may be that the reduction on quality of the received live content item is such that the quality of the received live content item is below that of an OTA broadcast of the same content item. In some examples, an OTA tuner at the computing device may know the resolution and framerate of the OTA broadcast of the same content item, enabling the computing device to compare the quality of the content item being received OTT and the quality of the content item that is available via the OTA broadcast. This would enable the computing device to determine whether the OTT content item or the OTA content item quality is the best. A reduction in quality may comprise a reduction in the bitrate of the received live stream 108, a reduction in the resolution of the received live stream 108, buffering issues at the computing device 106 and/or dropped packets associated with the transmission of the live stream 108. The reduction in quality may be detected at the computing device 106. In other examples (not shown) the computing device 106 may transmit telemetric data, via the network, to the server 102 (or any other physical or virtual server), and the server 102 may identify that there is a reduction in quality, based on the received telemetric data. The telemetric data may comprise data indicating a bitrate of the received live stream 108, a resolution of the live stream 108, an amount that a buffer, such as an application buffer, in the computing device 106 is utilized and/or an indication of a number of dropped packets. The application buffer may be a playback buffer and/or an adaptive bitrate (ABR) player buffer. The identifying the reduction in quality may comprise comparing one or more of the aforementioned factors to a threshold level, and performing any subsequent actions in response to identifying that the factor is above, at, or below a threshold level.

At 112, it is identified that the live content item 108 is available via a second transmission scheme other than the first transmission scheme, such as an OTA broadcast, a cable broadcast and/or an IPTV broadcast. This identification may take place at the computing device 106, at the server 102 and/or at any other physical or virtual server. In some examples, a program guide may be utilized to identify whether the live stream 108 is available via a second transmission stream. This program guide may be received via an OTA, cable and/or IPTV broadcast. In other examples, the program guide may be received via the network 104 from a remote source. In one example, the live content item 108 is available OTA and via cable. The computing device 106 tunes to the appropriate OTA channel, and the live content item 108 is received at the computing device 106 from an OTA transmitter 114 via antenna 116. Alternatively, the computing device 106 tunes to the appropriate cable channel, and the live content item 108 is received at the computing device 106 from a cable transmitter 118 via cable 120. In some examples, the computing device 106 automatically changes the source of the live content item 108 from an OTT source to an OTA, cable and/or IPTV source. In other examples, the computing device 106 may output a user interface comprising one or more selectable user interface elements for initiating the change from the first transmission scheme to the second transmission scheme. In this manner, a live content item can be received at an application via the Internet and, on identifying an issue with the transmission, the live content item can be received via a different source, other than the Internet, thereby enabling the continued consumption of a content item despite, for example, an issue with the available bandwidth for delivering the live content item.

In some examples, supplemental enhancement information (SEI) data may be incorporated into a live broadcast channel to provide user experience metadata information, enabling a manual selection of which content, such as one or more programs, to capture. This SEI data may be delivered ahead of time, enabling a user to select which up and coming content to capture (i.e., store) while consuming a broadcast program, or show. In one example, the SEI data may be MPEG 7 or KLV metadata multiplexed into a stream.

In another example, an application running on a computing device, such as an OTT live content item application running on a smart television may have access to a database, or list, of OTA content that has been consumed at the computing device. The application may keep a history of, for example, consumed channels, programs, program genre and/or ratings of consumed programs. The computing device may receive an MPEG 2 multiprogram transport stream (MP2MPTS), and based on the history, the application may direct the computing device to selectively capture streamed content from the MP2MTS. Each MP2MPTS may be mapped based on, for example, program genre, provider and/or studio.

In a further example, a streamer carousel may stream other programs, such as other episodes of a series that is currently being broadcast, in the MP2MPTS while the broadcast program is being streamed. These programs may be received at the computing device, via an application associated with the programs and stored for later consumption. An example may be that season five, episode five of a series is currently being broadcast, and season five, episodes one to four may be other program streams included in the MP2MPTS.

In an example, an OTA broadcast may be received at the computing device, and may be generated for output at the computing device. There may also be a simultaneous capture of content (i.e., for use with an application associated with the content and stored for later consumption) from the MP2MPTS in progress, and an input associated with changing the channel may be received at the computing device. Tuning away will cause the content to not be fully captured. As such, in response to receiving the input, a user interface element may be generated for output at the computing device, warning that a capture is in progress of additional application related content. In some examples, the user interface element may comprise a selectable user interface element for confirming the channel change, before changing the channel from the current broadcast channel.

In another example, if a live content item, such as a live television program, is being consumed via a live streaming application such as YouTube TV, Hulu, or FuboTV, and an Internet connection is lost, or the quality of service of the Internet connection is poor due to, for example, a lack of Internet bandwidth and/or weather conditions, the application may switch to an OTA television channel, if the live content item is also simultaneously (or substantially simultaneously) being broadcast on the OTA television channel. This switching may occur by receiving an input associated with a generated user interface element comprising a prompt. In another example, this switching may occur automatically (for example, based on an indicated user preference).

In a further example, where a live content item that is being consumed has a relatively high viewership, for example, a live Super Bowl game, or live World Cup soccer tournament match, it may be advantageous to remain within the user experience of an application running on a computing device, such as a smart television, while also receiving the content OTA, in order to reduce the bandwidth and processing power associated with streaming a title, or content, that may be simultaneously consumed by a relatively large number of subscribers. By optimizing the content distribution and storage, using OTA when possible, a streaming system may minimize the energy consumption of data centers required for traditional streaming, thus contributing to energy efficiency and a smaller carbon footprint.

In an example, OTA sources may be integrated within an OTT guide. For example, the OTT guide may highlight any listings, or programs, that are available via OTA. The OTT guide may also, or alternatively, indicate that the program quality may be better from the OTA source. This indication may be based on, for example, a detected bandwidth availability at the computing device and/or or communicated by the computing device. In some examples, this may be communicated before streaming the program.

Figure 2:
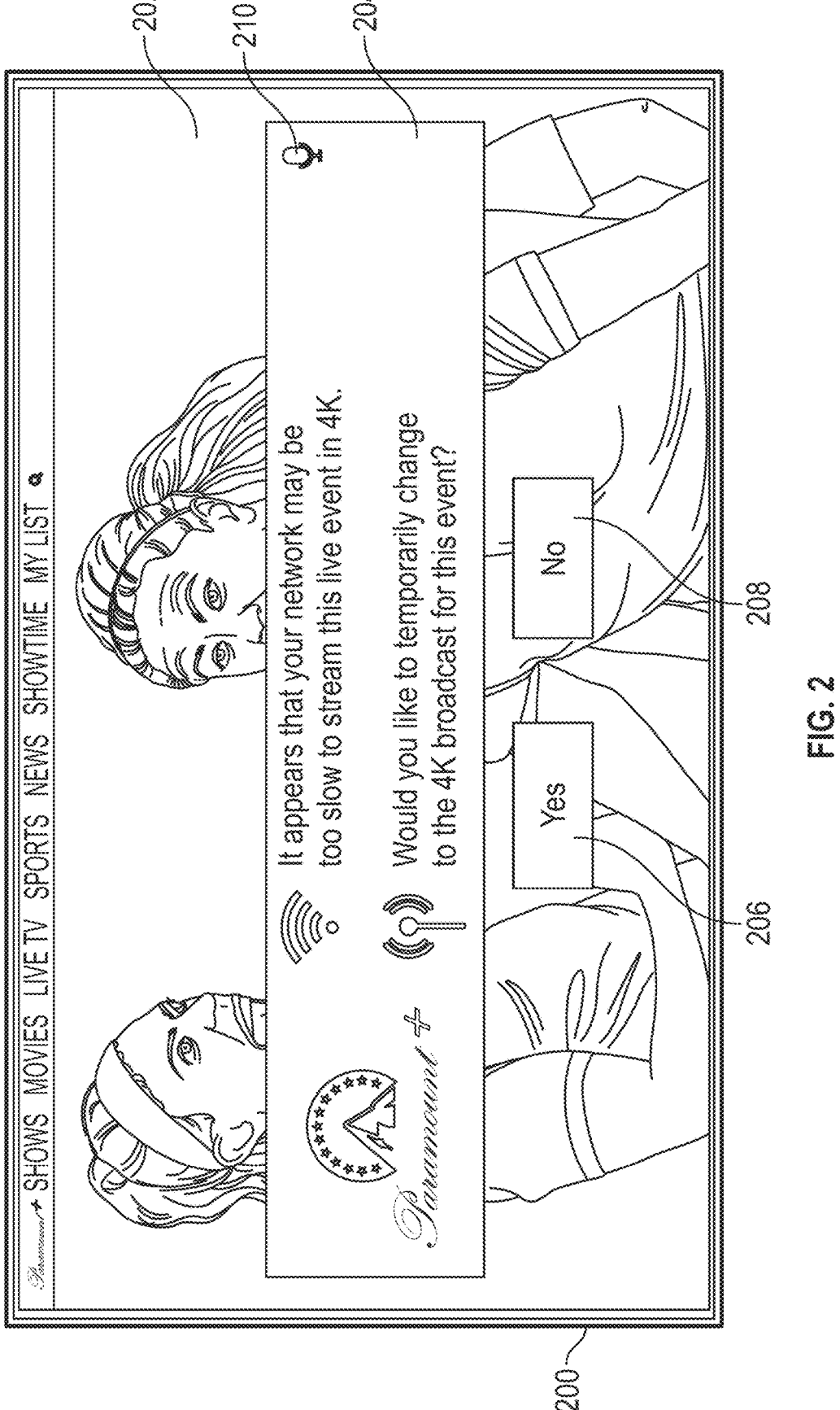
FIG. 2 shows an example user interface for use in enabling the improved delivery of live content items to a plurality of computing devices, in accordance with some embodiments of the disclosure.

FIG. 2 shows an example user interface for use in enabling the improved delivery of live content items to a plurality of computing devices, in accordance with some embodiments of the disclosure. In particular, FIG. 2 is an example of a live television program being consumed via an OTT service provider, with the live program also being available OTA. In this example, the user experiences a poor quality connection, and the user is presented with an option to switch to the OTA feed of the same program.

A computing device 200, such as a smart television, receives a live content item 202 via a first, OTT, transmission scheme and generates it for output. On identifying that the network that is being utilized to deliver the live content item 202 is too slow to stream the live content item 202 in a particular quality, such as 4K, a user interface 204 is generated for output at the computing device 200. The user interface 204 may be generated for output as an overlay. The quality may be a threshold quality, may be identified via a user setting and/or may be identified via an initial selection of the live content item quality. The user interface 204 may comprise a notification indicating the issue, in this example, "It appears that your network may be too slow to stream this Live event in 4K," and a prompt to change the transmission scheme to a second transmission scheme, in this example, "Would you like to temporarily change to the 4K broadcast for this event."

One or more selectable user interface elements may also be generated for output, in this example, two selectable user interface elements are generated for output, a first user interface element 206, "Yes," and a second user interface element 208, "No." On selection of the "Yes" user interface element 206, the computing device 200 may tune to a second transmission scheme, an OTA 4K broadcast of the live content item 202, and generate the received live content item 202 for output. On selection of the "No" user interface element 208, the computing device 200 may continue to receive the live content item 202 via the first transmission scheme, and the output of user interface elements 204, 206, 208 may be discontinued. Additionally, or alternatively, the first and second user interface elements 206, 208, an icon 210, such as a microphone icon, may be generated for output. This icon may indicate that a user can respond verbally to the prompt, via a microphone connected to the computing device 200. A user may response to the prompt by speaking "Yes" or "No."

In an example, a streaming service provider may know a location of, or associated with, a computing device, such as a smart television, that is receiving a live content item OTT. An application at the computing device that a subscriber is logged into, via a user profile, may be in an overlapping market. For example, the computing device may be located on the Georgia/South Carolina border. The computing device may have access to the Atlanta Market and the western SC/NC market via OTA content; however, the streaming service may have locked down the user profile to the Atlanta market by licensing/legal agreements. In this example, a channel guide that also includes the OTA channels that may be received OTA may be made available to a computing device, such as a smart television, and/or an OTT content service provider. This may enable the selection of content that may be blacked out by the live streaming service, but, for example, the application may add the blacked-out content to an application guide, and leverage a tuner of the computing device to tune to that channel OTA.

Figure 3:
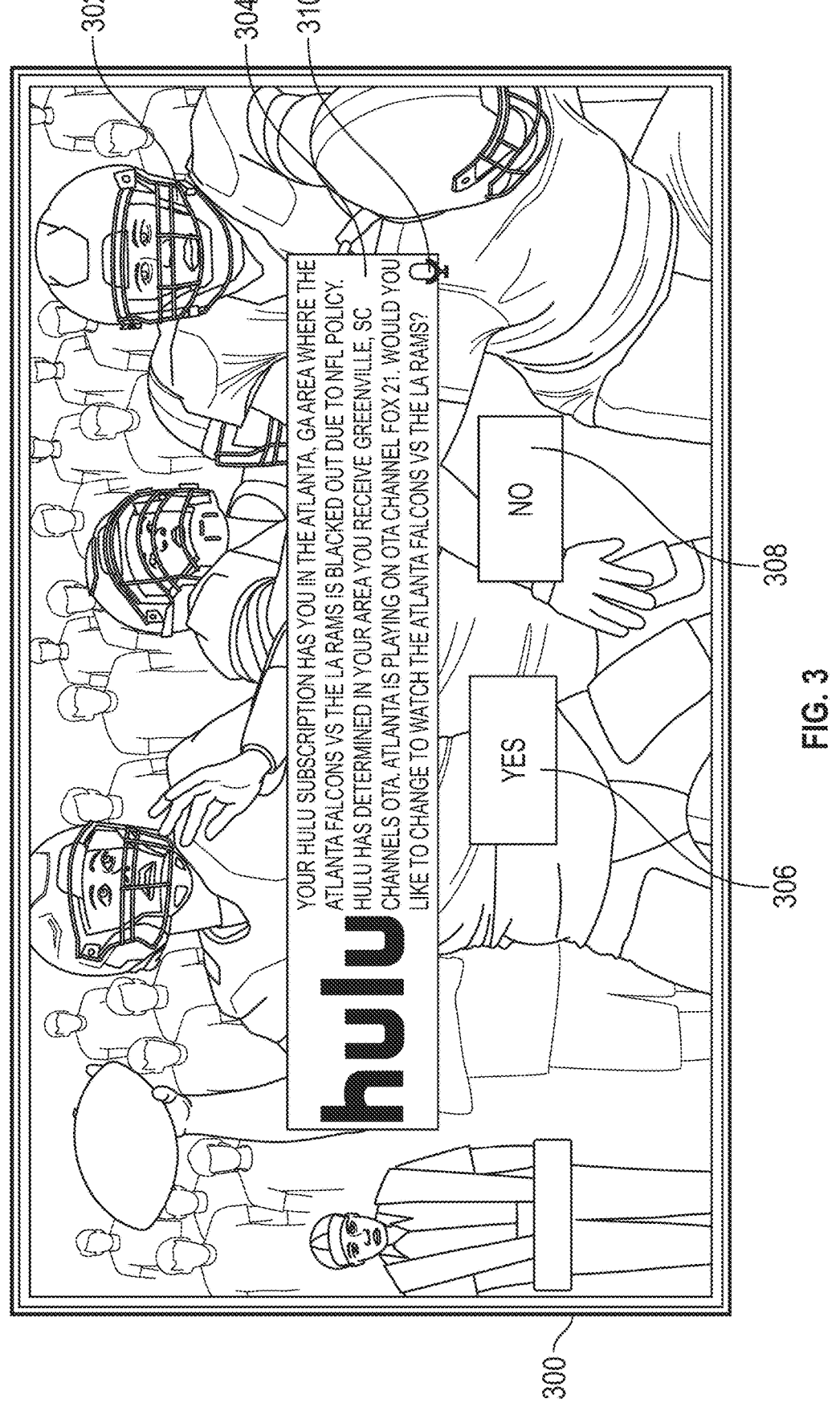
FIG. 3 shows another example user interface for use in enabling the improved delivery of live content items to a plurality of computing devices, in accordance with some embodiments of the disclosure.

FIG. 3 shows another example user interface for use in enabling the improved delivery of live content items to a plurality of computing devices, in accordance with some embodiments of the disclosure. In particular, FIG. 3 is an example where a live service is blacked out OTT because of the region that a computing device, such as a smart television, is located in. In this example, the subscriber may also view the content OTA by another network affiliate. The OTA service affiliate may broadcast the game that is blacked-out by the OTT service. The OTT service may generate a prompt with respect to viewing the blacked-out game via the OTA service. If user input associated with the OTA service is received, the application running on the computing device may change the input source to the tuner, and may tune the channel to the OTA affiliate.

A computing device 300, such as a smart television, receives a live content item 302 via a first, OTT, transmission scheme and generates it for output. On identifying that the first transmission scheme that is being utilized to deliver the live content item 302 is subject to a blackout policy, a user interface 304 is generated for output at the computing device 300. The user interface 304 may be generated for output as an overlay. The user interface 304 may comprise a notification indicating the issue, in this example, "Your Hulu subscription has you in the Atlanta, GA area where the Atlanta Falcons vs the LA Rams is blacked out due to NFL policy," and a prompt to change the transmission scheme to a second transmission scheme, in this example, "Hulu has determined in your area you receive Greenville, SC channels OTA. Atlanta is playing on OTA channel Fox 21. Would you like to change to watch the Atlanta Falcons vs the LA Rams." One or more selectable user interface elements may also be generated for output, in this example, two selectable user interface elements are generated for output, a first user interface element 306, "Yes," and a second user interface element 308, "No." On selection of the "Yes" user interface element 306, the computing device 300 may tune to a second transmission scheme, the OTA channel Fox 21, which is broadcasting the live content item 302, and generate the received live content item 302 for output. On selection of the "No" user interface element 208, the computing device 300 may continue to receive the live content item 302 via the first transmission scheme, and the output of user interface elements 304, 306, 308 may be discontinued. Additionally, or alternatively, the first and second user interface elements 306, 308, an icon 310, such as a microphone icon, may be generated for output. This icon may indicate that a user can respond verbally to the prompt, via a microphone connected to the computing device 300. A user may response to the prompt by speaking "Yes" or "No."

In an example, a computing device, such as a smart television, may receive a MP2MPTS and generate a program for display. When the computing device tunes to a channel, a mini guide is extracted from KLV or MPEG 7 metadata multiplexed into the MP2MPTS, and the mini guide is generated for display at the computing device. The mini guide may enable a selection of programs that are simultaneously carried with the program that is being generated for display at the computing device. These programs may be stored at the computing device for playback via an application on the computing device. Additionally, a broadcaster may signal the availability of future programs that can be stored. On selecting, for example, an episode of a television show, a user interface element enabling the storing all subsequent episodes of the show (whenever available) may be generated for output. In other examples, the user interface element may enable the storing of unviewed episodes, or any episode(s) for a particular season. Preferences associated with the selection may be stored locally on the user device, and may be accessible to a tuner/demux module at the computing device to enable automatic tunning and storing of content. A series recording may be scheduled by creating, for example, "STORE" commands for episodes that might be available via the MP2MPTS at a later time. The storing of the commands may include metadata associated with the show, or program, that is indicated for recording or storing (e.g., unviewed episodes), and the tuner is able to access such commands in order to parse the desired content from the MP2MPTS.

OTT service operators may employ a multi-CDN strategy to enable a better quality of experience. Computing devices that request content may be routed to one of multiple CDNs based on their location and/or based on a round robin approach; however, this does not guarantee an optimal quality of experience, especially when a computing device is receiving a relatively popular broadcast event, such as the Super Bowl where the points of presences on the CDNs are serving thousands of users. In order to address this problem, a computing device may consume the content via an OTA tuner in response to the detection of a consistent drop in quality of service. In some examples, a switch to OTA may occur automatically by tuning to the OTA channel at the computing device, and disconnecting the streaming session.

In some examples, a computing device, and/or a player running at the computing device, may initiate a handoff from a stream received via a CDN to an OTA channel, it is anticipated that an OTA steering service that interfaces with an OTT playback application programming interface (API) service and/or a CDN client routing service may also guide a computing device that requested the OTT stream for a live program to receive the live program via an OTA broadcast instead. In some examples, the switch may be initiated when an OTT buffer is empty, or is draining when receiving an OTT stream of a quality that equal to the quality of the OTA broadcast. The empty, or draining, buffer may indicate a bandwidth issue impacting the quality of the OTT live program. An OTA channel may initially be generated for display in a picture-in-picture (PiP) mode, and then may be displayed in full screen upon termination of the OTT stream by the computing device and/or player. The OTA steering service (e.g., part of the CDN infrastructure) may route the computing device to retrieve the content from an OTA source upon the initial request. This may be enabled via a communication from the computing device indicating its capabilities (e.g., via a User_Agent request header), including that it comprises, or is connected to a device with, a tuner that is capable of retrieving the content.

In an example, a computing device, such as a smart television, may initiate a scan in the background to verify that it had detected OTA channels and it may communicate such information to a steering service. In some examples, this scan may be scheduled periodically. The steering service (in communication with a playback API service) may communicate a data structure (e.g., a manifest) to the computing device with OTA tunning instructions. Such instructions may be parsed locally at the computing device in order to determine, for example, a channel number that the computing devices needs to tune to OTA.

The steering service may maintain a session ID that is associated with the computing device to further assist in executing a channel change, for example. A computing device that was routed by the streaming service to an OTA source may maintain the current state of the client, such that if the client changes the channel and acquires a different stream or channel via OTT, and attempts to return back to the previous channel, then that state (means by which the computing device acquired that first channel) is available. This enables a user to go back to watching the channel via OTA directly, or the request for the previous channel may be re-initiated with the steering service.

The steering service and the OTT player may be aware of the capabilities of computing device (e.g., that a smart television includes an ATSC 3.0 tuner), and can signal the source change in different ways. For example, the source change may be presented as a notification that is generated for output at the computing device, as depicted in FIG. 2, or it may be signaled in a return manifest (e.g., when a new device attempts to watch a live event and a number of supported sessions at the CDN has been exceeded). Such a number may be preset by, for example, an administrator, and the number may change based on, for example, real-time data from an analytics service. In another example, this may be a special redirect, such that when an OTT client device requests a segment to an IP address, the client will receive a redirect to a CDN edge node to receive the segment from a local cache. This new special redirect may include a special new redirect within the URL to indicate a force tune of the tuner vs an http redirect for receiving the segment.

In an example, an OTA stream is only utilized for trick play requests such as rewinds. A rewind, or fast-forward, command may comprise skipping a portion of time in a stream, such as backwards, or forwards, 10 or 30 seconds. This may be accomplished by tuning to the stream via an OTA tuner, and caching a stream, or portion of it, on the computing device (e.g., at an integrated memory, and/or at a USB memory stick) in the background, while the user is consuming the stream via OTT. Any trick play request initiated at the OTT application and/or a player, may result in the retrieving of the content from the cache at the computing device, or a buffer that is associated with the tuner. For example, a request to rewind 5 minutes from the current live frame may issue a command to also rewind through content in the local OTA cache by the same amount. In some examples, a frame-to-frame synchronization between the two streams (OTA and OTT) may not be necessary. For example, analyzing data, such as subtitle data may enable an approximate synchronization to be achieved, without a frame-to-frame synchronization.

In an example, when a computing device, such as a smart television, streams a relatively popular event via an OTT service (e.g., Hulu live), a tuner system at the computing device may automatically search for and finds the corresponding event via OTA. This may enable caching or buffering the content received via the OTA medium to enable live TV control (e.g., trick play) directly from the OTT application. Similarly, the OTT application may signal in the original return manifest to the device, the metadata needed to tune to the event via the tuner. In some examples, the tuner and the OTT application may communicate via local operating system (OS) API calls. In some examples, this may be a special type of redirect performed at the time of the http request.

In another example, a computing device, such as a smart television may be aware of activities on its local area network (LAN) (e.g., it may be aware of a number of other streaming devices), and the computing device may communicate such information to a steering service, and/or via a playback API service. This may enable the steering service to prioritize the source for various streaming sessions. For example, there may be a technical considerations and/or a contractual obligation for the number of streaming sessions that a CDN must maintain before it starts redirecting subscribers to OTA sources. In such case, the steering service may prioritize the switchback to OTA for a computing device once the minimum number of sessions have already been reached. If multiple client devices in the same LAN, such as a home network, are consuming the same live content item via OTT, then a request may be made to force tune all of the computing devices consuming the same live content to switch to OTA.

In a further example, a transfer of a viewing session from an OTT service to OTA may also result in the transfer of personalization data to the OTA service. Personalization data may include whether a computing device has closed captions (or subtitles) turned on, an audio language selection, and/or advertisements that were selected by the OTT service to deliver to the computing device (for example, if known ahead of time). For example, references to the advertisements (e.g., advertisement IDs) may be shared with the OTA session to enable the same advertisement (or a subset of similar advertisements) to be presented by the OTA advertising service. In some examples, ATSC 3.0 may enable advertisements to be served over broadband, and such an advertisement may be requested by the computing device (i.e., client-side advertisement insertion) in response to detecting that an advertisement break is coming up. In one example, programs that are blocked on the OTT service (e.g., via parental control settings) may not be eligible to be shown via OTA. For example, the OTT program guide might not indicate their availability via OTA, and the steering service might simply respond with a "DO NOT TUNE" message to the computing device.

Figure 4:
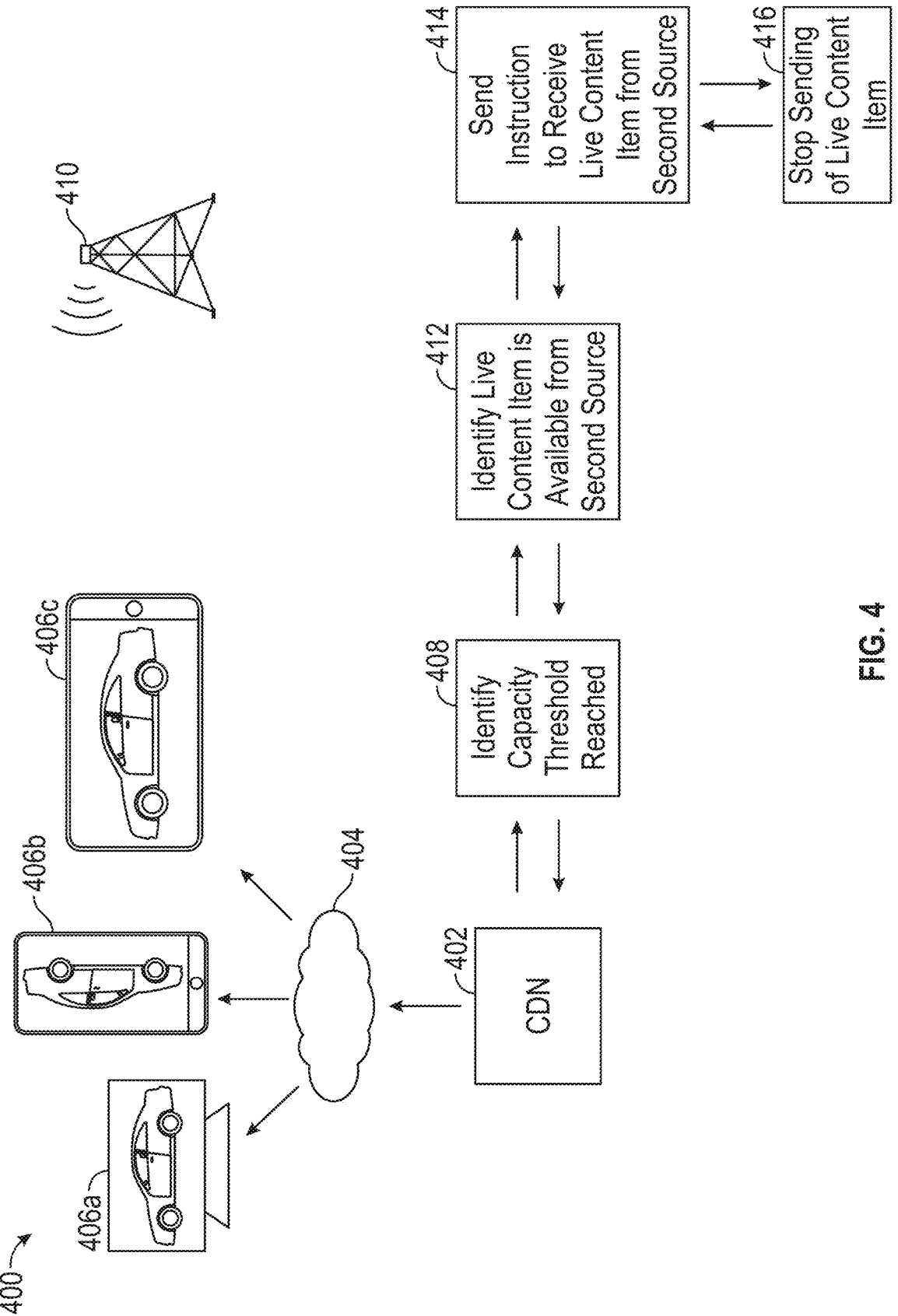
FIG. 4 shows another example environment for enabling the improved delivery of live content items to a plurality of computing devices, in accordance with some embodiments of the disclosure.

FIG. 4 shows another example environment for enabling the improved delivery of live content items to a plurality of computing devices, in accordance with some embodiments of the disclosure. The environment 400 comprises a CDN 402 connected, via a network 404, to a plurality of computing devices 406a, 406b, 406c, and an OTA transmitter 410. A live content item, such as a NASCAR race, is transmitted from the CDN 402 via a first transmission scheme, in this example, via the network 404, such as the Internet, to the plurality of computing devices 406a, 406b, 406c. The plurality of computing devices 406a, 406b, 406c may be any suitable computing device including, for example, a smart television, a smartphone and/or a tablet device. In other examples, a computing device may comprise an extended reality headset. At 408, it is identified that a capacity threshold of the CDN has been reached. For example, this might be a bandwidth capacity of the CDN, a number of connections capacity (i.e., too many computing devices 406 are requesting the live content item) of the CDN and/or a processing capacity of the CDN. At 412, it is identified that the live content item is available from a first source via a second transmission scheme, other than the first transmission scheme, such as an OTA broadcast, a cable broadcast and/or an IPTV broadcast. In some examples, a program guide may be utilized to identify whether the live stream is available via a second transmission stream. At 414, an instruction to receive the live content item from the first source, via the second transmission scheme, is sent to at least a subset of the plurality of computing devices 406, and at 416 the CDN stops sending the live content item to at least a first subset of the plurality of computing devices. The subset of computing devices 406 that received the instruction may tune to the appropriate OTA channel, and the live content item may be received at those computing devices 406 from the OTA transmitter 410.

Figure 5:
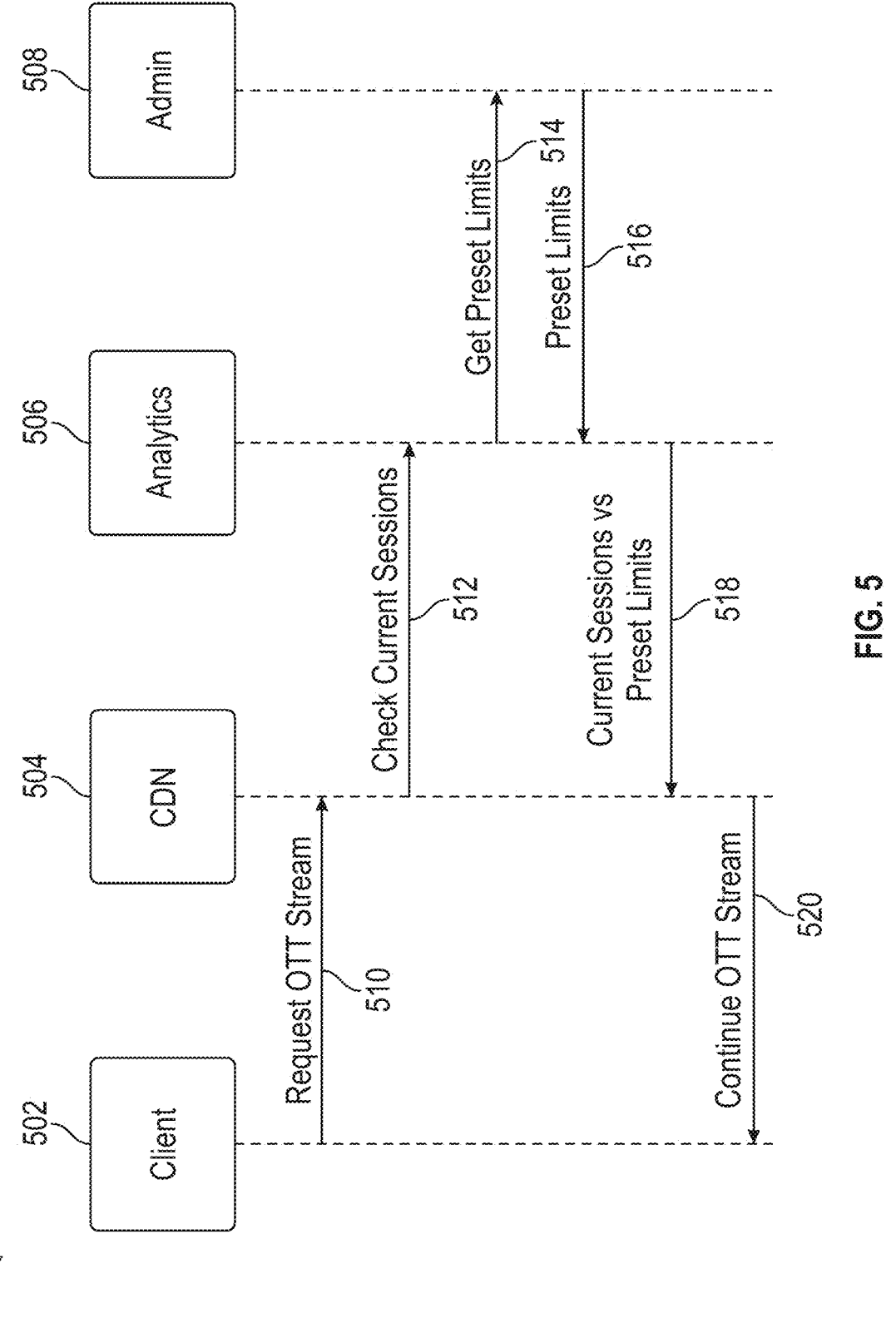
FIG. 5 shows a sequence of illustrative steps involved in a normal operation of a CDN.

FIG. 5 shows a sequence of illustrative steps involved in a normal operation of a CDN. In this example, a capacity threshold of a CDN is not reached, so it illustrates normal operation of the CDN. The sequence 500 comprises a client 502, a CDN 504, an analytics module 506 and an admin module 508. The client 502 may be any suitable computing device, such as a smart television, and may represent a plurality of clients, or computing, devices. At 510, a request for an OTT stream (i.e., a live content item) is transmitted from the client 502 to the CDN 504. At 512, a request to check the current sessions open at the CDN 504 is transmitted from the CDN 504 to the analytics module 506. At 514, the analytics module 506 transmits a request to get the preset limits from the admin module 508. At 516, the admin module 508 transmits the preset limits to the analytics module 506. The analytics module 506 compares the current sessions open at the CDN 504 to the received preset limits. In this example, the current sessions open at the CDN 504 are within the preset limits, and, at 518, the analytics module transmits an indication that the current sessions open at the CDN 504 are within the preset limits to the CDN 504. At 520, the CDN 504 continues to stream the OTT content (i.e., the live content item) to the client 502.

Figure 6:
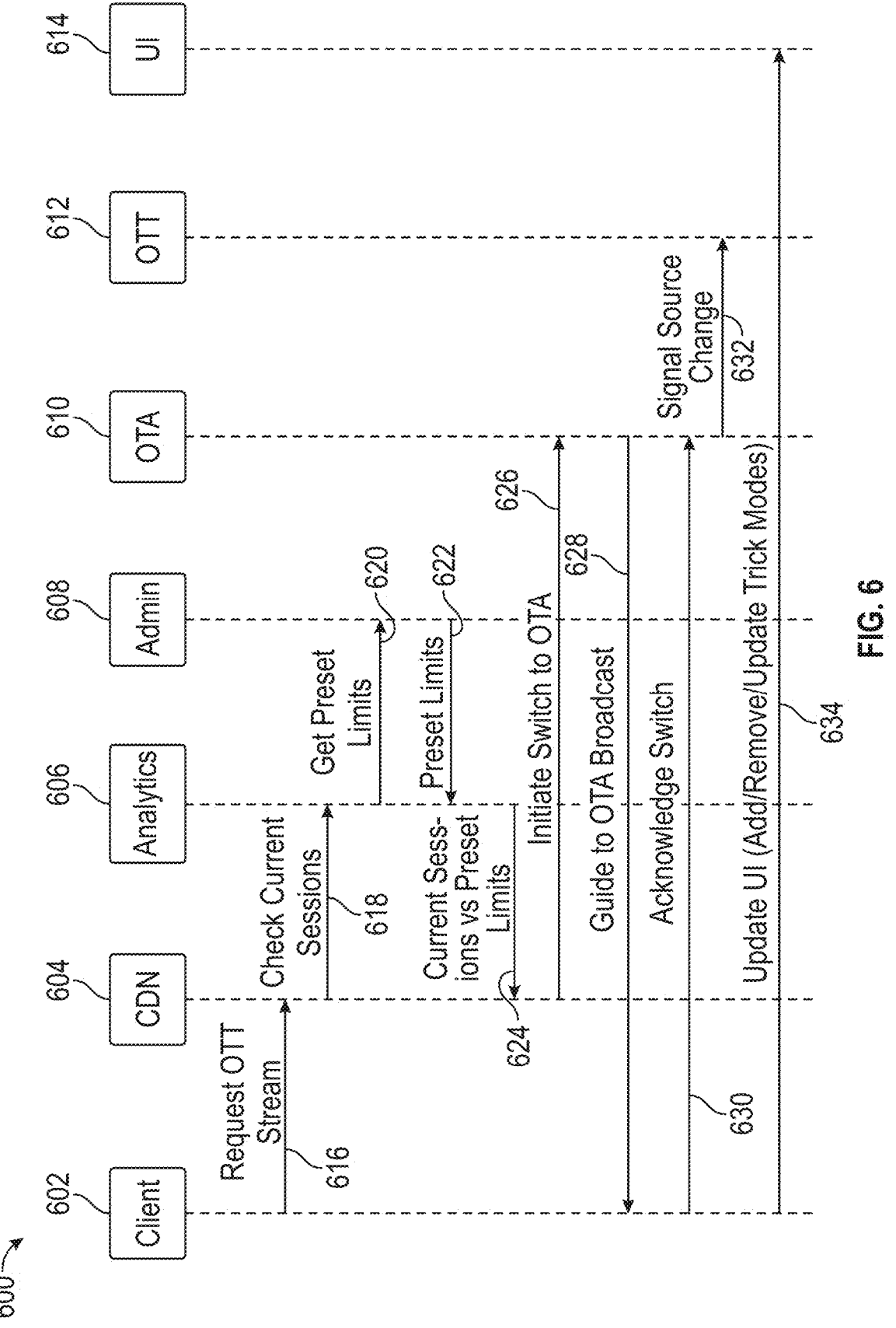
FIG. 6 shows another sequence of illustrative steps involved in enabling the improved delivery of live content items to a plurality of computing devices, in accordance with some embodiments of the disclosure.

FIG. 6 shows another sequence of illustrative steps involved in enabling the improved delivery of live content items to a plurality of computing devices, in accordance with some embodiments of the disclosure. The sequence 600 comprises a client 602, a CDN 604, an analytics module 606, an admin module 608, an OTA module 610, an OTT module 612 and a user interface (UI) module 614. The client 602 may be any suitable computing device, such as a smart television, and may represent a plurality of clients, or computing, devices. At 616, a request for an OTT stream (i.e., a live content item) is transmitted from the client 602 to the CDN 604. At 618, a request to check the current sessions open at the CDN 604 is transmitted from the CDN 604 to the analytics module 606. At 620, the analytics module 606 transmits a request to get the preset limits from the admin module 608. At 622, the admin module 608 transmits the preset limits to the analytics module 606. The analytics module 606 compares the current sessions open at the CDN 604 to the received preset limits. In this example, the current sessions open at the CDN 604 are exceed the preset limits, and, at 624, the analytics module transmits an indication that the current sessions open at the CDN 604 exceed the preset limits to the CDN 604. At 626, the CDN 604 transmits an indication to initiate a switch to OTA to the OTA module 610. At 628, the OTA module 610 transmits a guide to the OTA broadcast to the client 602. At 630, the client 602 transmits an acknowledgement of the switch to the OTA module 610. At 632, the OTA module transmits a signal source change to the OTT module 612. At 634, the client 602 transmits a UI update request to the UI module 614, which may, for example, add, remove and/or update available trick modes.

Figure 7:
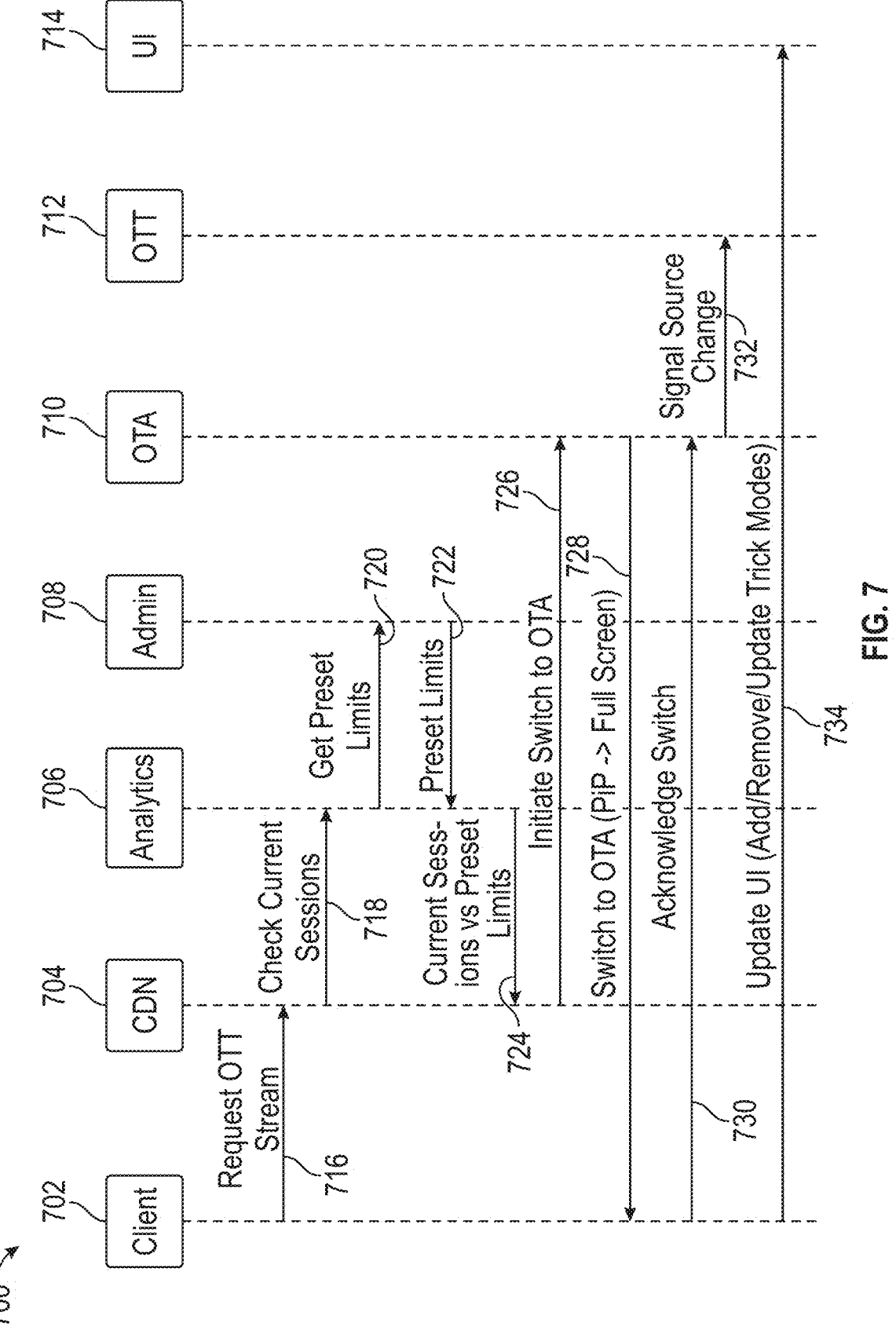
FIG. 7 shows another sequence of illustrative steps involved in enabling the improved delivery of live content items to a plurality of computing devices, in accordance with some embodiments of the disclosure.

FIG. 7 shows another sequence of illustrative steps involved in enabling the improved delivery of live content items to a plurality of computing devices, in accordance with some embodiments of the disclosure. The sequence 700 comprises a client 702, a CDN 704, an analytics module 706, an admin module 708, an OTA module 710, an OTT module 712 and a user interface (UI) module 714. The client 702 may be any suitable computing device, such as a smart television, and may represent a plurality of clients, or computing, devices. At 716, a request for an OTT stream (i.e., a live content item) is transmitted from the client 702 to the CDN 704. At 718, a request to check the current sessions open at the CDN 704 is transmitted from the CDN 704 to the analytics module 706. At 720, the analytics module 706 transmits a request to get the preset limits from the admin module 708. At 722, the admin module 708 transmits the preset limits to the analytics module 706. The analytics module 706 compares the current sessions open at the CDN 704 to the received preset limits. In this example, the current sessions open at the CDN 704 are exceed the preset limits, and, at 724, the analytics module transmits an indication that the current sessions open at the CDN 704 exceed the preset limits to the CDN 704. At 726, the CDN 704 transmits an indication to initiate a switch to OTA to the OTA module 710. The OTA module 710 identifies that the quality at which the OTT stream is being delivered is below the quality of an OTA broadcast, and at 728, the OTA module 710 transmits indication to switch to the OTA source to the client 702. The switch to the OTA source comprises switching from a PiP mode to a full screen mode. At 730, the client 702 transmits an acknowledgement of the switch to the OTA module 710. At 732, the OTA module transmits a signal source change to the OTT module 712. At 734, the client 702 transmits a UI update request to the UI module 714, which may, for example, add, remove and/or update available trick modes.

Figure 8:
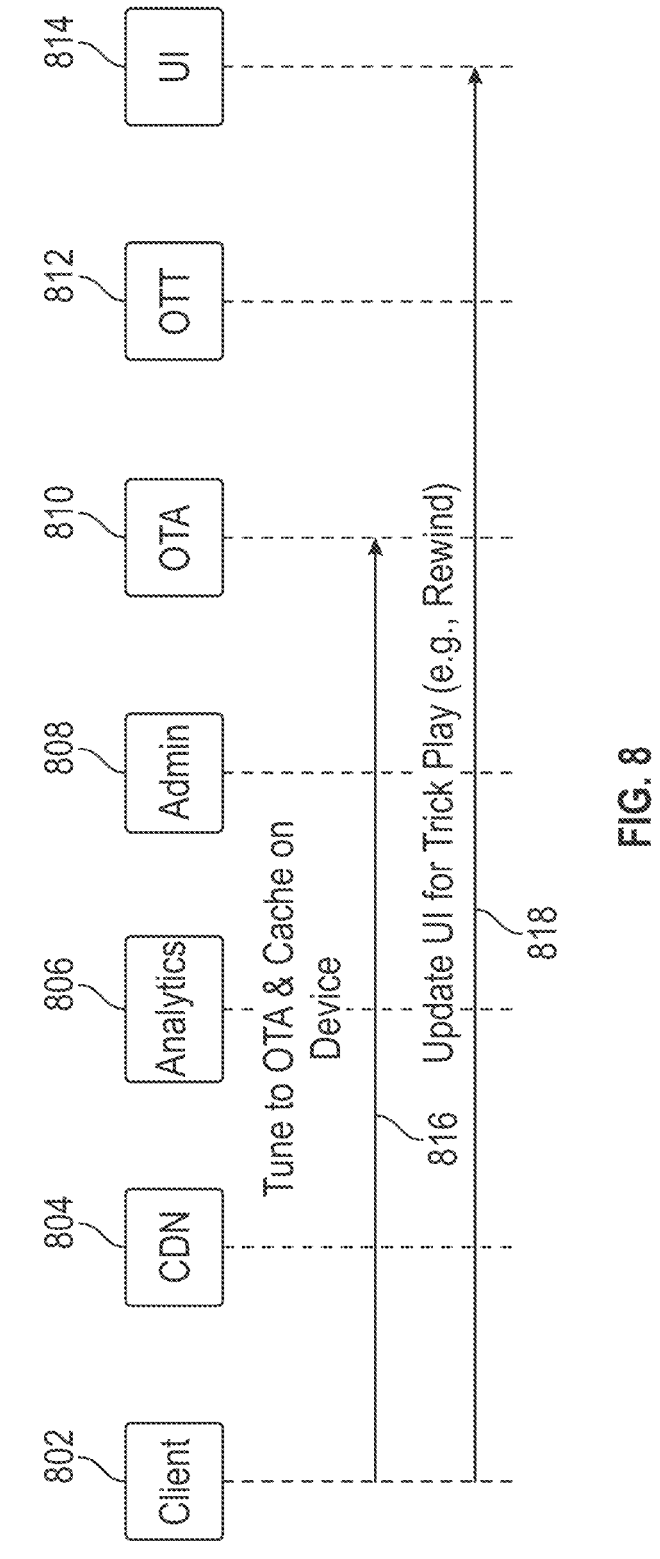
FIG. 8 shows another sequence of illustrative steps involved in enabling the improved delivery of live content items to a plurality of computing devices, in accordance with some embodiments of the disclosure.

FIG. 8 shows another sequence of illustrative steps involved in enabling the improved delivery of live content items to a plurality of computing devices, in accordance with some embodiments of the disclosure. The sequence 800 comprises a client 802, a CDN 804, an analytics module 806, an admin module 808, an OTA module 810, an OTT module 812 and a user interface (UI) module 814. The client 802 may be any suitable computing device, such as a smart television. On receiving an input at the client 802 for a trick play request, at 816 a request to tune to the OTA channel and utilize a cache on the client 802 is transmitted to the OTA module 810 from the client 802. At 818, a request to update the UI for trick play is also transmitted from the client 802 to the UI module 814.

Figure 9:
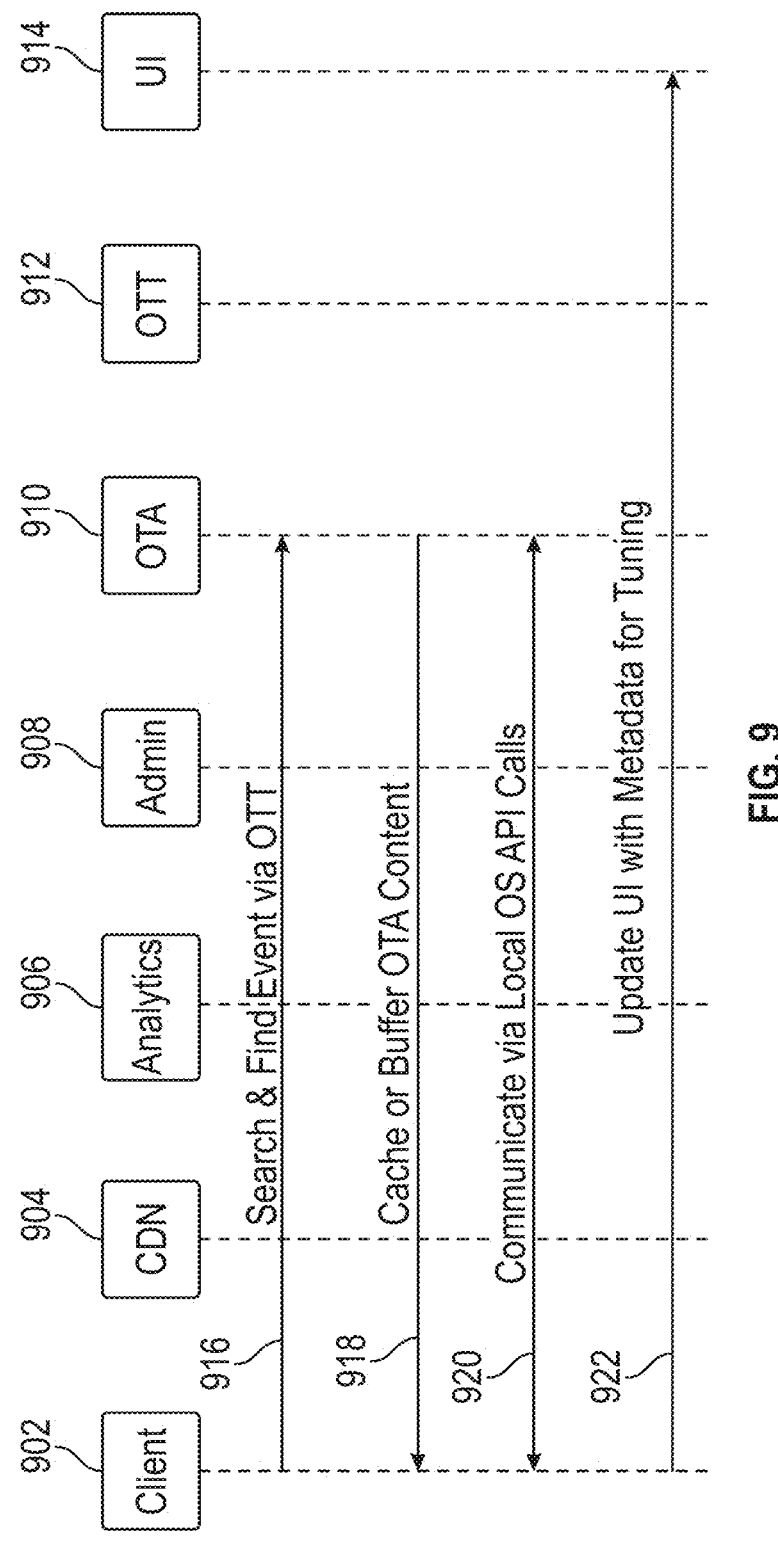
FIG. 9 shows a sequence of illustrative steps involved in enabling the improved delivery of live content items to a plurality of computing devices, in accordance with some embodiments of the disclosure.

FIG. 9 shows another sequence of illustrative steps involved in enabling the improved delivery of live content items to a plurality of computing devices, in accordance with some embodiments of the disclosure. The sequence 900 comprises a client 902, a CDN 904, an analytics module 906, an admin module 908, an OTA module 910, an OTT module 912 and a user interface (UI) module 914. The client 902 may be any suitable computing device, such as a smart television. Input associated with requesting a live content item via OTT is received at the client 902. In this example, the live content item is a relatively popular live content item, with a relatively large number of consumers. At 916, a request to search and find an event via an OTT application is transmitted to the OTA module 910. At 918, an instruction to cache or buffer OTA content is transmitted from the OTA module 914 to the client 902. At 920, the client 902 and the OTA module 910 communicate via local OS API calls. At 902, the client transmits a request to update the UI with metadata for tuning to the UI module 914.

Figure 10:
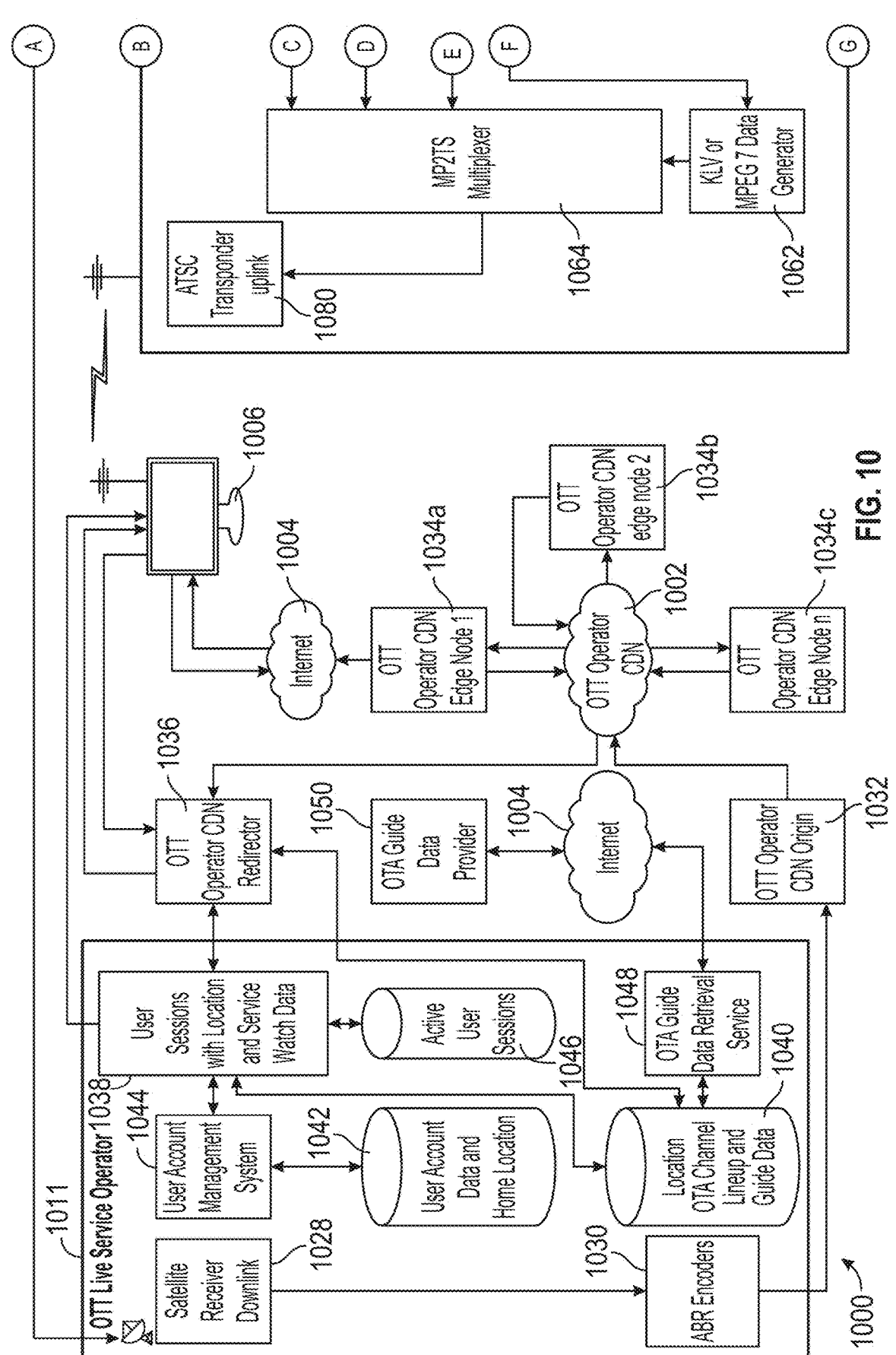
FIG. 10 shows another example environment for enabling the improved delivery of live content items to a plurality of computing devices, in accordance with some embodiments of the disclosure.
Figure 10:
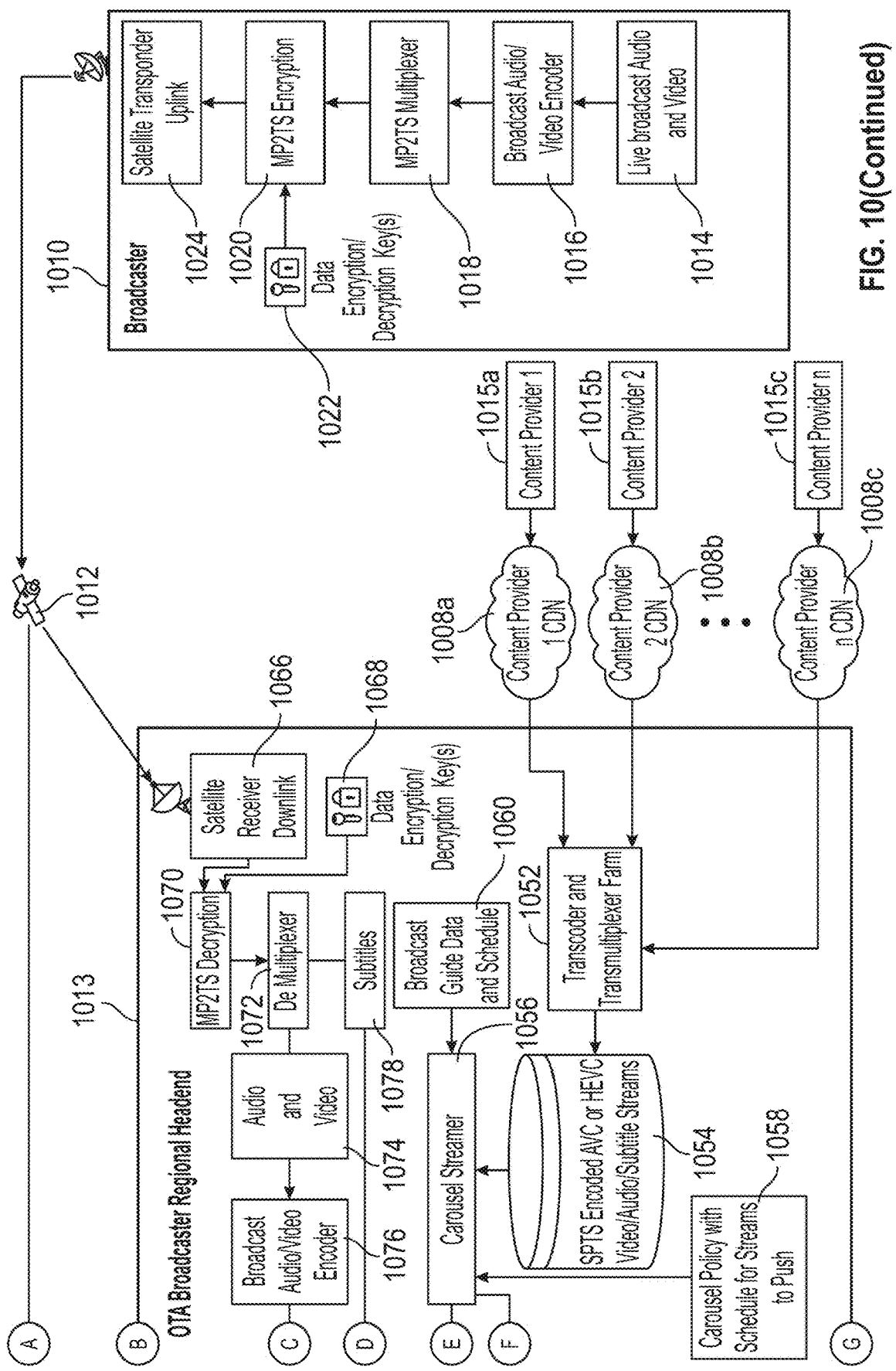

FIG. 10 shows another example environment for enabling the improved delivery of live content items to a plurality of computing devices, in accordance with some embodiments of the disclosure. FIG. 10 is an example system diagram for a cloud OTT live streaming provider to enable redirection from a CDN based on CDN load. This architecture also enables a CDN redirector from the OTT service provider CDN to return a force tune in the redirect response, based on CDN load. The redirection may also happen when the network quality of service is poor to the computing device. The CDN redirector may make the decision to force tune the computing device based on the bitrate and/or quality of the segments that the computing device is requesting. In some examples, the computing device may also perform the OTA tune. The environment 1000 comprises an example system for an OTT live streaming provider, such as a cloud provider, including redirection from a CDN based on CDN load.

The environment 1000 comprises a CDN operator 1002 connected, via a network 1004, such as the Internet, to a computing device 1006, such as a smart television. The environment 1000 also comprises a plurality of CDNs 1008a-1008c, a broadcaster 1010, a satellite transmitter 1012, and an OTA broadcaster regional headend 1013. The broadcaster receives live broadcast audio and/or video, which is transmitted via the satellite transmitter 1012 and to an OTT live service operator 1011. A plurality of content providers 1015a-1015c transmit application content, such as VOD content, to the CDNs 1008a-1008c. The application content is transmitted from the CDNs 1008a-1008c to the OTA broadcaster regional headend 1013.

At the broadcaster 1010, one or more audio and video streams 1014 of one or more programs, such as live broadcast programs, are received, and they are transmitted to the broadcast audio/video encoder 1016, where they are encoded. The encoded audio and video streams are transmitted to an MPEG 2 transport stream (MP2TS) multiplexer 1018, where they are multiplexed. The multiplexed MP2TS is transmitted to an MP2TS encryptor 1020, which receives encryption keys 1022 and encrypts the multiplexed MP2TS. The encrypted MP2TS is transmitted to a satellite transponder uplink 1024, where it is transmitted from the broadcaster 1010 and is received by the satellite 1012. The encrypted MP2TS, and the audio and/or video transmission keys are transmitted from the satellite 1012 and is received at the OTT live service operator 1011 satellite receiver downlink 1028 and a satellite receiver downlink 1066 at the OTA broadcaster regional headend 1013.

The satellite receiver downlink 1028 transmits the incoming live content item(s) to one or more ABR encoders 1030, which encode the incoming live content item(s) to multiple bitrates, segment the live content item(s) and generate one or more manifest files. The segments and manifest file are transmitted to an OTT operator CDN origin 1032. The segments and manifest file are then transmitted to the OTT operator CDN and then to the OTT operator CDN edge nodes 1034a-1034c. The segments and manifest file are transmitted from an edge node 1034, via the network 1004, to the computing device 1006, where they are generated for output. The OTT operator CDN director 1036 receives node load data from the OTT operator CDN, as well as requests for OTT content and OTA channel availability from the computing device 1006. The OTT operator CDN redirector also communicates with the user sessions module 1038. This comprises communicating about individual sessions, OTA availability for a particular session ID, sessions for a same service at the same location (via a user ID). The user module 1038 receives OTA guide data for a user session(s) and a user location(s) via a location OTA channel lineup and guide data database 1040. This database 1040 is populated via an OTA guide data retrieval service 1048, which retrieves guide data via the network 1004 from an OTA guide data provider 1050. The user sessions module 1038 also communicates with a user account management system 1044 to identify the availability of OTA channels by location. This user account management system 1044 queries a user account data and home location database 1042 to provide this information. The user session module 1038 also keeps track of the active user sessions by querying an active user sessions database 1046.

The computing device 1006 may issue a redirected live ABR segment request, with a session ID, to the OTT operator CDN edge node 1034 that it is connected to. The computing device 1006 may also receive a live ABR segment http redirect to CDN edge, with a session ID, or a redirect to an OTA channel service from the OTT operator CDN redirector 1036. The computing device 1006 may also communicate with the OTT operator CDN redirector 1036 with respect to OTA channel availability, requesting the status of any relevant OTA channels and receiving a response. The computing device 1006 may also transmit a live ABR segment request, with a session ID and a device information to the OTT operator CDN redirector 1036.

At the OTA broadcaster regional headend 1013, a transcoder and transmultiplexer farm 1052 receives the application content from the content provider CDNs 1008a-1008c, where the application content is transcoded and multiplexed. The transcoded and multiplexed content is transmitted and stored in a data store 1054. The encoded and multiplexed application content is transmitted to a carousel streamer 1056, where it is added to a carousel as defined by a carousel policy with a schedule for streams to push 1058. The carousel streamer 1056 also receives broadcast guide data and a schedule 1060. The carousel streamer transmits SPTS audio and/or video streams, content data for SEI messages and discontinuity triggers to an MP2TS multiplexer 1064. Metadata for the packet identifier (PID) of each stream is transmitted to a key length value (KLV) or MPEG 7 data generator 1062. The KLV or MPEG 7 metadata is transmitted to the MP2TS multiplexer 1064.

At the OTA broadcaster regional headend 1013, a satellite receiver downlink 1066 receives the encrypted MP2TS from the satellite 1012 and decrypts 1070 the stream with data decryption keys 1068. The decrypted MP2TS is demultiplexed at a demultiplexer 1072, and demultiplexed audio and video streams 1074 are transmitted to an encoder 1076, where they are encoded and are subsequently transmitted to the MP2TS multiplexer 1064. Any demultiplexed subtitle stream 1078 are transmitted from the demultiplexer 1072 to the MP2TS multiplexer 1064. At the MP2TS multiplexer 1064, the audio, video and any subtitle streams are multiplexed into an MP2TS. The MP2TS, including the KLV or MPEG 7 metadata, is transmitted to an ATSC transponder uplink 1080 where it is broadcast. The broadcast is received at a tuner of the computing device 1006, where it is demultiplexed, and the audio, video and any subtitles may be output at the computing device 1006.

Figure 11:
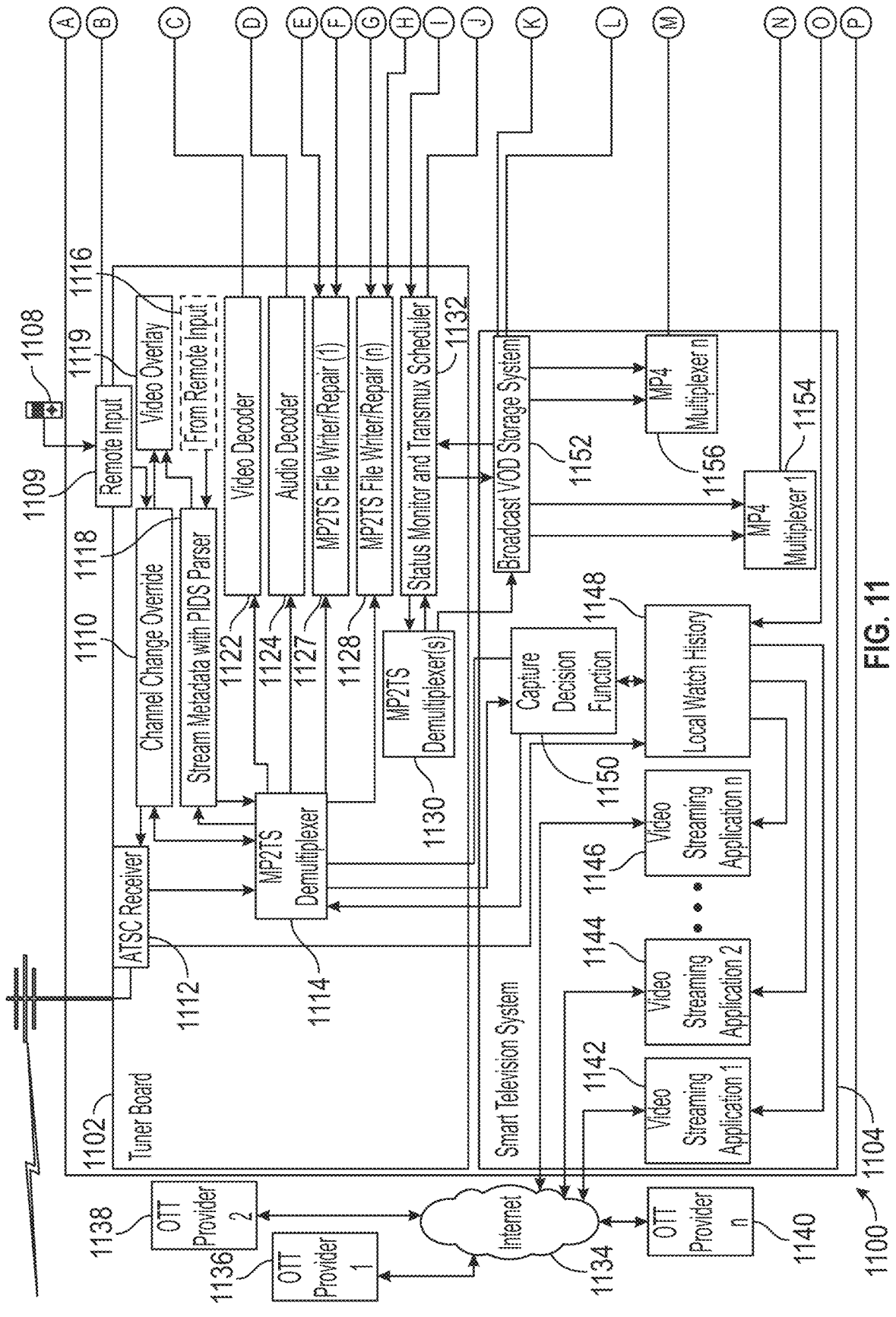
FIG. 11 shows another example environment for enabling the improved delivery of live content items to a plurality of computing devices, in accordance with some embodiments of the disclosure.
Figure 11:
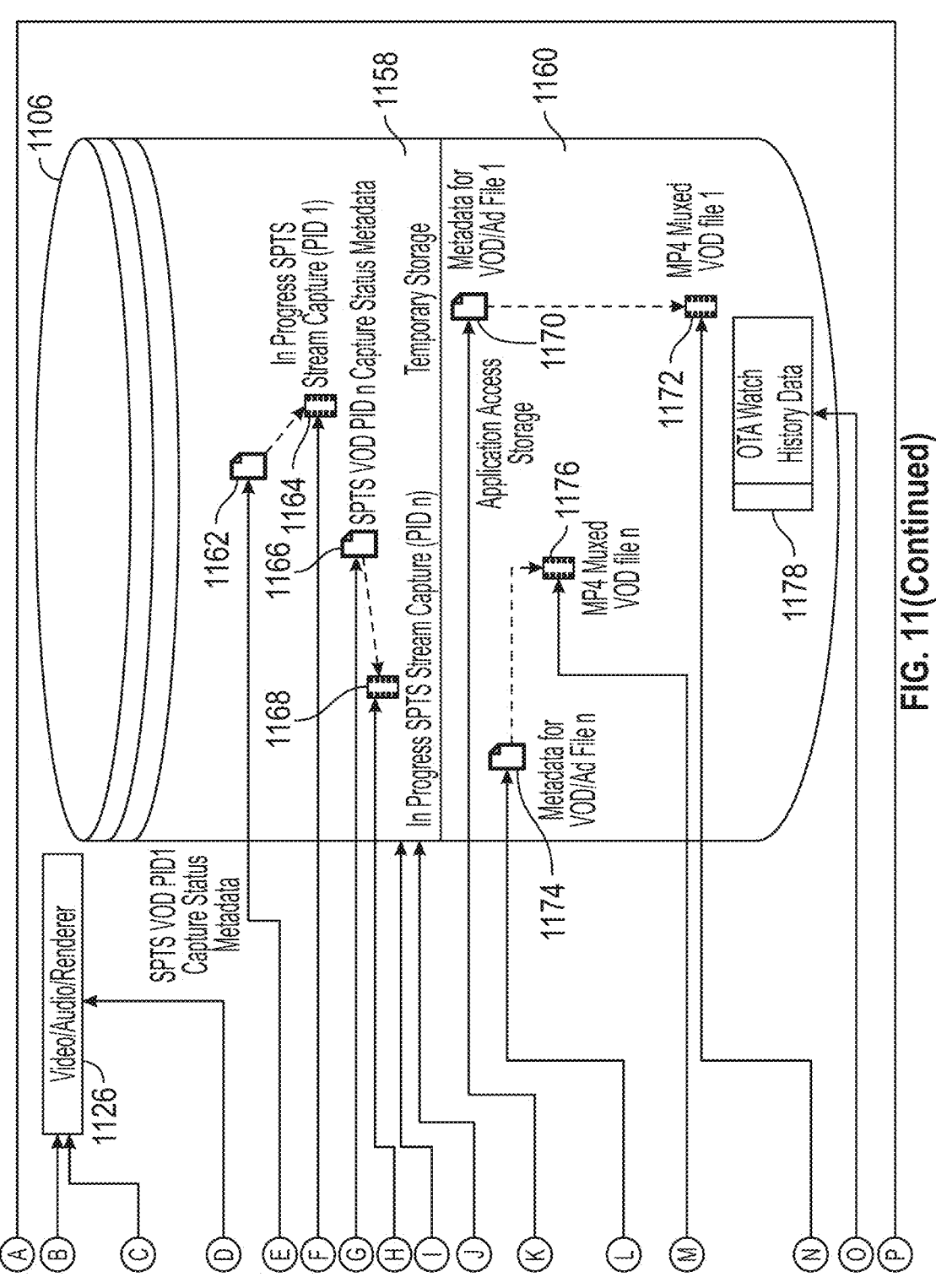

FIG. 11 shows another example environment for enabling the improved delivery of live content items to a plurality of computing devices, in accordance with some embodiments of the disclosure. FIG. 11 is an example system diagram comprising a computing device and an OTT application. This system diagram enables the provision of user experience for examples where a channel change is intercepted, and when additional content is being captured. Confirmation input with respect to the channel change may also be requested. This system also enables a list of shows to capture at a computing device to be generated for output, enabling a selection of which content to capture. This system enables the automatic determining of which content to capture, based on a viewing history for live OTA content, and application specific content that has been previously captured OTA. A viewing history from the OTT app may be utilized to determine a level of interest in particular streams related to applications being distributed via OTA in an MP2MPTS.The environment 1100 comprises a computing device running an OTT application.

The environment 1100 comprises a tuner board 1102; a computing device system 1104, in this example, a smart television system; storage 1106; a remote control 1108; and a plurality of OTT providers 1136, 1138, 1140. An input, such as a channel change request, is received at the remote input 1109 from the remote control 1108. The channel change request is transmitted to the channel change override module 1110, and a frequency change request is transmitted to the ATSC receiver 1112, which changes the channel. A broadcast signal comprising an MP2TS is received via an antenna of the computing device and is transmitted to an ATSC receiver 1112 of the tuner board 1102. The received MP2TS is transmitted from the ATSC receiver 1112 to a first MP2TS demultiplexer 1114, where it is demultiplexed into elementary audio, video and application content streams. In addition, the MP2TS demultiplexer 1114 receives a capture status request/response request from the chancel change override module 1110. Remote input 1116 is transmitted to a stream metadata with PIDs parser module 1118, which also receives metadata for each MP2MPTS from the MP2TS demultiplexer. The video overlay module 1119 receives a channel change confirmation message from the channel change override module 1110, and an available shows message from the stream metadata with PIDs parser 1118.

The demultiplexed video stream, or streams, is transmitted from the first MPT2TS demultiplexer 1114 to a video decoder 1122; the audio stream, or streams, is transmitted to an audio decoder 1124; and any application content stream (i.e., data for use by an application running on the computing device 1104), or streams, is transmitted to an MP2TS file writer/repairer 1127. In the case of multiple application content streams, one or more additional MP2TS file writer/repairers 1128 may be utilized. The tuner board 1102 also comprises one or more additional MP2TS demultiplexers 1130 and a status monitor and transmux scheduler 1132. The decoded video and audio are transmitted from the respective decoders 1122, 1124 to a video and audio renderer 1126 along with a video overlay message from the video overlay module 1119, where the video and audio streams of a program, and the overlay, are rendered for output (e.g., a live broadcast stream for user viewing for a channel). The status monitor and transmux scheduler reads and writes application content data to the storage 1106, and transmits streams to an additional MP2TS demultiplexer 1130, where they are demultiplexed. The demultiplexed streams are transmitted to the computing device system 1104.

At the computing device system 1104, a broadcast application content storage system 1152, in this example a broadcast VOD storage system, receives demultiplexed streams from the additional MP2TS 1130 demultiplexer, and communicates with the status monitor and transmux scheduler 1132. The broadcast application content storage system 1152 transmits demultiplexed streams to a first, and optionally one or more additional MP4 multiplexers 1154, 1156, where the demultiplexed streams are multiplexed to an MP4 container format.

Content is received from one or more OTT content providers 1136, 1138, 1140 via a network 1134, such as the Internet, at one or more video streaming applications 1142, 1144, 1146. Local watch history is made available to the one or more video streaming applications 1142, 1144, 1146 from a local watch history module 1148. The local watch history module 1148 receives data indicating tuned OTA channels and program data, from the ATSC receiver. A capture decision function module 1150 communicates with the local watch history module 1148. The capture decision function module 1150 transmits an indication of which MP2MPTS streams to capture, indicated by their PIDs, to the MP2TS demultiplexer 1114, and receives MP2MPTS metadata and stream PIDs with related video audio single program transport stream PIDs. The local watch history module 1148 communicates with application access storage 1160 to store the OTA watch history data 1178.

The storage 1106 comprises a temporary storage 1158 and an application access storage 1160. In the temporary storage 1158, the MP2TS file writer/repairer 1127 writes and repairs SPTS application content capture status metadata 1162, in this example, VOD content capture status metadata, indicated by a PID of one. The MP2TS file writer/repairer 1127 also writes and repairs an associated in-progress SPTS stream capture 1164, also indicated by a PID of one in this example. The one or more additional MP2TS file writer/repairers 1128 write and repair additional SPTS application content capture status metadata 1166 and in-progress SPTS stream captures 1168, which are indicated by their respective PIDs. In the application access storage 1160, the broadcast application content storage system 1160 writes metadata 1170 for a first application content file, for example, metadata associated with VOD and/or advertisement content. A first MP4 muxed application content file 1172, for example a VOD and/or advertisement content file, is written to storage from the first MP4 multiplexer 1154. The metadata file 1170 is associated with the first MP4 muxed application content file 1172. One or more additional metadata 1174 for a first application content file and associated MP4 muxed application content files 1176 are written to storage from the broadcast content application system 1152 and one or more additional MP4 multiplexers 1156.

Figure 12:
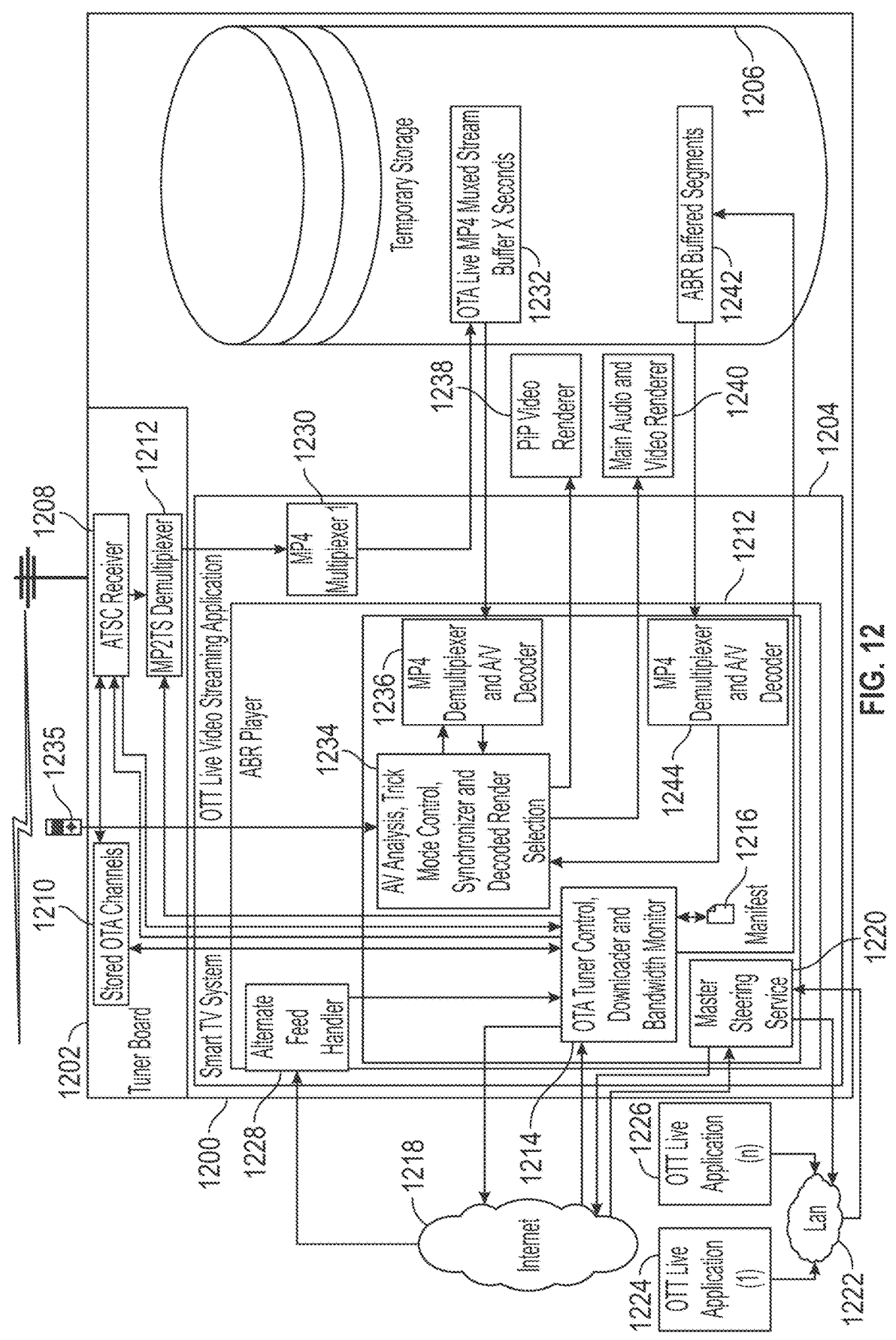
FIG. 12 shows another example environment for enabling the improved delivery of live content items to a plurality of computing devices, in accordance with some embodiments of the disclosure.

FIG. 12 shows another example environment for enabling the improved delivery of live content items to a plurality of computing devices, in accordance with some embodiments of the disclosure. The environment 1200 comprises a computing device running an OTT application. FIG. 12 is an example system diagram for a computing device and an OTT application. This system enables a synchronization between a live OTA stream, and a live OTT stream when switching between the two. In some examples, it may not be possible to use timings in the streams, as these streams have been transcoded and multiplexed one or more times since leaving, for example, a broadcaster satellite uplink. The synchronizing may be performed, for example, by caching the live OTA stream for at least a threshold period of time in order to compensate for latency differences between the OTA stream and the OTT stream. In some examples, analysis of subtitle information between the two streams may provide a close switchover point, and using two decoders to begin decoding identified frames that are temporally close to one another. In some examples, this switchover experience may not be a perfect, seamless, user experience, but provide an improvement over not synchronizing the streams. Typically, ABR players may buffer, for example, three segments of an OTT stream, regardless of the segment time length. In order to handle switch-overs, this buffer may be dynamically increased to buffer a larger number of segments, where the number of the segments to be buffered may be determined by the length in time of the segments. This may enable a period of time in which to perform computations for switching over from an OTT live feed to an OTA live feed in order to improve the switchover user experience. This system architecture also addresses OTA program viewing history, and the user experience for determining what content for local capture should be saved onto an application running on a computing device, such as a smart television.

The environment 1200 comprises a tuner board 1202, a computing device 1204, in this example a smart television system, and temporary storage 1206. An ATSC receiver 1208 receives a broadcast MP2MPTS stream, and transmits the received MP2MPTS stream to an MPT2TS demultiplexer 1212. The ATSC receiver also communicates with a stored OTA channel module 1210, and receives a tune request from an OTA tuner control, downloader and bandwidth monitor module 1214. The ATSC receiver transmits OTA channel program data and a receiver quality level to the OTA tuner control, downloader and bandwidth monitor module 1214. The OTA tuner control, downloader and bandwidth monitor module 1214 also transmits a tuner capture request to the MP2TS demultiplexer 1212.

One or more OTT live applications 1224, 1226 transmit data indicating a watched OTT service and a device type via a local network 1222, such as a LAN, to a master steering service 1220. The master steering service transmits, via the local network 1220, one or more OTA tune requests, based on device type. The master steering service 1220 transmits and receives, via a network 1218, such as the Internet, respective OTA switch authorization requests and responses. The OTA tuner control, downloader and bandwidth monitor module 1214 also transmits requests and responses, via the network 1218, for OTA channel availability, live ABR segment requests, with a session ID and device type, redirected live segment http redirects to a CDN edge, with a session ID, or a redirect to an OTA channel service, and a redirected live ABC segment request, with a session ID. An alternate feed handler 1228 receives alternate OTA channel and/or service availability for any potential service blackouts via the network 1218, and transmits an alternate OTA tune request to the OTA tuner control, downloader and bandwidth monitor module 1214. The OTA tuner control, downloader and bandwidth monitor module 1214 also receives a manifest file 1216.

An audio and/or video analysis, trick mode control, synchronizer and decoded render selection module 1234 receives an input for trick mode control via the remote control 1235. The audio and/or video analysis, trick mode control, synchronizer and decoded render selection module 1234 transmits a trick play command, such as rewind, fast-forward and/or pause, to a first MP4 demultiplexer and audio and/or video decoder module 1236. The MP2TS demultiplexer 1212 transmits the demultiplexed video, audio and subtitle streams to a MP4 multiplexer 1230. The multiplexed streams are transmitted to the temporary storage 1206, where, at 1232, the OTA live MP4 muxed stream is stored in a buffer for a preset number of seconds. The first MP4 demultiplexer and audio and/or video decoder module 1236 receives the multiplexed streams from the temporary storage 1206, and transmits the video, audio and/or subtitles to the audio and/or video analysis, trick mode control, synchronizer and decoded render selection module 1234. The OTA tuner control, downloader and bandwidth monitor module 1214 transmits ABR segments to an ABR buffer 1242 in the temporary storage 1206. A second MP4 demultiplexer and audio and/or video decoder 1244 receives the ABR audio, video and/or subtitle segments from the buffer 1242 and transmits the decoded OTT audio, video and/or subtitle segments to the audio and/or video analysis, trick mode control, synchronizer and decoded render selection module 1234. The audio and/or video analysis, trick mode control, synchronizer and decoded render selection module 1234 may transmit OTA decoded video and/or audio to a PiP video renderer 1238 and a OTT decoded video and/or audio to a main audio and video renderer 1240. The audio and/or video analysis, trick mode control, synchronizer and decoded render selection module 1234 may transmit OTA or OTT decoded video and/or audio to the main audio and video renderer 1240.

Figure 13:
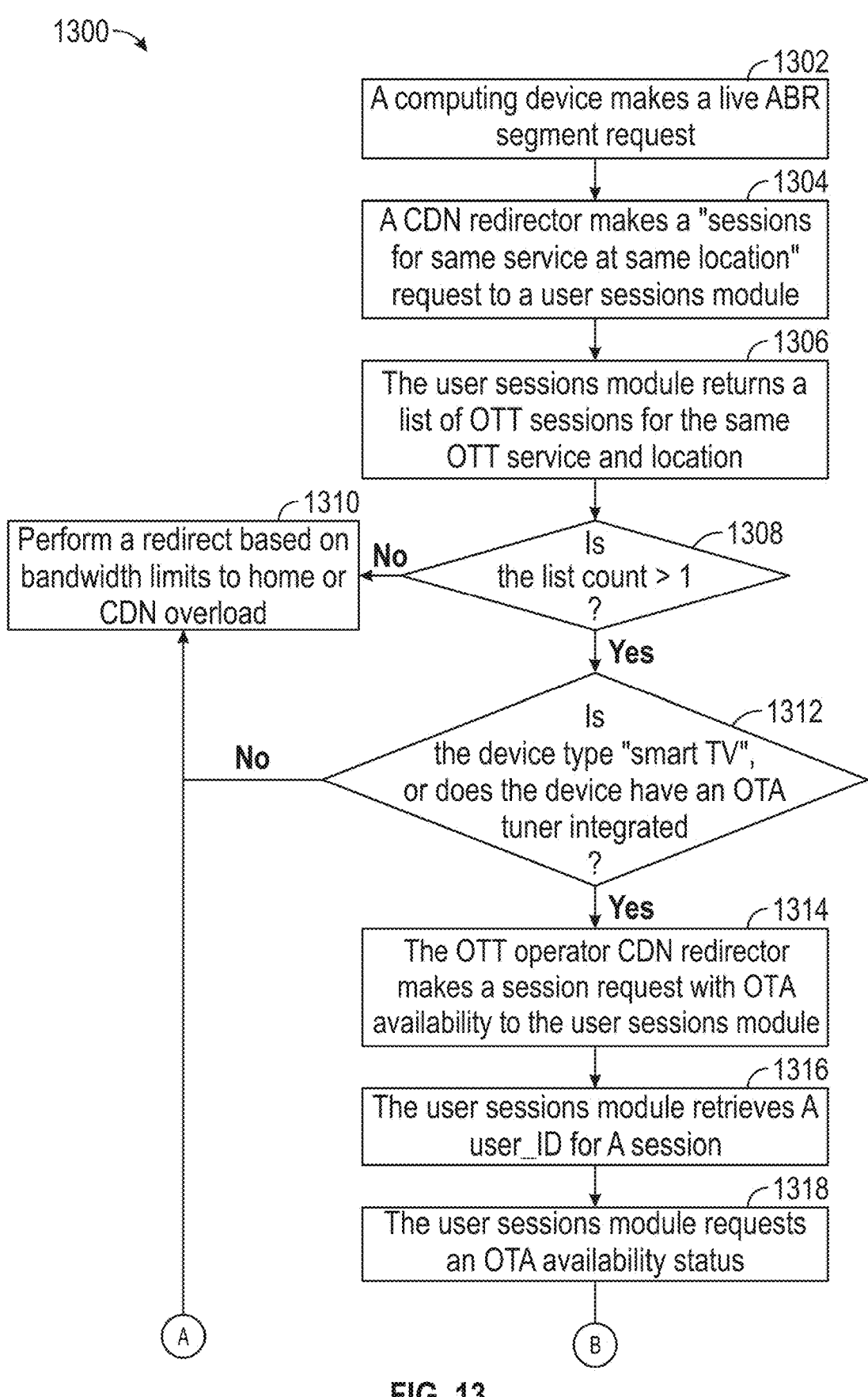
FIG. 13 shows a flowchart of illustrative steps involved in enabling the improved delivery of live content items to a plurality of computing devices, in accordance with some embodiments of the disclosure.
Figure 13:
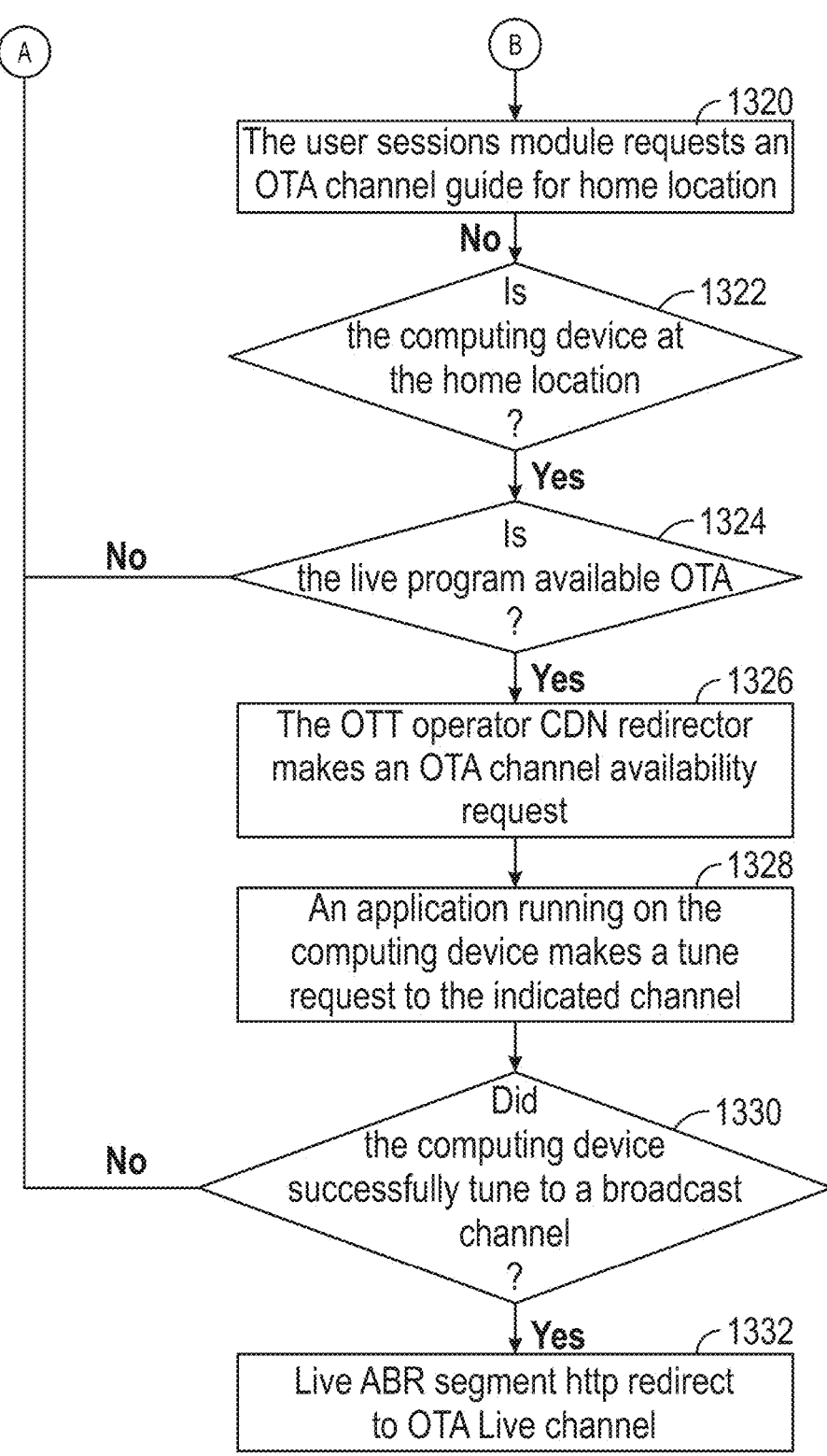

FIG. 13 shows a flowchart of illustrative steps involved in enabling the improved delivery of live content items to a plurality of computing devices, in accordance with some embodiments of the disclosure. FIG. 13 is an example method for a force tune redirect based on multiple sessions watching the same session and the service available OTA. Process 1300 may be implemented, in whole or in part, on any of the aforementioned computing devices. In addition, one or more actions of the process 1400 may be incorporated into or combined with one or more actions of any other processes or embodiments described herein.

At 1302, a computing device makes a live ABR segment request, and at 1304, a CDN redirector, such as the OTT operator CDN redirector 1036 of FIG. 10, makes a "Sessions for same Service at Same location" request to a user sessions module, such as the user sessions with location and service watch data module 1038 of FIG. 10. At 1306, the User Sessions module returns a list of OTT sessions for the same OTT service and location. At 1308, it is determined whether the list count is greater than one. If the list count is not greater than one, then at 1310, a redirect, such as a redirect described in connection with FIG. 14 below, is performed based on bandwidth limits to a home location, or based on the CDN being overloaded. If, at 1308, the list count is greater than one, then the process proceeds to step 1312, where it is determined whether a device type of the computing device is "smart TV," or whether the device has an OTA tuner integrated. If neither of these are true, then the process proceeds to step 1310. If, at 1312, it is determined that at least one of these are true, then the process proceeds to step 1314, where the OTT operator CDN redirector makes a session request with OTA availability to the user sessions module. At 1316, the user sessions module retrieves a user ID for a session, and, at 1318, the user sessions module requests an OTA availability status. At 1320, the user sessions module requests an OTA channel guide for the home location.

At 1322, it is determined whether the computing device is at the home location. If the computing device is not at the home location, then the process proceeds to step 1310. If the computing device is at the home location, then the process proceeds to step 1324, where it is determined whether the live program is available OTA. If the live program is not available OTA, then the process proceeds to step 1310. If the live program is available OTA, then the process proceeds to step 1326, where the OTT operator CDN redirector makes an OTA channel availability request. At 1328, an application running on the computing device makes a tune request to the Indicated channel and, at 1330, it is determined whether the computing device successfully tuned to a broadcast program. If the computing device did not successfully tune to a broadcast program, the process proceeds to step 1310. If the computing device did successfully tune to a broadcast channel, the process proceeds to step 1332, where a live ABR segment http redirect to an OTA channel, that is broadcasting the live program, is performed.

Figure 14:
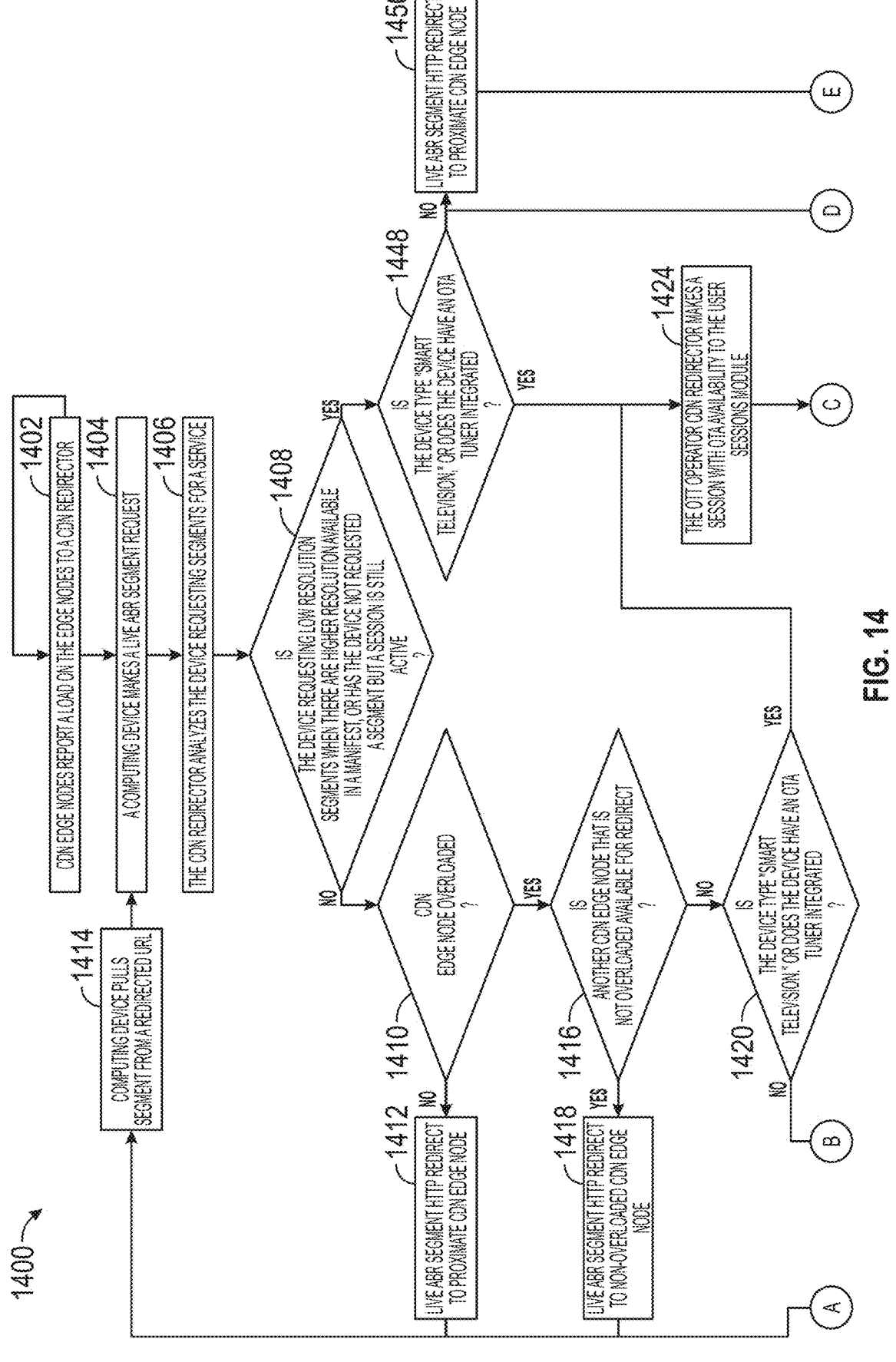
FIG. 14 shows another flowchart of illustrative steps involved in enabling the improved delivery of live content items to a plurality of computing devices, in accordance with some embodiments of the disclosure.
Figure 14:
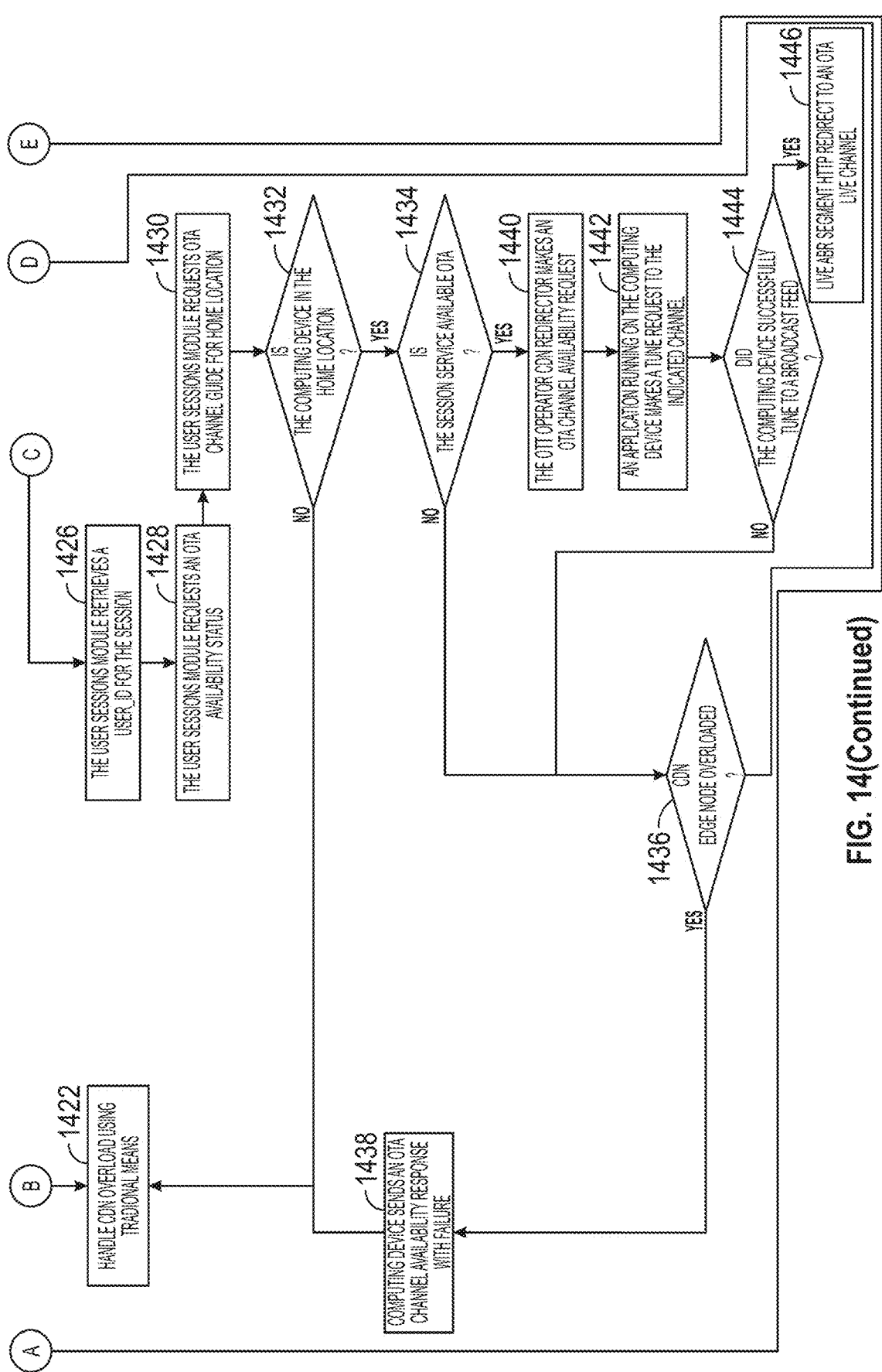

FIG. 14 shows another flowchart of illustrative steps involved in enabling the improved delivery of live content items to a plurality of computing devices, in accordance with some embodiments of the disclosure. FIG. 14 is an example method for a force tune redirect based determined bandwidth limits, device type, location, and service. Process 1400 may be implemented, in whole or in part, on any of the aforementioned computing devices. In addition, one or more actions of the process 1400 may be incorporated into or combined with one or more actions of any other processes or embodiments described herein.

At 1402, CDN edge nodes report a load on the edge nodes, such as edge notes 1034 shown in FIG. 10, to a CDN redirector, such as the CDN redirector 1036 shown in FIG. 10. At 1404, a computing device, such as the computing device 1006 of FIG. 10, makes a live ABR segment request, and at 1406, the CDN redirector analyzes the device requesting segments for a service. At 1408, it is determined whether the computing device requesting low resolution segments when there are higher resolutions available in a manifest, or if the computing device has not requested a segment, but a session is still active. If either of these is false, the process proceeds to step 1410, where it is determined if a CDN edge note is overloaded. If the edge node is not overloaded, the process proceeds to step 1412, where a live ABR segment http redirect to a proximate CDN edge node is performed. The process proceeds to step 1414, where the computing device pulls segment from a redirected URL, and the process proceeds to step 1404. If, at 1410, it determined that the edge node is overloaded, the process proceeds to step 1416.

At step 1416, it is determined whether another CDN edge node that is not overloaded is available for redirect. If another edge node is available, the process proceeds to step 1418, where a live ABR Segment http redirect to a non-overloaded CDN edge node is performed. The process then proceeds to step 1414. At 1416, if it is determined that another edge node is not available, the process proceeds to step 1420, where it is determined whether the device type associated with the computing device is "smart television," or whether the computing device has an OTA tuner integrated. If it is determined that neither of these are true, the process proceeds to step 1422, where the CDN overload is handled using tradition means, and the process proceeds to step 1414. If, at 1420, it is determined that either, or both, of these are true, then the process proceeds to step 1424.

At 1424, the OTT operator CDN redirector makes a session with OTA availability to a user sessions module, such as the user sessions with location and service watch data module 1038 of FIG. 10, utilizing a session ID. At 1426, the user sessions module looks up a session with the session ID to retrieve a user ID for the session. At 1428, the user session module requests an OTA availability stats based on a location associated with the computing device that is associated with the user ID. At 1430, the user session module requests an OTA channel guide for a home location (or any other location including, for example, a work or leisure location) associated with the user ID. At 1432, it is determined whether the computing device is in the home location 1432. If it is identified that the computing device is not in the home location, the process proceeds to step 1422. If it is identified that the computing device is in the home location, the process proceeds to step 1434, where it is determined whether a session service is available OTA. If the session service is not available OTA, the process proceeds to step 1436, where it is determined whether the CDN edge node is overloaded. If it is determined that the CDN edge node is not overloaded, then the process proceeds to step 1438, where the computing device sends an OTA channel availability response with failure, and the process proceeds to step 1422. If, at 1436, it is determined that the CDN edge node is not overloaded, then the process proceeds to step 1450, where a live ABR segment http redirect to proximate CDN edge node is performed. The process then proceeds to step 1414.

If, at step 1434, it is determined that the session service is available OTA, then the process proceeds to step 1440 where the OTT operator CDN redirector makes an OTA channel availability request. At 1442, an application running on the computing device makes a tune request to the indicated channel. At 1444, it is determined whether the computing device successfully tuned to a broadcast feed. If, at step 1444, it is determined that the computing device did not successfully tune to the broadcast feed, the process proceeds to step 1436. If, at step 1444, it is determined that the computing device did not successfully tune to the broadcast feed, then the process proceeds to step 1446, where a live ABR segment http redirect to an OTA live channel is performed.

If, at step 1408, it is determined the computing device is requesting low resolution segments when there are higher resolutions available in a manifest, or if the computing device has not requested a segment, but a session is still active, then the process proceeds to step 1448. At step 1448, it is determined whether the computing device type is "smart television," or whether the computing device has an OTA tuner integrated. If either of these is true, then the process proceeds to step 1424; however, if both of these are false, then the process proceeds to step 1450.

Figure 15:
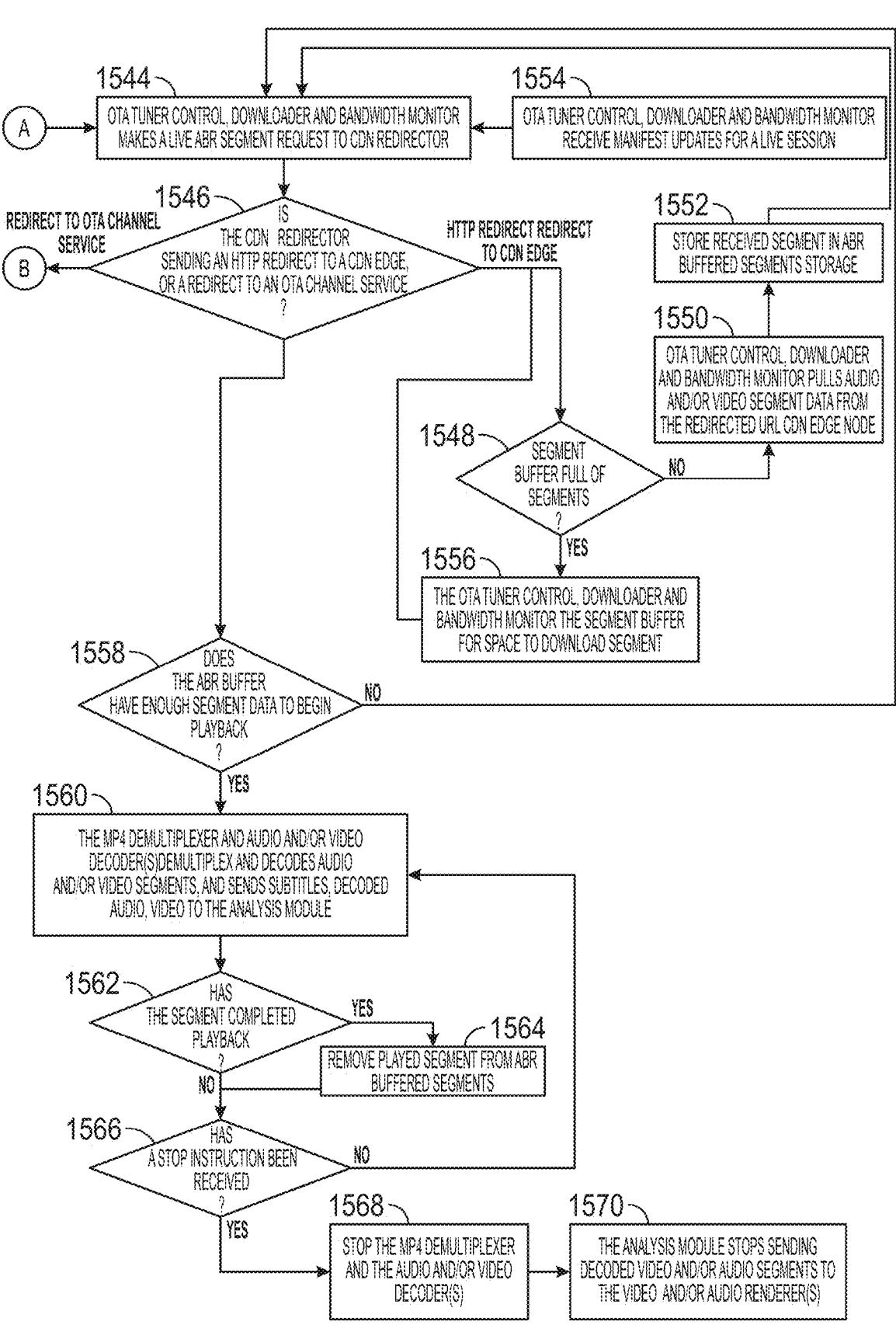
FIG. 15 shows another flowchart of illustrative steps involved in enabling the improved delivery of live content items to a plurality of computing devices, in accordance with some embodiments of the disclosure.
Figure 15:
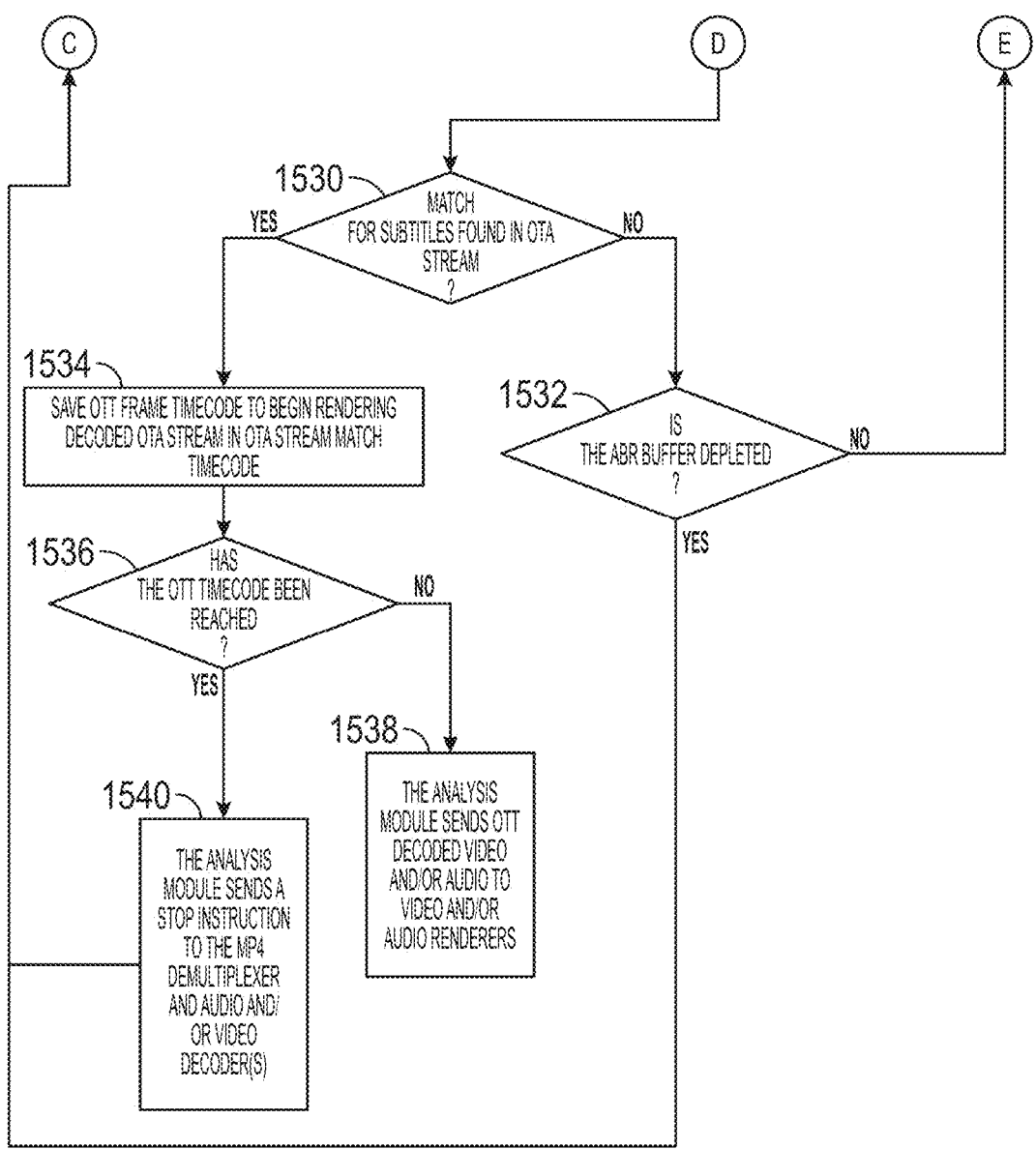

FIG. 15 shows another flowchart of illustrative steps involved in enabling the improved delivery of live content items to a plurality of computing devices, in accordance with some embodiments of the disclosure. FIG. 15 is an example method for enabling the synchronization of the OTA live stream, and an OTT live stream. Process 1500 may be implemented, in whole or in part, on any of the aforementioned computing devices. In addition, one or more actions of the process 1500 may be incorporated into or combined with one or more actions of any other processes or embodiments described herein.

At 1502, a computing device, such as a computing device comprising the tuner board 1202 and the smart television system 1204 depicted in FIG. 12, OTA tuner control, downloader and bandwidth monitor, such as the OTA tuner control, downloader and bandwidth monitor 1214 of FIG. 12, makes an ABR manifest request for a live service, and at 1504, it is determined whether there is a response to the request. If there is a response, the process proceeds to step 1506, where the OTA tuner control, downloader and bandwidth monitor makes a request for stored OTA channels, such as via the stored channels module 1210 of FIG. 12. At 1508, it is determined whether the service is available OTA. If the service is not available, the process proceeds to step 1509, where the process ends. If the service is available, then the process proceeds to step 1510, where the OTA tuner control, downloader and bandwidth monitor makes a tune request to an ATSC receiver, such as the ATSC receiver 1208 of FIG. 12, to tune to the OTA channel. At 1512, it is determined whether the quality level of the received channel sufficient. If the quality level is not sufficient, the process proceeds to step 1514, where the OTA tuner control, downloader and bandwidth monitor generates a failure message. If the quality level is sufficient, the process proceeds to step 1516, where the OTA tuner control, downloader and bandwidth monitor makes a tuner capture request to an MP2TS demultiplexer, such as the MP2TS demultiplexer 1212 of FIG. 12. At 1518, the MP2TS demultiplexer demultiplexes the video and audio elementary streams and subtitles, and routes the video and audio streams and the subtitles to an MP4 multiplexer, such as the MP4 multiplexer 1230 of FIG. 12. At 1520, the MP4 multiplexer writes the MP4 multiplexed stream to temporary storage, such as the temporary storage 1206 of FIG. 12, and writes the OTA live MP4 muxed stream into a temporary multiplexed file, such as at buffer 1232 of FIG. 12. At 1522, a MP4 demultiplexer and audio video decoder, such as the first MP4 demultiplexer and audio video decoder 1236 of FIG. 12, demultiplexes the temporary OTA buffered file and sends the OTA decoded video and/or audio with subtitles to an analysis module, such as the audio and/or video analysis, trick mode control, synchronizer and decoded render selection module 1234 of FIG. 12.

At 1524, it is determined whether the analysis module is receiving OTT decoded segments. If the analysis module is not receiving OTT decoded segments, then the process proceeds to step 1526, where the analysis module sends OTA decoded video and/or audio to respective video and/or audio renderers, such as main audio and video renders 1240 of FIG. 12. If, at step 1524, it is determined that the analysis module is receiving OTT decoded segments, then the process proceeds to step 1528, where the analysis module receives OTT decoded segments and analyzes subtitles in the buffered decoded OTA stream to determine a switchover point. At 1530, it is determined whether a match has been found for subtitles in the OTA stream. If a match is not found, the process proceeds to step 1532, where it is determined whether the ABR buffer is depleted. If the ABR buffer is depleted, then the process proceeds to step 1526. If the ABR buffer is not depleted, then the process proceeds to step 1528.

If, at step 1530, it is determined that a match has been found, then the process proceeds to step 1534, where an OTT frame timecode is saved, in order to begin rendering the decoded OTA stream in the OTA stream that matches timecode. At 1536, it is determined whether the OTT time code has been reached. If the time code has not been reached, the process proceeds to step 1538, where the analysis module sends OTT decoded video and/or audio to the video and/or audio renderers, and the process proceeds to step 1534. If, at 1536, it is determined that the OTT time code has been reached, then the process proceeds to step 1540, where the analysis module sends a stop instruction to the MP4 demultiplexer and the audio and/or video decoder (s), and the process proceeds to step 1526.

At step 1504, if it is determined that there is not a response, then the process proceeds to step 1542, where the OTA tuner control, downloader and bandwidth monitor receives an ABR manifest file, such as the manifest 1216 of FIG. 12, for an OTT live service. The process proceeds to step 1544, where the OTA tuner control, downloader and bandwidth monitor makes a live ABR segment request to a CDN redirector. Step 1544 receives input from step 1554, where the OTA tuner control, downloader and bandwidth monitor receives manifest updates for a live session. The process proceeds from step 1544 to step 1546, where it is determined whether the CDN redirector is sending an http redirect to a CDN edge, or a redirect to an OTA channel service. If a redirect is being made to an OTA channel service, the process proceeds to step 1510. If an http redirect is being made to a CDN edge, the process proceeds to steps 1548 and 1558.

At step 1548, it is determined whether the segment buffer is full of segments. If the segment buffer is full of segments, the process proceeds to step 1556 where the OTA tuner control, downloader and bandwidth monitors the segment buffer for space to download additional segments, and the process loops back to step 1548. If, at step 1548, it is determined that the buffer is not full of segments, then the process proceeds to step 1550, where the OTA tuner control, downloader and bandwidth monitor pulls audio and/or video segment data from the redirected URL CDN edge node. At step 1552 the received segments are stored in ABR buffered segments storage, such as the ABR buffer 1242 of FIG. 12, and the process proceeds to step 1544.

At 1558, it is determined whether the ABR buffer has enough segment data to begin playout. If it is determined that the ABR buffer does not have enough segment data to begin playback, the process proceeds to step 1544. If, at 1558 it is determined that the ABR buffer has enough segment data to begin playout, the process proceeds to step 1560, where a MP4 demultiplexer and audio and/or video decoder(s), such as the second MP4 demultiplexer and audio and/or video decoder(s) 1244, demultiplex and decode audio and/or video segments, and send subtitles, decoded audio, video to the analysis module. At 1562, it is determined whether the segment has completed playback. If it is determined that the segment has completed playback, the process proceeds to step 1564, where the played segment is removed from the ABR buffered segments buffer, and the process proceeds to step 1566. If, at 1562, it is determined that the segment has not completed playback, the process proceeds to step 1566, where it is determined whether a stop instruction has been received. If the stop instruction has not been received, the process proceeds to step 1560. If the stop instruction has been received, the process proceeds to step 1568, where the MP4 demultiplexer and the audio and/or video decoder(s) are stopped. The process proceeds to step 1570, where the analysis module stops sending decoded video and/or audio segments to the video and/or audio renderer(s).

Figure 16:
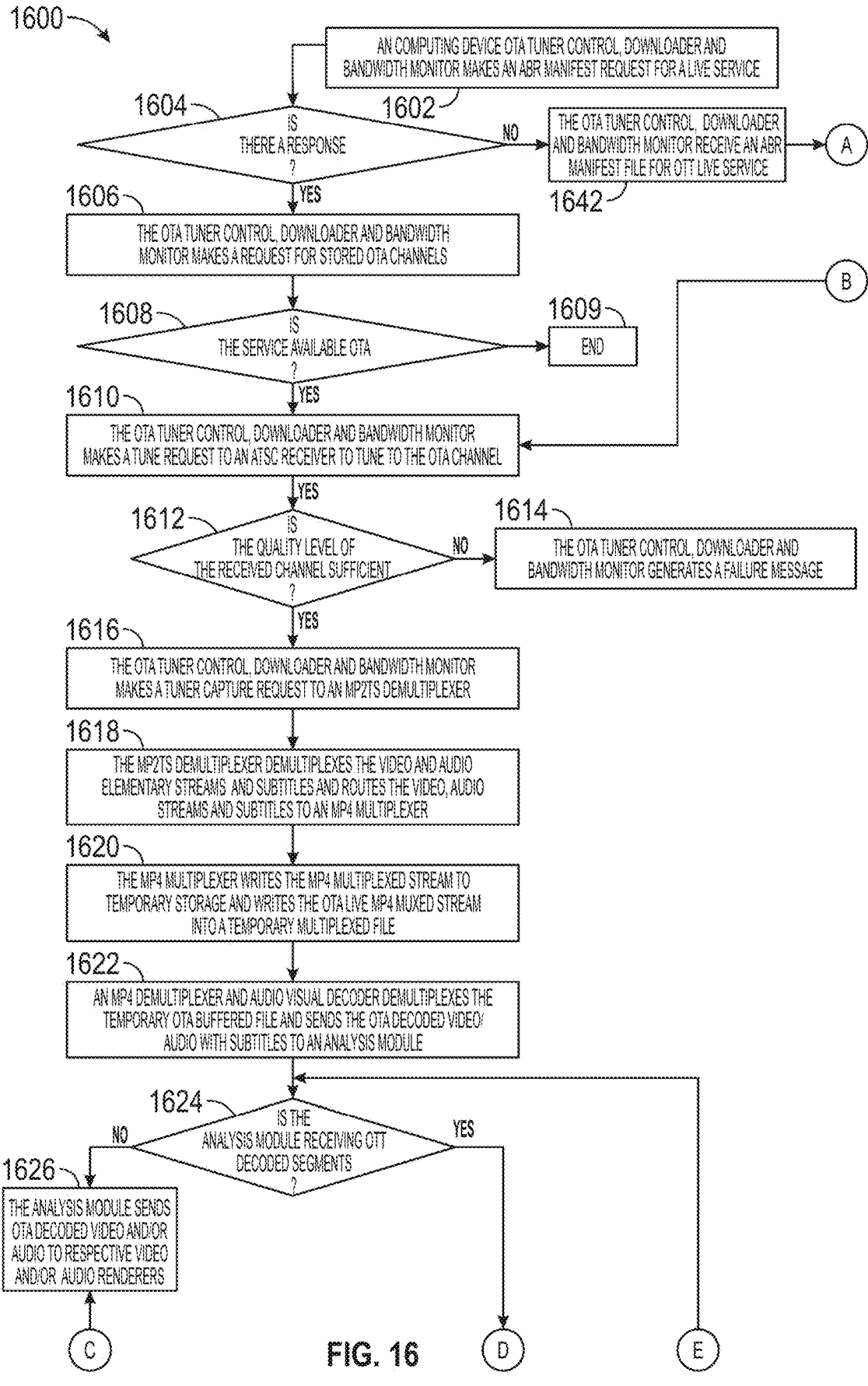
FIG. 16 shows another flowchart of illustrative steps involved in enabling the improved delivery of live content items to a plurality of computing devices, in accordance with some embodiments of the disclosure.
Figure 16:
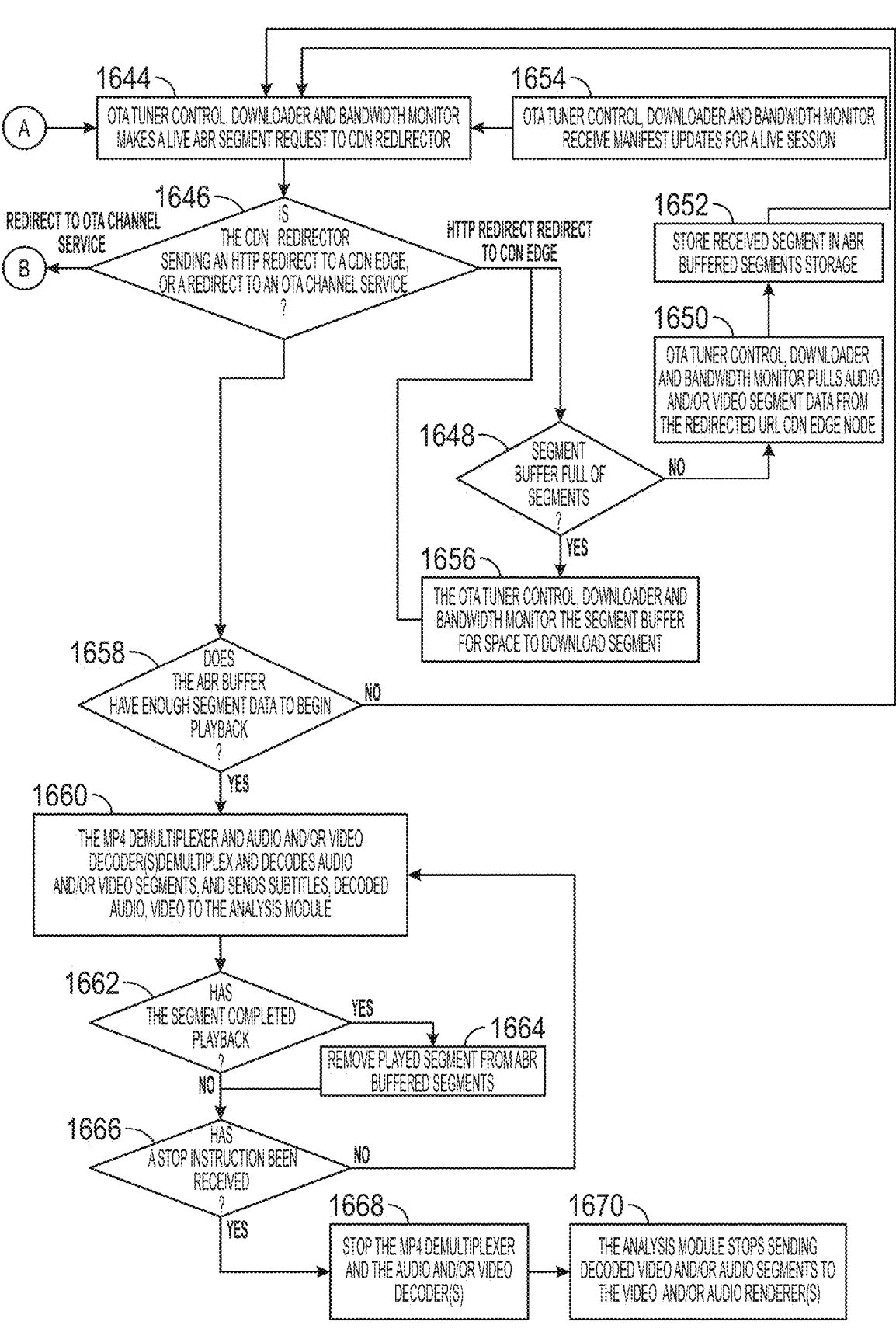
Figure 16:
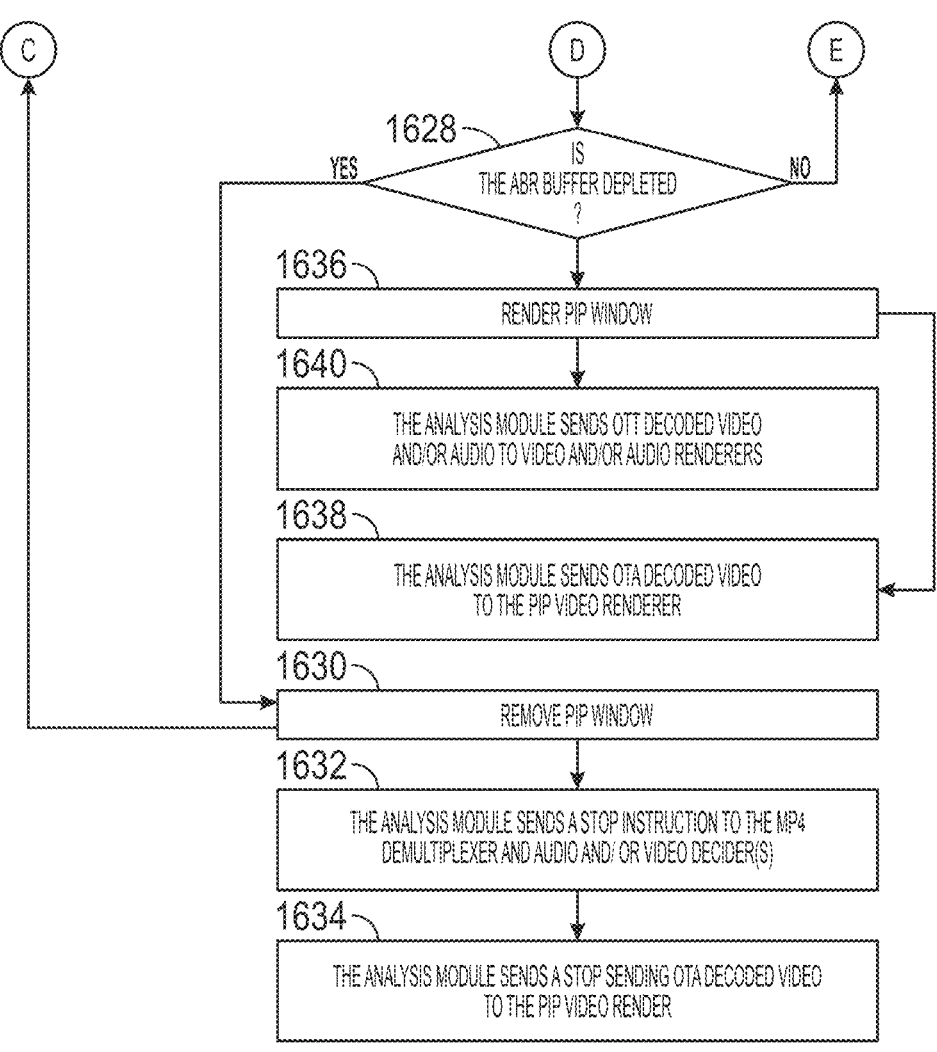

FIG. 16 shows another flowchart of illustrative steps involved in enabling the improved delivery of live content items to a plurality of computing devices, in accordance with some embodiments of the disclosure. FIG. 16 is an example method for enabling the PiP display of an OTA stream, with the main display of OTT stream. Process 1600 may be implemented, in whole or in part, on any of the aforementioned computing devices. In addition, one or more actions of the process 1600 may be incorporated into or combined with one or more actions of any other processes or embodiments described herein.

At 1602, a computing, such as a computing device comprising the tuner board 1202 and the smart television system 1204 depicted in FIG. 12, device OTA tuner control, downloader and bandwidth monitor, such as the OTA tuner control, downloader and bandwidth monitor 1214 of FIG. 12, makes an ABR manifest request for a live service, and at 1604, it is determined whether there is a response to the request. If there is a response, the process proceeds to step 1606, where the OTA tuner control, downloader and bandwidth monitor makes a request for stored OTA channels, such as from the stored OTA channels module 1210 of FIG. 12. At 1608, it is determined whether the service is available OTA. If the service is not available, the process proceeds to step 1609, where the process ends. If the service is available, then the process proceeds to step 1610, where the OTA tuner control, downloader and bandwidth monitor makes a tune request to an ATSC receiver, such as the ATSC receiver 1208 of FIG. 12, to tune to the OTA channel. At 1612, it is determined whether the quality level of the received channel is sufficient. If the quality level is not sufficient, the process proceeds to step 1614, where the OTA tuner control, downloader and bandwidth monitor generates a failure message. If the quality level is sufficient, the process proceeds to step 1616, where the OTA tuner control, downloader and bandwidth monitor makes a tuner capture request to an MP2TS demultiplexer, such as the MP2TS demultiplexer 1212 of FIG. 12. At 1618, the MP2TS demultiplexer demultiplexes the video and audio elementary streams and subtitles, and routes the video and audio streams and the subtitles to an MP4 multiplexer, such as the MP4 multiplexer 1230 of FIG. 12. At 1620, the MP4 multiplexer writes the MP4 multiplexed stream to temporary storage, such as the temporary storage 1206 of FIG. 12, and writes the OTA live MP4 muxed stream into a temporary multiplexed file, such as at buffer 1232 of FIG. 12. At 1622, the MP4 demultiplexer and audio video decoder, such as the first MP4 demultiplexer and audio video decoder 1236 of FIG. 12, demultiplexes the temporary OTA buffered file and sends the OTA decoded video and/or audio with subtitles to an analysis module, such as the audio and/or video analysis, trick mode control, synchronizer and decoded render selection module 1234 shown in FIG. 12.

At 1624, it is determined whether the analysis module is receiving OTT decoded segments. If the analysis module is not receiving OTT decoded segments, then the process proceeds to step 1626, where the analysis module sends OTA decoded video and/or audio to respective video and/or audio renderers, such as the main audio and video renderer 1240 of FIG. 12. If, at step 1624, it is determined that the analysis module is receiving OTT decoded segments, then the process proceeds to step 1628, where it is determined whether the ABR buffer has been depleted. If the ABR buffer has not been depleted, then the process proceeds to step 1624. If the ABR buffer has been depleted, then the process proceeds to step 1630, where the PiP window is removed. The process proceeds from step 1630 to steps 1626 and 1632. At step 1632, the analysis module sends a stop instruction to the MP4 demultiplexer and audio and/or video decoder(s), and at step 1634, the analysis module stops sending OTA decoded Video to the PiP video renderer, such as PiP video renderer 1238 of FIG. 12. The process proceeds from step 1628 to step 1636, and, at step 1636, a PiP window is rendered. The process proceeds to steps 1638 and 1640. At 1638, the analysis module sends OTA decoded video to the PiP video renderer, and at 1640, the analysis module sends OTT decoded video and/or audio to the video and/or audio renderers.

At step 1604, if it is determined that there is not a response, then the process proceeds to step 1642, where the OTA tuner control, downloader and bandwidth monitor receives an ABR manifest file for an OTT live service, such as the manifest 1216 of FIG. 12. The process proceeds to step 1644, where the OTA tuner control, downloader and bandwidth monitor makes a live ABR segment request to the CDN redirector. Step 1644 receives input from step 1654, where the OTA tuner control, downloader and bandwidth monitor receive manifest updates for a live session. The process proceeds from step 1644 to step 1646, where it is determined whether the CDN redirector is sending an http redirect to a CDN edge, or a redirect to an OTA channel service. If a redirect is being made to an OTA channel service, the process proceeds to step 1610. If an http redirect is being made to a CDN edge, the process proceeds to steps 1648 and 1658.

At step 1648, it is determined whether the segment buffer is full of segments. If the segment buffer is full of segments, the process proceeds to step 1656 where the OTA tuner control, downloader and bandwidth monitors the segment buffer for space to download additional segments, and the process loops back to step 1648. If, at step 1648, it is determined that the buffer is not full of segments, then the process proceeds to step 1650, where the OTA tuner control, downloader and bandwidth monitor pulls audio and/or video segment data from the redirected URL CDN edge node. At step 1652 the received segments are stored in ABR buffered segments storage, such as the ABR buffer 1242 of FIG. 12, and the process proceeds to step 1644.

At 1658, it is determined whether the ABR buffer has enough segment data to begin playout. If it is determined that the ABR buffer does not have enough segment data to begin playback, the process proceeds to step 1644. If, at 1658 it is determined that the ABR buffer has enough segment data to begin playout, the process proceeds to step 1660, where the MP4 demultiplexer and audio and/or video decoder(s) demultiplex and decode audio and/or video segments, and sends subtitles, decoded audio, video to the analysis module. At 1662, it is determined whether the segment has completed playback. If it is determined that the segment has completed playback, the process proceeds to step 1664, where the played segment is removed from the ABR buffered segments, and the process proceeds to step 1666. If, at 1662, it is determined that the segment has not completed playback, the process proceeds to step 1666, where it is determined whether a stop instruction has been received. If the stop instruction has not been received, the process proceeds to step 1660. If the stop instruction has been received, the process proceeds to step 1668, where the MP4 demultiplexer and the audio and/or video decoder(s) are stopped. The process proceeds to step 1670, where the analysis module stops sending decoded video and/or audio segments to the video and/or audio renderer(s).

Figure 17:
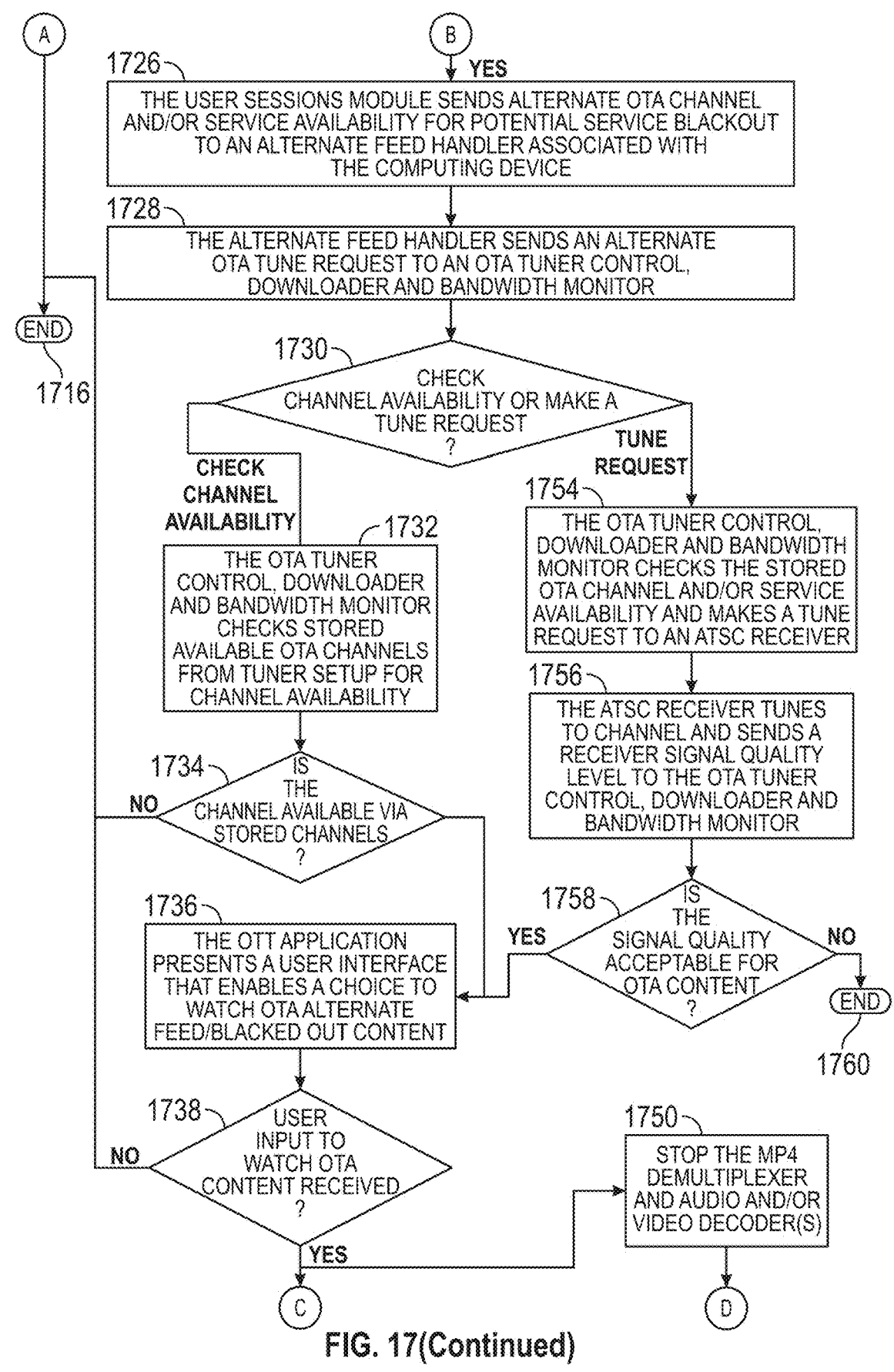
FIG. 17 shows another flowchart of illustrative steps involved in enabling the improved delivery of live content items to a plurality of computing devices, in accordance with some embodiments of the disclosure.
Figure 17:
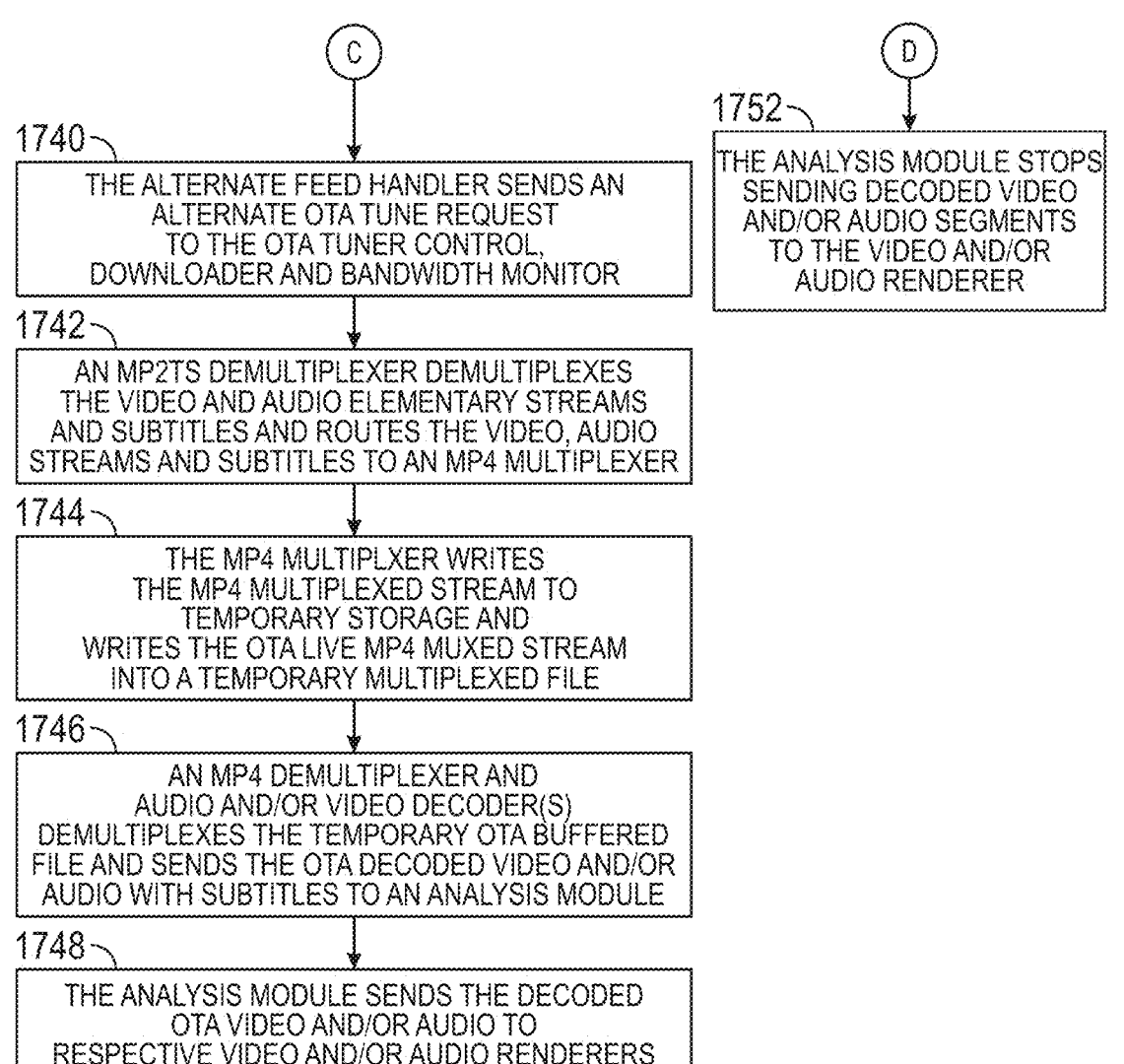

FIG. 17 shows another flowchart of illustrative steps involved in enabling the improved delivery of live content items to a plurality of computing devices, in accordance with some embodiments of the disclosure. FIG. 17 is an example method for an enabling the switching to an OTA channel offering non-blacked out content from an affiliate that is not part of an OTT subscriber location plan. Process 1700 may be implemented, in whole or in part, on any of the aforementioned computing devices. In addition, one or more actions of the process 1700 may be incorporated into or combined with one or more actions of any other processes or embodiments described herein.

At 1702, a computing device receives a live service via OTT, or makes a live service request, and at 1704, the computing device makes a live ABR segment request to an OTT CDN redirector, such as the OTT operator CDN redirector 1036 depicted in FIG. 10. The live ABR segment request may include a session ID and a device ID. At 1706, the OTT CDN redirector makes a session with OTA availability request to a user sessions module, such as the user sessions with location and service watch data module 1038 depicted in FIG. 10. The request may comprise the session ID, location data and/or service watch data (e.g., a consumption history associated with a user profile). At 1708, the user sessions module makes a request for OTA availability associated with a user profile on the computing device to a user account management system, such as the user account management system 1044 of FIG. 10. At 1710, the user account management system looks up a home location associated with the user profile in a user account database, such as the user account and home location database 1042 of FIG. 10, and at 1712, the user account management system sends the home location to the user sessions module. At 1714, it is determined whether the computing device is in a home location. If it is determined that the computing device is not in a home location, the process proceeds to step 1716, where the process ends.

At step 1714, if it is determined that the computing device is in a home location, then the process proceeds to step 1718, where the user sessions module retrieves all user active sessions from a database, such as the active user sessions database 1046 of FIG. 10. At step 1720, the user sessions module retrieves OTA guide data for the user session(s), service(s) watched and/or user location(s), for example from the location OTA channel lineup and guide data database 1040 of FIG. 10. At 1722, it is determined whether the user account has multiple OTA access broadcast affiliates, based on the home location. If it is determined that the user account does not have multiple OTA access broadcast affiliates, then the process proceeds to step 1716. If it is determined that the user account does have multiple OTA access broadcast affiliates, then the process proceeds to step 1724, where it is determined whether the computing device is capable of OTA reception. If it is determined that the computing device is not capable of OTA reception, then the process proceeds to step 1716. If the computing device is capable of OTA reception, then the process proceeds to step 1726, where the user sessions module sends alternate OTA channel and/or service availability for potential service blackout to an alternate feed handler, such as the alternate feed handler 1228 of FIG. 12, associated with the computing device. At 1728, the alternate feed handler sends an alternate OTA tune request to an OTA tuner control, downloader and bandwidth monitor, such as the monitor 1214 shown in FIG. 12. At 1730, it is determined whether to check channel availability, or to make a tune request.

If, at 1730, it is determined to check channel availability, the process proceeds to step 1732, where the OTA tuner control, downloader and bandwidth monitor checks stored available OTA channels from tuner setup for channel availability. At 1734, it is determined if the channel is available via stored channels, such as via the stored OTA channels module 1210 of FIG. 12. If the channel is not available, the process proceeds to step 1716. If the channel is available, the process proceeds to step 1736, where the OTT application presents a user interface that enables a choice to watch OTA alternate feed/blacked out content. At 1738, it is determined whether a user input to watch OTA content has been received. If it has not been received, the process proceeds to step 1716. If it has been received, the process proceeds to steps 1740 and 1750.

At 1740, the alternate feed handler sends an alternate OTA tune request to the OTA tuner control, downloader and bandwidth monitor. At 1742, an MP2TS demultiplexer, such as MP2TS demultiplexer 1212, demultiplexes the video and audio elementary streams and subtitles and routes the video, audio streams and subtitles to the MP4 multiplexer, such as the MP4 multiplexer 1230 of FIG. 12. At 1744, the MP4 multiplexer writes the MP4 multiplexed stream to temporary storage and writes the OTA live MP4 muxed stream into a temporary multiplexed file, at the buffer 1232 of FIG. 12. At 1746, an MP4 demultiplexer and audio and/or video decoder (s), such as the first MP4 demultiplexer and audio and/or video decoder 1236 of FIG. 12, demultiplexes the temporary OTA buffered file and sends the OTA decoded video and/or audio with subtitles to an analysis module, such as the AV analysis, trick mode control, synchronizer and decoded renderer selection module 1234 of FIG. 12. At 1748, the analysis module sends the decoded OTA video and/or audio to respective video and/or audio renderers, such as the main audio and video renderer 1240 of FIG. 12.

The process also proceeds to step 1750 from step 1738. At 1750, the MP4 demultiplexer and the audio and/or video decoder(s) are stopped, and at 1752, the analysis module stops sending decoded video and/or audio segments to the video and/or audio renderer.

If, at 1730, it is determined that a tune request has been made, the process proceeds to step 1754, where the OTA tuner control, downloader and bandwidth monitor checks the stored OTA channel and/or service availability and makes a tune request to an ATSC receiver, such as the ATSC receiver 1208 of FIG. 12. At 1756, the ATSC receiver tunes to the channel and sends a receiver signal quality level to the OTA tuner control, downloader and bandwidth monitor. At 1758, it is determined whether the signal quality is acceptable for OTA content. If the signal quality is acceptable, the process proceeds to step 1736, If the signal quality is not acceptable, the process proceeds to step 1760, where it ends.

Figure 18:
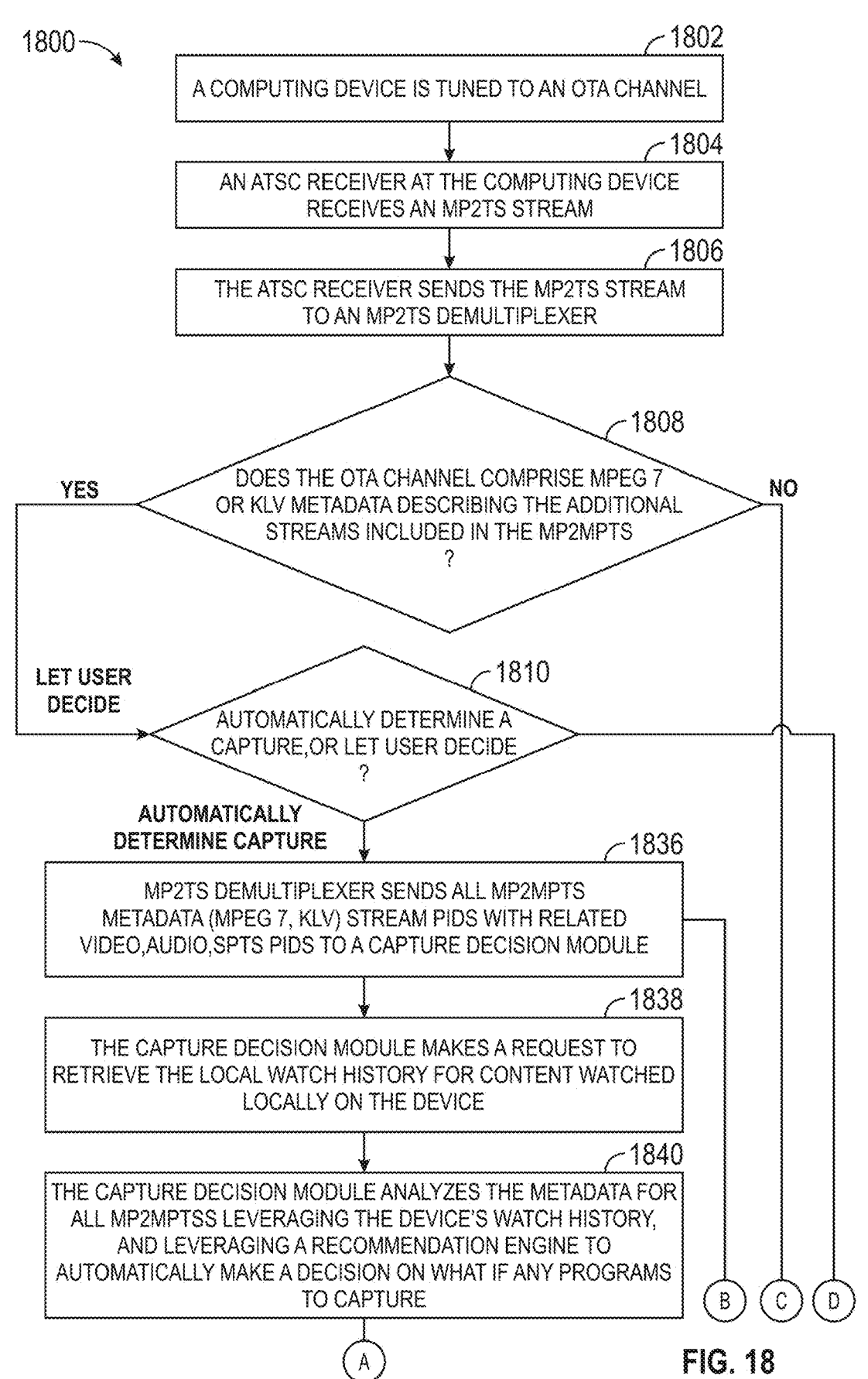
FIG. 18 shows another flowchart of illustrative steps involved in enabling the improved delivery of live content items to a plurality of computing devices, in accordance with some embodiments of the disclosure.
Figure 18:
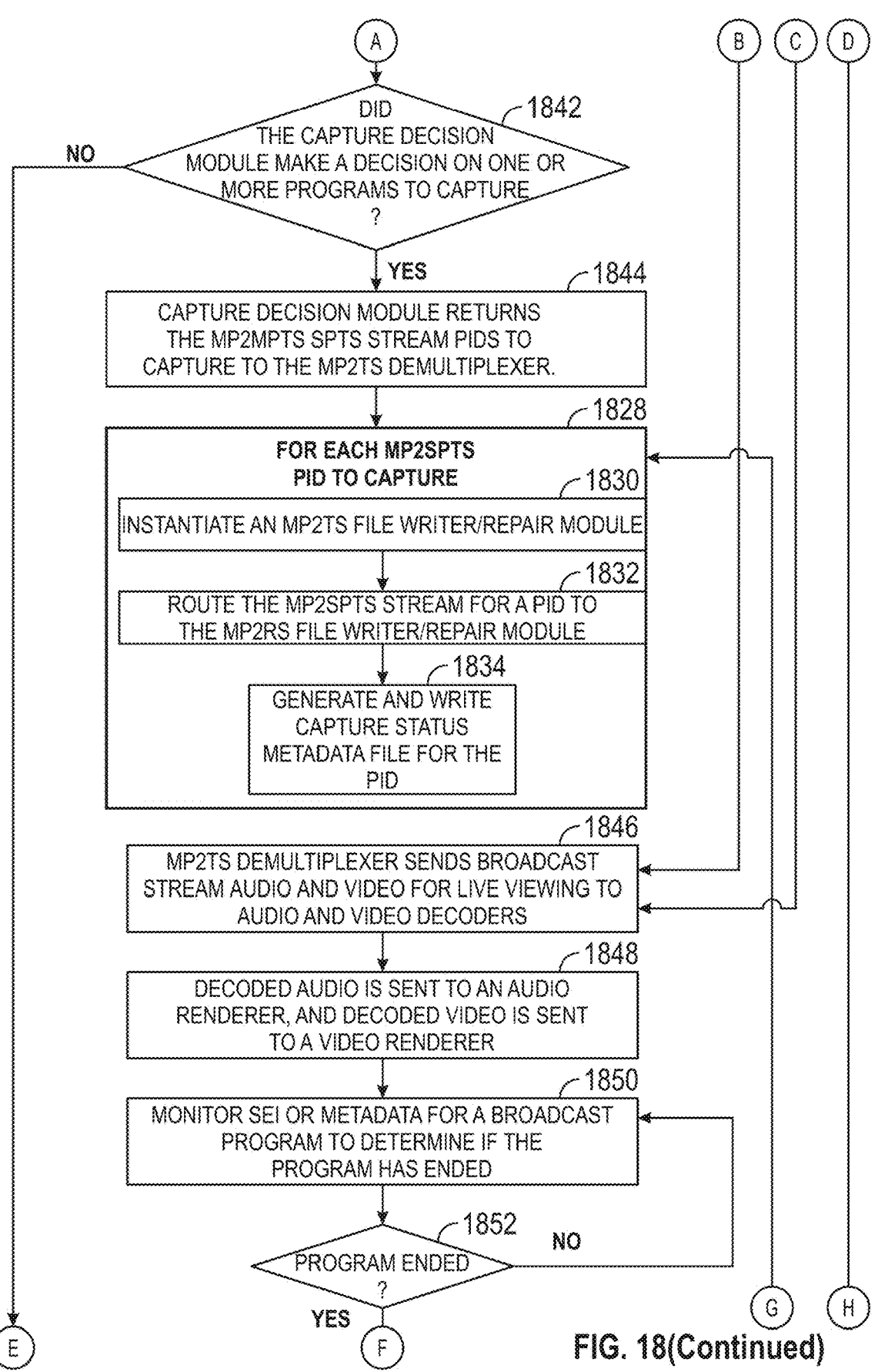
Figure 18:
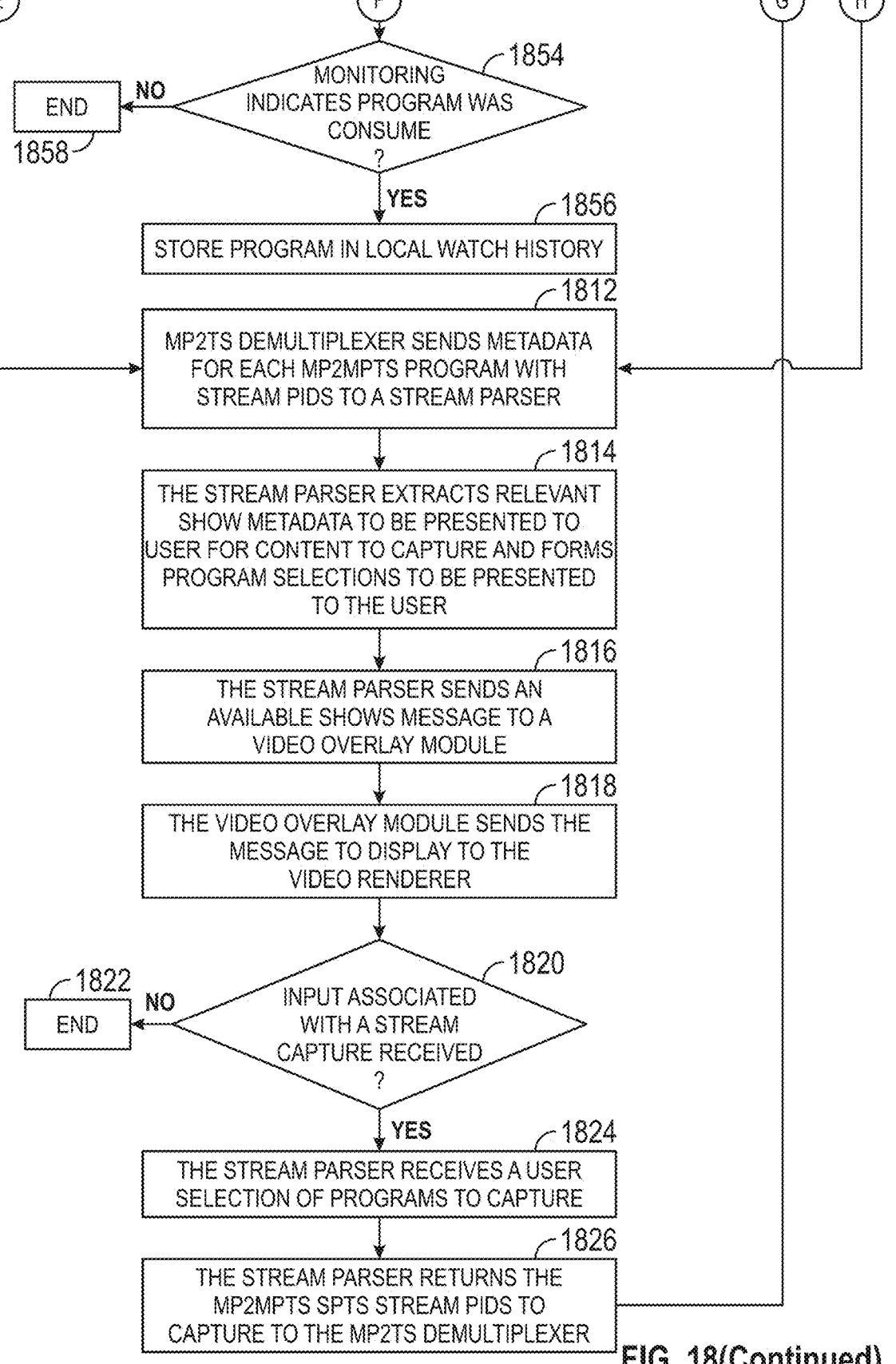

FIG. 18 shows another flowchart of illustrative steps involved in enabling the improved delivery of live content items to a plurality of computing devices, in accordance with some embodiments of the disclosure. FIG. 18 is an example method for deciding which MP2MPTS streams to capture from a broadcast distribution feed. This decision may be based on a watch history for both OTA content and OTT content. The decision may also be based on a received input for upcoming content that will be distributed in the MP2MPTS. Process 1800 may be implemented, in whole or in part, on any of the aforementioned computing devices. In addition, one or more actions of the process 1800 may be incorporated into or combined with one or more actions of any other processes or embodiments described herein.

At 1802, a computing device, such as a computing device comprising the tuner board 1102 and the smart television system 1104 depicted in FIG. 11, is tuned to an OTA channel. At 1804, an ATSC receiver, such as the ATSC receiver 1112, at the computing device receives an MP2TS stream. At 1806, the ATSC receiver sends the MP2TS stream to an MP2TS demultiplexer, such at the MP2TS demultiplexer 1114 depicted in FIG. 11. At 1808, it is determined whether the OTA channel comprises MPEG 7 or KLV metadata describing the additional streams included in the MP2MPTS. If the channel does comprise MPEG 7 or KLV metadata describing the additional streams included in the MP2MPTS, then the process proceeds to step 1810, where it is determined whether to automatically determine a capture, or let a user decide (e.g., via an input received at the computing device).

If, at step 1810, it is determined that the user should decide, then the process proceeds to step 1812, where the MP2TS demultiplexer sends metadata for each MP2MPTS program with a stream PIDS to a stream parser, such as the stream parser 1118 shown in FIG. 11. At 1814, the stream parser extracts relevant show metadata to be presented to user for content to capture and forms program selections to be presented to the user. At 1816, the stream parser sends an available shows message to a video overlay module, such as the video overlay module 1119 shown in FIG. 11. At 1818, the video overlay module sends the message to display to the video renderer, such as the video renderer 1126 shown in FIG. 11. At 1820, it is determined whether input associated with a stream capture has been received. If an input has not been received, then the process proceeds to step 1822, where it ends. If an input has been received, the process proceeds to step 1824, where the stream parser receives a user selection of programs to capture. At 1826, the stream parser returns the MP2MPTS SPTS stream PIDs to capture to the MP2TS demultiplexer. The process proceeds to 1828, where, for each MP2SPTS PID to capture, steps 1830-1834 are performed. At step 1830, an MP2TS file writer/repair module, such as the MP2TS file writer/repair module 1127 shown in FIG. 11, is instantiated. At 1832, the MP2SPTS stream is routed to the MP2RS file writer/repair module, and at 1834, a capture status metadata file, such as the file 1162 shown in FIG. 11, is generated and written to storage, such as storage 1106, for the PID.

At 1810, if it is determined that a capture should be automatically determined, the process proceeds to step 1836, where the MP2TS demultiplexer sends all MP2MPTS metadata (MPEG 7, KLV) stream PIDs with related video, audio and SPTS PIDs to a capture decision module, such as the capture decision module 1150 of FIG. 11. The process proceeds to steps 1838 and 1846. At 1838, the capture decision module makes a request to retrieve the local watch history, such as the local watch history 1148 of FIG. 11, for content watched locally on the device. At 1840, the capture decision module analyzes the metadata for all MP2MPTSs leveraging the device watch history, and leveraging a recommendation engine to automatically make a decision on what if any programs to capture. At 1842, it is determined whether the capture decision module made a decision on one or more programs to capture. If the capture decision module did not make a decision, the process proceeds to step 1812. If the capture decision module did make a decision, the process proceeds to step 1844, where the capture decision module returns the MP2MPTS SPTS stream PIDs to capture to the MP2TS Demultiplexer. The process proceeds to 1828, where, for each MP2SPTS PID to capture, steps 1830-1834 are performed.

At 1808, if the channel does comprise MPEG 7 or KLV metadata describing the additional streams included in the MP2MPTS, then the process proceeds to step 1846. At 1846, the MP2TS demultiplexer sends broadcast stream audio and video for live viewing to audio and video decoders, such as the audio decoder 1124 and the video decoder 1122 of FIG. 11. At 1848, the decoded audio is sent to an audio renderer, and decoded video is sent to a video renderer, such as the video and/or audio renderer 1126 of FIG. 11. At 1850, SEI or metadata for a broadcast program is monitored to determine if the program has ended. At 1852, it is determined whether the program has ended. If the program has not ended, the process loops back to step 1850. If at 1852, it is determined that the program has ended, then the process proceeds to step 1854, where it is determined whether the monitoring indicates that the program was consumed. If the monitoring indicates that the program was not consumed, the process proceeds to step 1858, where the process ends. If the monitoring indicates that the program was consumed, the process proceeds to step 1856, where the program is stored in the local watch history.

FIG. 19 shows another flowchart of illustrative steps involved in enabling the improved delivery of live content items to a plurality of computing devices, in accordance with some embodiments of the disclosure. FIG. 19 is an example method for intercepting a channel change request, and for prompting for a confirmation when capturing application content. Process 1900 may be implemented, in whole or in part, on any of the aforementioned computing devices. In addition, one or more actions of the process 1900 may be incorporated into or combined with one or more actions of any other processes or embodiments described herein.

At 1902, an input to change a channel at a computing device such as a computing device comprising the tuner board 1102 and the smart television system 1104 depicted in FIG. 11, is received, such as via remote control 1108 and remote input module 1109 of FIG. 11. At 1904, a channel change request is sent to a channel change override module, such as the channel change override module 1110 of FIG. 11. At 1906, the channel change override module makes a capture status request to a MP2TS demultiplexer, such as the MP2TS demultiplexer 1114 of FIG. 11. At 1908, it is determined whether the MP2TS demultiplexer is demultiplexing multiple programs in a received MP2MPTS stream. If it is not demultiplexing multiple programs, the process proceeds to step 1910, where the channel change override module sends the channel change request to an ATSC receiver, such as the ATSC receiver 1112 of FIG. 11.

If, at 1908, it is determined that the MP2TS demultiplexer is demultiplexing multiple programs, the process proceeds to step 1912, where the channel change override module sends a confirmation message to a video overlay renderer, such as the video overlay renderer 1119 of FIG. 11. At 1914, the video overlay renderer sends a video overlay with a channel change message to a video renderer, such as the video and/or audio renderer 1126 of FIG. 11, and the overlay is generated for output at the computing device. At 1916, it is determined whether an input confirming the channel change has been received. If an input confirming the channel change has not been received, the process proceeds to step 1918, where the channel change is dismissed, and the channel change override message render is removed. If an input conforming the channel change has been received, the process proceeds to step 1920, where all MP2TS file writers and repairers, such as the MP2TS file writer and repairers 1127, 1128 of FIG. 11, are torn down, and captured files, such as files 1164 and 1168 of FIG. 11 are closed. The process then proceeds to step 1910.

Figure 20:
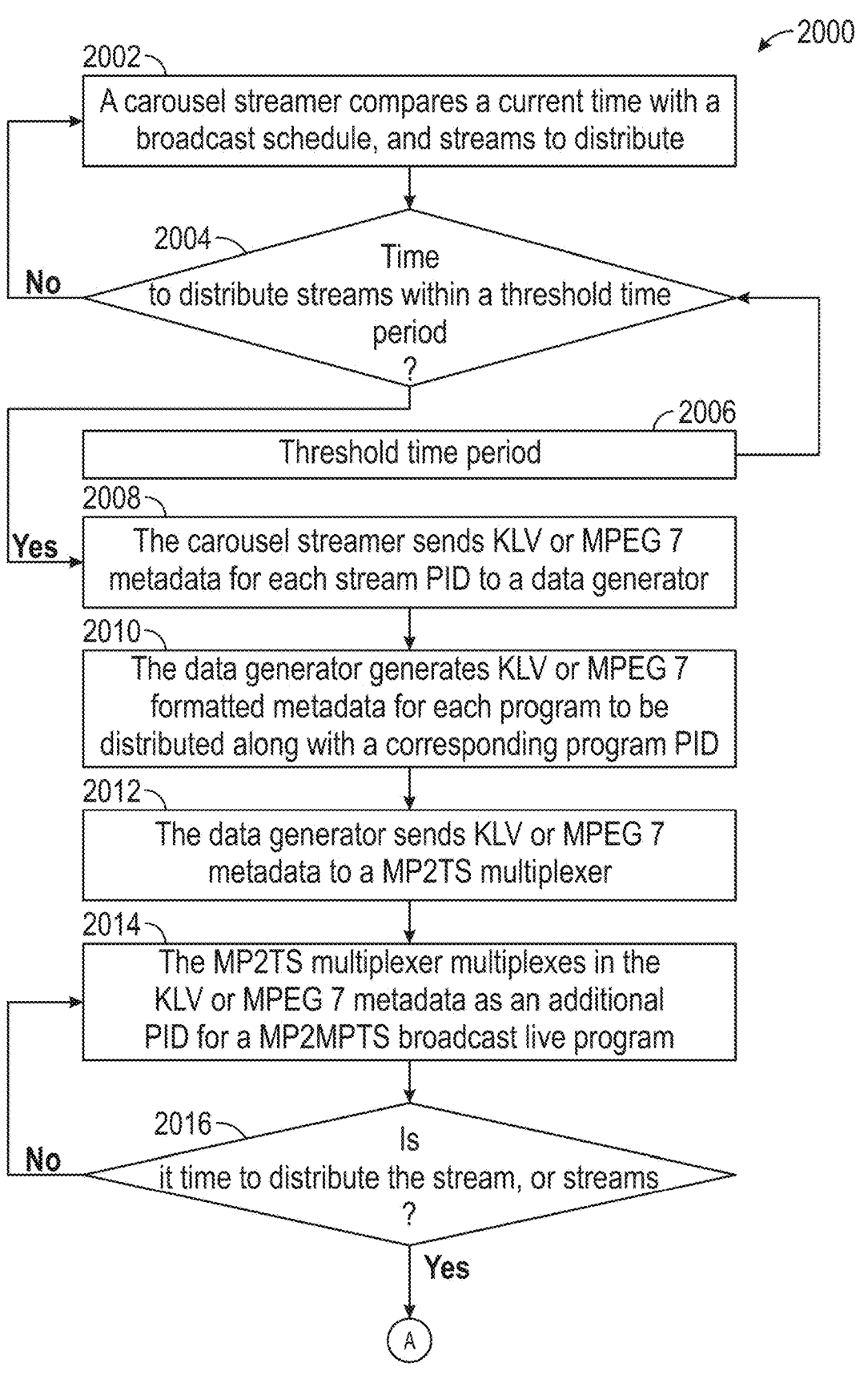
FIG. 20 shows another flowchart of illustrative steps involved in enabling the improved delivery of live content items to a plurality of computing devices, in accordance with some embodiments of the disclosure.
Figure 20:
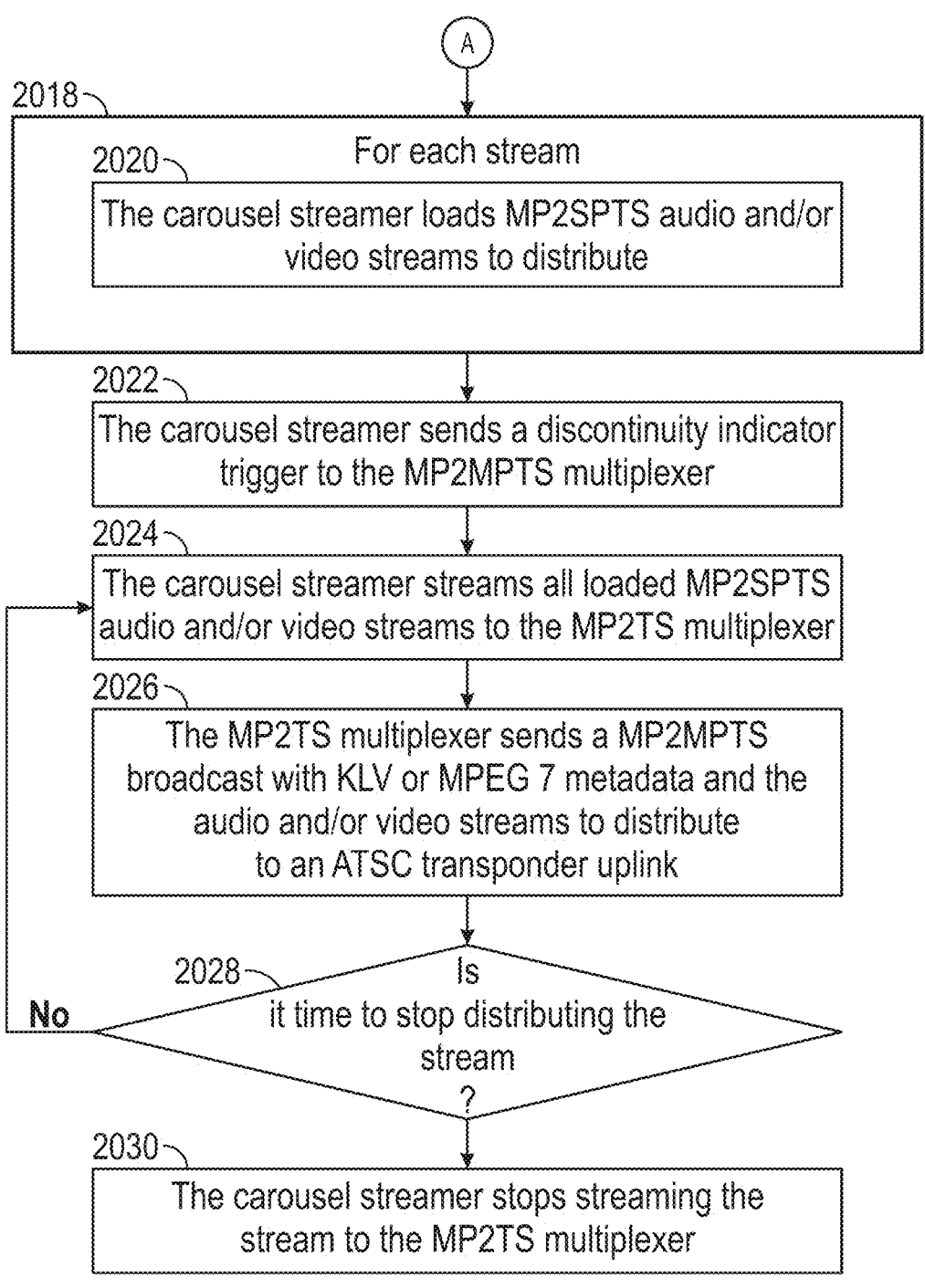

FIG. 20 shows another flowchart of illustrative steps involved in enabling the improved delivery of live content items to a plurality of computing devices, in accordance with some embodiments of the disclosure. FIG. 20 is an example method for inserting the MPEG 7 or KLV metadata for all shows in an MP2MPTS, and transmitting the streams over an ATSC transponder uplink. Process 2000 may be implemented, in whole or in part, on any of the aforementioned computing devices. In addition, one or more actions of the process 2000 may be incorporated into or combined with one or more actions of any other processes or embodiments described herein.

At 2002, a carousel streamer, such as the carousel streamer 1056 of FIG. 10, compares a current time with a broadcast schedule, for example from broadcast guide data and schedule 1060 of FIG. 10, and streams to distribute, such as those received from the encoder 1054 of FIG. 10. At 2004, it is determined whether there is time to distribute the streams within a threshold time period, where the threshold time period is received at step 2006. If it is determined that there is not time, the process loops back to step 2002. If it is determined that there is time, the process proceeds to step 2008, where the carousel streamer sends KLV or MPEG 7 metadata for each stream PID to a data generator, such as the data generator 1062 of FIG. 10. At 2010, the data generator generates KLV or MPEG 7 formatted metadata for each program to be distributed along with a corresponding program PID, and at 2012, the data generator sends KLV or MPEG 7 metadata to a MP2TS multiplexer, such as the MP2TS multiplexer 1064 of FIG. 10. At 2014, the MP2TS multiplexer multiplexes in the KLV or MPEG 7 metadata as an additional PID for a MP2MPTS broadcast live program. At 2016, it is determined whether it is time to distribute the streams. If it is determined that it is not time to distribute the streams, the process loops back to step 2014.

If, at step 2016, it is determined that it is time to distribute the streams, the process proceeds to 2018 where, for each stream, at 2020, the carousel streamer loads MP2SPTS audio and/or video streams to distribute. At 2022, the carousel streamer sends a discontinuity indicator trigger to the MP2MPTS multiplexer, and at 2024, the carousel streamer streams all loaded MP2SPTS audio and/or video streams to the MP2TS multiplexer. At 2026, the MP2TS multiplexer sends a MP2MPTS broadcast with KLV or MPEG 7 metadata and the audio and/or video streams to distribute to an ATSC transponder uplink, such as the ATSC transponder uplink 1080 of FIG. 10. At 2028, it is determined whether it is time to stop distributing the stream. If it is not time to stop distributing the stream, the process loops back to step 1024. If it is time to stop distributing the stream, the process proceeds to step 2030, where the carousel streamer stops streaming the stream to the MP2TS multiplexer.

FIG. 21 shows a block diagram representing components of a computing device and dataflow therebetween for enabling the improved delivery of live content items to a plurality of computing devices, in accordance with some embodiments of the disclosure. Computing device 2100 comprises input circuitry 2104, control circuitry 2108 and output circuitry 2114. The computing device 2100 may be, for example, a smart television. Control circuitry 2108 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

First input is received 2102 by the input circuitry 2104. The input circuitry 2104 is configured to receive inputs related to a computing device. For example, this may be via an infrared controller, a Bluetooth and/or Wi-Fi controller of the computing device 2100, a touchscreen, a keyboard, a mouse and/or a microphone. In another example, this may be via a gesture detected via an extended reality device. In a further example, the input may comprise instructions received via another computing device. The input circuitry 2104 transmits 2106 the user input to the control circuitry 2108.

The control circuitry 2108 comprises a first live content item receiving module 2110, a quality reduction identification module 2120, a second transmission scheme identification module 2124, a second live content item receiving module 2128, and output circuitry 2114 comprising a first live content item output module 2116 and a second live content item output module 2132. The input is transmitted to the first live content item receiving module 2110, where a live content item is received via a first, over-the-top, transmission scheme. The received content item is transmitted 2112 to the output circuitry 2114, where it is generated for output at the first live content item output module 2116. An indication that the live content item is being generated for output is transmitted 2118 to the quality reduction identification module 2120, where a reduction in the quality of the first transmission scheme is identified. An indication that a reduction in quality has been identified is transmitted 2122 to the second transmission scheme identification module 2124, where it is identified that the live content item is available via a second transmission scheme from a source other than the first transmission scheme. An indication of the second transmission scheme is transmitted 2126 to the second live content item receiving module 2128, where the content item is received via the second transmission scheme. The received content item is transmitted 2130 to the output circuitry 2114, where it is generated for output at the second live content item output module 2132.

FIG. 22 shows another block diagram representing components of a computing device and dataflow therebetween for enabling the improved delivery of live content items to a plurality of computing devices, in accordance with some embodiments of the disclosure. Computing device 2200 comprises input circuitry 2204, control circuitry 2208 and output circuitry 2222. The computing device 2200 may be, for example, a server in a CDN. Control circuitry 2208 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

First input is received 2202 by the input circuitry 2204. The input circuitry 2204 is configured to receive inputs related to a computing device. For example, this may comprise instructions received via another computing device. The input circuitry 2204 transmits 2206 the user input to the control circuitry 2208.

The control circuitry 2208 comprises a live content item sending module 2210, a capacity threshold identifying module 2214, a second transmission scheme identification module 2218 and output circuitry 2222 comprising an instruction sending module 2224 and a live content item stopping module 2228. The input is transmitted to the live content item sending module 2210, where a live content item is sent, via a first, over-the-top, transmission scheme, to a plurality of computing devices. An indication of the sending is transmitted 2212 to the capacity threshold identifying module 2214, where it is identified that a capacity threshold has been reached. An indication that the capacity threshold has been reached is transmitted 2216 to the second transmission scheme identification module 2218, where it is identified that the live content item is available via a second transmission scheme from a first source other than the first transmission scheme. An indication of the second transmission scheme is transmitted 2220 to the output module 2222, where the instruction sending module 2224 sends, to the plurality of computing devices, a first instruction to receive the live content item from the first source. An indication that the instruction has been sent is transmitted 226 to the live content item stopping module 2228, where the sending of the live content item to at least a first subset of the plurality of computing devices is stopped.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

This specification discloses embodiments which include, but are not limited to, the following:

1. A method comprising:
   sending, from a content delivery network and via a first transmission scheme, a live content item to a plurality of computing devices, wherein the first transmission scheme is an over-the-top transmission scheme;
   identifying, at the content delivery network, that a capacity threshold has been reached;
   identifying that the live content item is available via a second transmission scheme from a first source other than the first transmission scheme;
   sending, from the content delivery network and to the plurality of computing devices, a first instruction to receive the live content item from the first source; and
   stopping the sending of the live content item to at least a first subset of the plurality of computing devices.

2. The method of item 1, wherein the first transmission scheme comprises the Internet, and the first source of the second transmission scheme is an over-the-air transmission, a cable transmission, a satellite transmission and/or an IPTV transmission.

3. The method of item 1, wherein:
   the method further comprises receiving, from each of a second subset of the plurality of computing devices, an indicator that a computing device is configured to receive the live content item from the first source other than the first transmission scheme; and

sending the first instruction to receive the live content item from the first source further comprises sending the first instruction to each of the second subset of the plurality of computing devices from which the indicator was received.

4. The method of item 1, wherein:
   the content delivery network further comprises a steering service; and
   stopping the sending of the live content item further comprises utilizing the steering service to prioritize which computing devices from the plurality of computing devices to include in the first subset.

5. The method of item 1, wherein the capacity threshold is based on a number of current sessions, a number of computing devices requesting the live content item and/or a bandwidth associated with delivering the live content item to the plurality of computing devices.

6. The method of item 1, wherein the first transmission scheme comprises a wide area network and a plurality of local area networks and wherein:
   the method further comprises identifying, for each local area network of a subset of the plurality of local area networks, that a threshold number of computing devices are associated with a local area network; and
   stopping the sending of the live content comprises stopping the sending of the live content item to the subset of the plurality of local area networks.

7. The method of item 1, wherein the method further comprises:
   receiving, from each computing device of a second subset of the plurality of computing devices, an acknowledgement that the live content item is being received from the first source; and
   stopping the sending of the live content item comprises stopping the sending of the live content item to each computing device of the second subset of the plurality of computing devices from which the acknowledgement has been received.

8. The method of item 1, wherein stopping the sending of the live content item further comprises enabling a response to trick mode requests, from the subset of computing devices and via the first transmission scheme, for the live content item.

9. The method of item 1, wherein the first instruction to receive the live content item from the first source comprises an instruction to force a computing device to receive the live content item from the first source.

10. The method of item 1, further comprising:
    receiving, from each of a second subset of the plurality of computing devices, a plurality of notifications that a computing device is unable to access the first source, other than the bidirectional network, from which the live content item is available;
    identifying the live content item is available via a second transmission scheme from a second source other than the first transmission scheme and the first source; and
    sending, from the content delivery network, a second instruction to receive the live content item from the second source.

11. A system comprising:
    input/output circuitry configured to:
    send, from a content delivery network and via a first transmission scheme, a live content item to a plurality of computing devices, wherein the first transmission scheme is an over-the-top transmission scheme; and processing circuitry configured to:

identify, at the content delivery network, that a capacity threshold has been reached;

identify that the live content item is available via a second transmission scheme from a first source other than the first transmission scheme;

send, from the content delivery network and to the plurality of computing devices, a first instruction to receive the live content item from the first source; and stop the sending of the live content item to at least a first subset of the plurality of computing devices.

12. The system of item 11, wherein the first transmission scheme comprises the Internet, and the first source of the second transmission scheme is an over-the-air transmission, a cable transmission, a satellite transmission and/or an IPTV transmission.

13. The system of item 11, wherein:

the system further comprises processing circuity configured to receive, from each of a second subset of the plurality of computing devices, an indicator that a computing device is configured to receive the live content item from the first source other than the first transmission scheme; and the processing circuitry configured to send the first instruction to receive the live content item from the first source is further configured to send the first instruction to each of the second subset of the plurality of computing devices from which the indicator was received.

14. The system of item 11, wherein:

the content delivery network further comprises a steering service; and the processing circuitry configured to stop the sending of the live content item is further configured to utilize the steering service to prioritize which computing devices from the plurality of computing devices to include in the first subset.

15. The system of item 11, wherein the capacity threshold is based on a number of current sessions, a number of computing devices requesting the live content item and/or a bandwidth associated with delivering the live content item to the plurality of computing devices.

16. The system of item 11, wherein the first transmission scheme comprises a wide area network and a plurality of local area networks and wherein:

the system further comprises processing circuitry configured to identify, for each local area network of a subset of the plurality of local area networks, that a threshold number of computing devices are associated with a local area network; and the processing circuitry configured to stop the sending of the live content is further configured to stop the sending of the live content item to the subset of the plurality of local area networks.

17. The system of item 11, wherein the system further comprises processing circuitry configured to:

receive, from each computing device of a second subset of the plurality of computing devices, an acknowledgement that the live content item is being received from the first source; and stop the sending of the live content item comprises stopping the sending of the live content item to each computing device of the second subset of the plurality of computing devices from which the acknowledgement has been received.

18. The system of item 11, wherein the processing circuitry configured to stop the sending of the live content item is further configured to enable a response to trick mode requests, from the subset of computing devices and via the first transmission scheme, for the live content item.

19. The system of item 11, wherein the first instruction to receive the live content item from the first source comprises an instruction to force a computing device to receive the live content item from the first source.

20. The system of item 11, further comprising processing circuitry configured to:

receive, from each of a second subset of the plurality of computing devices, a plurality of notifications that a computing device is unable to access the first source, other than the bidirectional network, from which the live content item is available;

identify the live content item is available via a second transmission scheme from a second source other than the first transmission scheme and the first source; and send, from the content delivery network, a second instruction to receive the live content item from the second source.

21. A non-transitory, computer-readable medium having non-transitory, computer-readable instructions encoded thereon that, when executed by control circuitry, cause the control circuitry to:

send, from a content delivery network and via a first transmission scheme, a live content item to a plurality of computing devices, wherein the first transmission scheme is an over-the-top transmission scheme; and identify, at the content delivery network, that a capacity threshold has been reached;

identify that the live content item is available via a second transmission scheme from a first source other than the first transmission scheme;

send, from the content delivery network and to the plurality of computing devices, a first instruction to receive the live content item from the first source; and stop the sending of the live content item to at least a first subset of the plurality of computing devices.

22. The non-transitory, computer-readable medium of item 21, wherein the first transmission scheme comprises the Internet, and the first source of the second transmission scheme is an over-the-air transmission, a cable transmission, a satellite transmission and/or an IPTV transmission.

23. The non-transitory, computer-readable medium of item 21, wherein:

execution of the instructions further causes the control circuitry to receive, from each of a second subset of the plurality of computing devices, an indicator that a computing device is configured to receive the live content item from the first source other than the first transmission scheme; and execution of the instructions to send the first instruction to receive the live content item from the first source further causes the control circuitry to send the first instruction to each of the second subset of the plurality of computing devices from which the indicator was received.

24. The non-transitory, computer-readable medium of item 21, wherein:

the content delivery network further comprises a steering service; and execution of the instructions to stop the sending of the live content item further causes the control circuitry to utilize the steering service to prioritize which computing devices from the plurality of computing devices to include in the first subset.

25. The non-transitory, computer-readable medium of item 21, wherein the capacity threshold is based on a number of current sessions, a number of computing devices requesting the live content item and/or a bandwidth associated with delivering the live content item to the plurality of computing devices.

26. The non-transitory, computer-readable medium of item 21, wherein the first transmission scheme comprises a wide area network and a plurality of local area networks and wherein:

execution of the instructions further causes the control circuitry to identify, for each local area network of a subset of the plurality of local area networks, that a threshold number of computing devices are associated with a local area network; and execution of the instructions to stop the sending of the live content further causes the control circuitry to stop the sending of the live content item to the subset of the plurality of local area networks.

27. The non-transitory, computer-readable medium of item 21, wherein execution of the instructions further causes the control circuitry to:

receive, from each computing device of a second subset of the plurality of computing devices, an acknowledgement that the live content item is being received from the first source; and stop the sending of the live content item comprises stopping the sending of the live content item to each computing device of the second subset of the plurality of computing devices from which the acknowledgement has been received.

28. The non-transitory, computer-readable medium of item 21, wherein execution of the instructions to stop the sending of the live content item further causes the control circuitry to enable a response to trick mode requests, from the subset of computing devices and via the first transmission scheme, for the live content item.

29. The non-transitory, computer-readable medium of item 21, wherein the first instruction to receive the live content item from the first source comprises an instruction to force a computing device to receive the live content item from the first source.

30. The non-transitory, computer-readable medium of item 21, wherein execution of the instructions further causes the control circuitry to:

receive, from each of a second subset of the plurality of computing devices, a plurality of notifications that a computing device is unable to access the first source, other than the bidirectional network, from which the live content item is available;

identify the live content item is available via a second transmission scheme from a second source other than the first transmission scheme and the first source; and send, from the content delivery network, a second instruction to receive the live content item from the second source.

31. A system comprising:

means for sending, from a content delivery network and via a first transmission scheme, a live content item to a plurality of computing devices, wherein the first transmission scheme is an over-the-top transmission scheme;

means for identifying, at the content delivery network, that a capacity threshold has been reached;

means for identifying that the live content item is available via a second transmission scheme from a first source other than the first transmission scheme;

means for sending, from the content delivery network and to the plurality of computing devices, a first instruction to receive the live content item from the first source; and means for stopping the sending of the live content item to at least a first subset of the plurality of computing devices.

32. The system of item 31, wherein the first transmission scheme comprises the Internet, and the first source of the second transmission scheme is an over-the-air transmission, a cable transmission, a satellite transmission and/or an IPTV transmission.

33. The system of item 31, wherein:

the system further comprises means for receiving, from each of a second subset of the plurality of computing devices, an indicator that a computing device is configured to receive the live content item from the first source other than the first transmission scheme; and the means for sending the first instruction to receive the live content item from the first source further comprises means for sending the first instruction to each of the second subset of the plurality of computing devices from which the indicator was received.

34. The system of item 31, wherein:

the content delivery network further comprises a steering service; and the means for stopping the sending of the live content item further comprises means for utilizing the steering service to prioritize which computing devices from the plurality of computing devices to include in the first subset.

35. The system of item 31, wherein the capacity threshold is based on a number of current sessions, a number of computing devices requesting the live content item and/or a bandwidth associated with delivering the live content item to the plurality of computing devices.

36. The system of item 31, wherein the first transmission scheme comprises a wide area network and a plurality of local area networks and wherein:

the system further comprises means for identifying, for each local area network of a subset of the plurality of local area networks, that a threshold number of computing devices are associated with a local area network; and the means for stopping the sending of the live content comprises means for stopping the sending of the live content item to the subset of the plurality of local area networks.

37. The system of item 31, wherein the system further comprises means for:

receiving, from each computing device of a second subset of the plurality of computing devices, an acknowledgement that the live content item is being received from the first source; and stopping the sending of the live content item comprises stopping the sending of the live content item to each computing device of the second subset of the plurality of computing devices from which the acknowledgement has been received.

38. The system of item 31, wherein the means for stopping the sending of the live content item further comprises means for enabling a response to trick mode requests, from the subset of computing devices and via the first transmission scheme, for the live content item.

39. The system of item 31, wherein the first instruction to receive the live content item from the first source comprises an instruction to force a computing device to receive the live content item from the first source.

40. The system of item 31, further comprising means for:
   receiving, from each of a second subset of the plurality of computing devices, a plurality of notifications that a computing device is unable to access the first source, other than the bidirectional network, from which the live content item is available;
   identifying the live content item is available via a second transmission scheme from a second source other than the first transmission scheme and the first source; and
   sending, from the content delivery network, a second instruction to receive the live content item from the second source.

41. A method comprising:
   sending, from a content delivery network and via a first transmission scheme, a live content item to a plurality of computing devices, wherein the first transmission scheme is an over-the-top transmission scheme;
   identifying, at the content delivery network, that a capacity threshold has been met;
   identifying that the live content item is available via a second transmission scheme from a first source other than the first transmission scheme;
   sending, from the content delivery network and to the plurality of computing devices, a first instruction to receive the live content item from the first source; and
   stopping the sending of the live content item to at least a first subset of the plurality of computing devices.

42. The method of item 41, wherein the first transmission scheme comprises the Internet, and the first source of the second transmission scheme is an over-the-air transmission, a cable transmission, a satellite transmission and/or an IPTV transmission.

43. The method of items 41 or 42, wherein:
   the method further comprises receiving, from each of a second subset of the plurality of computing devices, an indicator that a computing device is configured to receive the live content item from the first source other than the first transmission scheme; and
   sending the first instruction to receive the live content item from the first source further comprises sending the first instruction to each of the second subset of the plurality of computing devices from which the indicator was received.

44. The method of any of items 41 to 43, wherein:
   the content delivery network further comprises a steering service; and
   stopping the sending of the live content item further comprises utilizing the steering service to prioritize which computing devices from the plurality of computing devices to include in the first subset.

45. The method of any of items 41 to 44, wherein the capacity threshold is based on a number of current sessions, a number of computing devices requesting the live content item and/or a bandwidth associated with delivering the live content item to the plurality of computing devices.

46. The method of any of items 41 to 45, wherein the first transmission scheme comprises a wide area network and a plurality of local area networks and wherein:
   the method further comprises identifying, for each local area network of a subset of the plurality of local area networks, that a threshold number of computing devices are associated with a local area network; and
   stopping the sending of the live content comprises stopping the sending of the live content item to the subset of the plurality of local area networks.

47. The method of any of items 41 to 46, wherein the method further comprises:
   receiving, from each computing device of a second subset of the plurality of computing devices, an acknowledgement that the live content item is being received from the first source; and
   stopping the sending of the live content item comprises stopping the sending of the live content item to each computing device of the second subset of the plurality of computing devices from which the acknowledgement has been received.

48. The method of any of items 41 to 47, wherein stopping the sending of the live content item further comprises enabling a response to trick mode requests, from the subset of computing devices and via the first transmission scheme, for the live content item.

49. The method of any of items 41 to 48, wherein the first instruction to receive the live content item from the first source comprises an instruction to force a computing device to receive the live content item from the first source.

50. The method of any of items 41 to 49, further comprising:
   receiving, from each of a second subset of the plurality of computing devices, a plurality of notifications that a computing device is unable to access the first source, other than the bidirectional network, from which the live content item is available;
   identifying the live content item is available via a second transmission scheme from a second source other than the first transmission scheme and the first source; and
   sending, from the content delivery network, a second instruction to receive the live content item from the second source.

What is claimed is:

1. A method comprising:
   receiving, via an application running on a computing device, a live content item via a first transmission scheme, wherein the first transmission scheme is an over-the-top transmission scheme;
   generating, for output via the application, the live content item received via the first transmission scheme;
   identifying that the live content item is available via a second transmission scheme from a source other than the first transmission scheme;
   receiving at least a portion of the live content item via the second transmission scheme;
   based at least in part on the receiving the at least a portion of the live content item via the second transmission scheme, storing the at least a portion of the live content item received via the second transmission scheme at a buffer;
   establishing synchronization data of a mapping of portions of the live content item received via the first transmission scheme and the at least a portion of the live content item buffered in the buffer;

receiving a trick play request for a portion of the live content item being received via the first transmission scheme;

updating the synchronization data based on the trick play request to maintain the mapping;

identifying a reduction in quality of the first transmission scheme; and based at least in part on the reduction in quality, switching to generating, for output, at least a portion of the buffer storing the at least a portion of the live content item received via the second transmission scheme, wherein a play position at the buffer is selected based on the mapping.

2. The method of claim 1, wherein the first transmission scheme comprises the Internet, and the source of the second transmission scheme is an over-the-air transmission, a cable transmission, a satellite transmission and/or an IPTV transmission.

3. The method of claim 1, wherein:

the method further comprises:

generating, for output, a notification comprising a user interface element in response to identifying the reduction in quality of the first transmission scheme, wherein the user interface element is configured to select the second transmission scheme;

receiving an input associated with the user interface element; and receiving the at least a portion of the live content item via the second transmission scheme further comprises receiving the at least a portion of the live content item via the second transmission scheme in response to receiving the input associated with the user interface element.

4. The method of claim 1, wherein identifying the reduction in quality of the first transmission scheme further comprises identifying that an application buffer associated with the live content item is below a threshold level.

5. The method of claim 1, further comprising generating an indication, in a media guidance application, that the live content item is also available via the second transmission scheme.

6. The method of claim 1, wherein generating, for output, the at least a portion of the buffer storing the at least a portion of the live content item received via the second transmission scheme further comprises:

generating, for output, the live content item in a picture-in-picture mode at a first time;

terminating the receiving of the live content item via the first transmission scheme; and generating, for output, the live content item in a full screen mode at a second time after the first time.

7. The method of claim 1, wherein receiving the at least a portion of the live content item via the second transmission scheme further comprises initiating, via a steering service, the receiving of the live content item via the second transmission scheme.

8. The method of claim 1, wherein identifying that the live content item is available via the second transmission scheme further comprises:

identifying, via a background check, one or more sources other than the first transmission scheme; and selecting the source from the one or more sources.

9. The method of claim 1, wherein:

the method further comprises receiving a manifest file at the computing device; and identifying that the live content item is available via the second transmission scheme further comprises identifying the source via at least one of the manifest file and a content delivery network redirect.

10. A system comprising:

input/output circuitry configured to:

receive, via an application running on a computing device, a live content item via a first transmission scheme, wherein the first transmission scheme is an over-the-top transmission scheme; and processing circuitry configured to:

generate, for output via the application, the live content item received via the first transmission scheme;

identify that the live content item is available via a second transmission scheme from a source other than the first transmission scheme;

wherein the input/output circuitry is further configured to:

receive at least a portion of the live content item via the second transmission scheme;

wherein the processing circuitry is further configured to:

based at least in part on the receiving the at least a portion of the live content item via the second transmission scheme, store the at least a portion of the live content item received via the second transmission scheme at a buffer;

establish synchronization data of a mapping of portions of the live content item received via the first transmission scheme and the at least a portion of the live content item buffered in the buffer;

wherein the input/output circuitry is further configured to:

receive a trick play request for a portion of the live content item being received via the first transmission scheme;

wherein the processing circuitry is further configured to:

update the synchronization data based on the trick play request to maintain the mapping;

identify a reduction in quality of the first transmission scheme; and based at least in part on the reduction in quality, switch to generate, for output, at least a portion of the buffer storing the at least a portion of the live content item received via the second transmission scheme, wherein a play position at the buffer is selected based on the mapping.

11. The system of claim 10, wherein the first transmission scheme comprises the Internet, and the source of the second transmission scheme is an over-the-air transmission, a cable transmission, a satellite transmission and/or an IPTV transmission.

12. The system of claim 10, wherein:

the processing circuitry is further configured to:

generate, for output, a notification comprising a user interface element in response to identifying the reduction in quality of the first transmission scheme, wherein the user interface element is configured to select the second transmission scheme;

the input/output circuitry is further configured to:

receive an input associated with the user interface element; and the processing circuitry configured to receive the at least a portion of the live content item via the second transmission scheme is further configured to receive the at least a portion of the live content item via the second transmission scheme in response to receiving the input associated with the user interface element.

13. The system of claim 10, wherein the processing circuitry configured to identify the reduction in quality of the first transmission scheme is further configured to identify that an application buffer associated with the live content item is below a threshold level.

14. The system of claim 10, wherein the processing circuitry is further configured to generate an indication, in a media guidance application, that the live content item is also available via the second transmission scheme.

15. The system of claim 10, wherein the processing circuitry configured to generate, for output, the at least a portion of the buffer storing the at least a portion of the live content item received via the second transmission scheme is further configured to:

generate, for output, the live content item in a picture-in-picture mode at a first time;

terminate the receiving of the live content item via the first transmission scheme; and generate, for output, the live content item in a full screen mode at a second time after the first time.

16. The system of claim 10, wherein the processing circuitry configured to receive the at least a portion of the live content item via the second transmission scheme is further configured to initiate, via a steering service, the receiving of the at least a portion of the live content item via the second transmission scheme.

17. The system of claim 10, wherein the processing circuitry configured to identify that the live content item is available via the second transmission scheme is further configured to:

identify, via a background check, one or more sources other than the first transmission scheme; and select the source from the one or more sources.

18. The system of claim 10, wherein:

the processing circuitry is further configured to receive a manifest file at the computing device; and the processing circuitry configured to identify that the live content item is available via the second transmission scheme is further configured to identify the source via at least one of the manifest file and a content delivery network redirect.

* * * * *